(12) United States Patent
Watanabe et al.

(10) Patent No.: US 12,283,017 B2
(45) Date of Patent: Apr. 22, 2025

(54) COMPUTER PROGRAM, METHOD, AND SERVER

(71) Applicant: GREE, Inc., Tokyo (JP)

(72) Inventors: Masashi Watanabe, Tokyo (JP); Keiichi Yamaguchi, Chiba (JP)

(73) Assignee: GREE, INC., Tokyo (JP)

( * ) Notice: Subject to any disclaimer, the term of this patent is extended or adjusted under 35 U.S.C. 154(b) by 86 days.

(21) Appl. No.: 17/855,050

(22) Filed: Jun. 30, 2022

(65) Prior Publication Data

US 2022/0335700 A1 Oct. 20, 2022

Related U.S. Application Data

(63) Continuation of application No. PCT/JP2021/044542, filed on Dec. 3, 2021.

(30) Foreign Application Priority Data

Dec. 7, 2020 (JP) ................................ 2020-202730
Dec. 28, 2020 (JP) ................................ 2020-218264

(51) Int. Cl.
*G06T 19/20* (2011.01)
*G06T 13/40* (2011.01)
(52) U.S. Cl.
CPC .............. *G06T 19/20* (2013.01); *G06T 13/40* (2013.01); *G06T 2219/2012* (2013.01)
(58) Field of Classification Search
CPC ................................ G06T 19/20; G06T 13/40
See application file for complete search history.

(56) References Cited

U.S. PATENT DOCUMENTS

2006/0215896 A1* 9/2006 Sirohey ...................... G06T 7/49
382/131
2008/0214253 A1 9/2008 Gillo et al.
(Continued)

FOREIGN PATENT DOCUMENTS

JP 2002082894 A 3/2002
JP 2003093734 A 4/2003
(Continued)

OTHER PUBLICATIONS

International Search Report mailed Mar. 8, 2022, in corresponding to International Application No. PCT/JP2021/044542; 5 pages (with English Translation).
(Continued)

*Primary Examiner* — Yi Yang
(74) *Attorney, Agent, or Firm* — Maier & Maier, PLLC

(57) ABSTRACT

Provided are a computer program, a method, and a server in which a possibility that a load on display control increases is reduced, compared to the related art. According to an exemplary embodiment of such a configuration, first data relevant to a first position in a virtual space in which a first avatar manipulated by using a first terminal of a first user exists is acquired, whether or not a first condition is satisfied is determined, second data is received in a case where it is determined that the first condition is satisfied, control data for controlling a display unit of the first terminal such that at least the virtual object is displayed on the display unit of the first terminal is decided on the basis of the second data, and the display unit is controlled on the basis of the control data.

19 Claims, 16 Drawing Sheets

(56) References Cited

U.S. PATENT DOCUMENTS

| | | | |
|---|---|---|---|
| 2011/0055320 A1 | 3/2011 | Gillo et al. | |
| 2011/0276879 A1 | 11/2011 | Ando et al. | |
| 2013/0009984 A1 | 1/2013 | Kawakami | |
| 2013/0344966 A1 | 12/2013 | Mustafa | |
| 2014/0282112 A1* | 9/2014 | Begosa | G06F 3/04815 715/757 |
| 2015/0095376 A1* | 4/2015 | Pathak | G06F 21/10 707/784 |
| 2016/0357360 A1* | 12/2016 | Oshiba | H04M 1/72436 |
| 2018/0330536 A1* | 11/2018 | Sawaki | G06F 3/012 |
| 2019/0104235 A1* | 4/2019 | Sarkar | H04N 21/47 |
| 2019/0206129 A1 | 7/2019 | Khalid | |
| 2019/0333261 A1 | 10/2019 | Nakashima | |
| 2019/0335242 A1 | 10/2019 | Miyazaki et al. | |
| 2020/0219300 A1 | 7/2020 | Ishikawa et al. | |
| 2020/0288202 A1 | 9/2020 | Ohata et al. | |
| 2021/0158781 A1 | 5/2021 | Imamura et al. | |
| 2021/0240279 A1 | 8/2021 | Harviainen et al. | |

FOREIGN PATENT DOCUMENTS

| | | | |
|---|---|---|---|
| JP | 2005-100053 A | 4/2005 | |
| JP | 2008-107895 A | 5/2008 | |
| JP | 2010-015333 A | 1/2010 | |
| JP | 2010-520537 A | 6/2010 | |
| JP | 2010-529547 A | 8/2010 | |
| JP | 2011-154419 A | 8/2011 | |
| JP | 2011204180 A | 10/2011 | |
| JP | 2011-229716 A | 11/2011 | |
| JP | 2012-118919 A | 6/2012 | |
| JP | 2013-020389 A | 1/2013 | |
| JP | 2014512199 A | 5/2014 | |
| JP | 2016-034087 A | 3/2016 | |
| JP | 2016140519 A | 8/2016 | |
| JP | 2017-187995 A | 10/2017 | |
| JP | 2019192175 A | 10/2019 | |
| JP | 2020-120336 A | 8/2020 | |
| JP | 2020145654 A | 9/2020 | |
| KR | 10-2018-0079145 A | 7/2018 | |
| WO | 2014192552 A1 | 2/2017 | |
| WO | 2019013016 A1 | 1/2019 | |
| WO | 2019234879 A1 | 12/2019 | |

OTHER PUBLICATIONS

Notification of Reasons for Refusal mailed Apr. 13, 2023, issued in Japanese Patent Application No. 2020-218264; 6 pages with machine generated English Translation).

Decision of Refusal mailed Sep. 7, 2003, issued in Japanese Patent Application No. 2020-218264; 6 pages (with machine generated English Translation).

Notification of Reasons for Refusal mailed Mar. 16, 2003, issued in Japanese Patent Application No. 2020-202730; 4 pages (with machine generated English Translation).

Decision of Refusal mailed Aug. 24, 2003, issued in Japanese Patent Application No. 2020-202730; 6 pages (with machine generated English Translation).

Office Action issued on Feb. 18, 2022, in corresponding Japanese Application No. 2020-218264, 12 pages.

Office Action issued on Feb. 10, 2022, in corresponding Japanese Application No. 2020-202730, 6 pages.

Office Action issued on Jul. 11, 2024, in corresponding Japanese Application No. 2021-190352, 15 pages.

Office Action issued on Aug. 22, 2024, in related U.S. Appl. No. 17/936,762, 60 pages.

Office Action issued on Dec. 24, 2024, in corresponding Japanese Application No. 2024-026892, 14 pages.

Office Action issued on Jan. 28, 2025, in corresponding Japanese Application No. 2024-067015, 16 pages.

Nakao et al., "W@nderland: Image-based Virtual Space Constructable by Participants through the WWW", IPSJ Journal, vol. 43, No. 9, Information Processing Society of Japan, Sep. 2002, pp. 2903-2913, with English Summary, 11 pages.

Office Action issued on Feb. 25, 2025, in corresponding Japanese Application No. 2023-207989, 12 pages.

* cited by examiner

COMPUTER PROGRAM, METHOD, AND SERVER

FIELD

The present disclosure relates to a computer program, a method, and a server.

In the related art, it is known that in a case where a user uses a terminal to view a content that may be executed in a virtual space displayed on the terminal, an icon corresponding to another user viewing the content may be displayed in the virtual space.

SUMMARY

However, in such implementations, the number of icons displayed on the terminal increases as the number of users viewing the content increases. Therefore, there is a problem that a load on display control in the terminal increases in accordance with an increase in the number of users viewing the content.

The disclosure provides a computer program, a method, and a server in which a possibility that a load on display control increases may be reduced compared to the related art.

A computer program according to one exemplary embodiment may be a computer program that may be executed by at least one processor and may allow the at least one processor to: acquire first data relevant to a first position in a virtual space in which a first avatar manipulated by using a first terminal of a first user exists; determine whether or not a first condition that the first position is in a first region is satisfied; receive second data transmitted from a terminal of a user manipulating at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, decide control data for controlling a display unit of the first terminal such that at least the virtual object may be displayed on the display unit of the first terminal, on the basis of the second data; and control the display unit on the basis of the control data.

A computer program according to one exemplary embodiment may be a computer program that may be executed by at least one processor and may allow the at least one processor to: receive first data relevant to a first position in a virtual space in which a first avatar manipulated by using a first terminal of a first user exists, through a communication line; determine whether or not a first condition that the first position is in a first region is satisfied; receive second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a first region displaying a virtual object corresponding to the at least one second avatar, decide control data for controlling a display unit of the first terminal such that at least the virtual object may be displayed on the display unit of the first terminal, on the basis of the second data; transmit the control data to the first terminal.

A method according to one exemplary embodiment may be a method executed by at least one processor, comprising: a step of acquiring first data relevant to a first position in a virtual space in which a first avatar manipulated by using a first terminal of a first user exists; a step of determining whether or not a first condition that the first position is in a first region is satisfied; a step of receiving second data transmitted from a terminal of a user manipulating at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, a step of deciding control data for controlling a display unit of the first terminal such that at least the virtual object may be displayed on the display unit of the first terminal, on the basis of the second data; and a step of controlling the display unit on the basis of the control data.

A method according to one exemplary embodiment may be a method executed by at least one processor, comprising: a step of receiving first data relevant to a first position in a virtual space in which a first avatar manipulated by using a first terminal of a first user exists, through a communication line; a step of determining whether or not a first condition that the first position is in a first region is satisfied; a step of receiving second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, a step of deciding control data for controlling a display unit of the first terminal such that at least the virtual object may be displayed on the display unit of the first terminal, on the basis of the second data; and a step of transmitting the control data to the first terminal.

A server according to one exemplary embodiment may be a server that includes at least one processor and performs: receiving first data relevant to a first position in a virtual space in which a first avatar manipulated by using a first terminal of a first user exists, through a communication line; determining whether or not a first condition that the first position is in a first region is satisfied; receiving second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, deciding control data for controlling a display unit of the first terminal such that at least the virtual object may be displayed on the display unit of the first terminal, on the basis of the second data; and transmitting the control data to the first terminal.

The present section may introduce various selected concepts in a simplified form, and such various concepts may be described in further detail in a later section. All trademarks used herein are the property of holders of the trademarks. The description provided in the present section is not intended to specify the important characteristics or the essential characteristics of the present embodiments described in the claims, and is not intended to limit the technical scope of the embodiments described in the claims. The objects, characteristics, and effects described above, or other objects, characteristics, and effects of embodiments provided herein may be described below with reference to the accompanying drawings.

DETAILED DESCRIPTION

Figure 1:
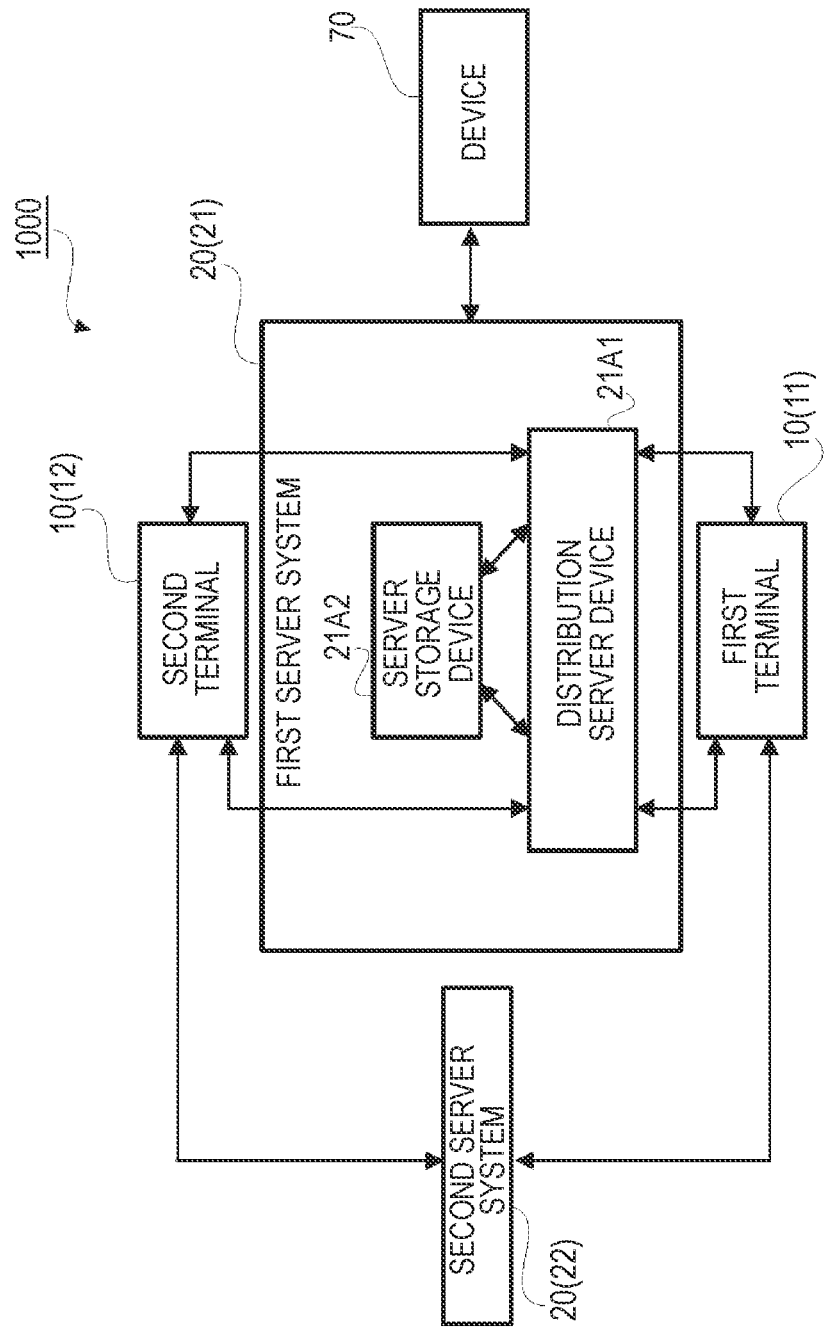
FIG. 1 is a block diagram illustrating an example of a configuration of a system 1000 according to one embodiment.

This specification may provide description in the form of various representative embodiments that are not intended to be limited by any method. As used throughout this disclosure, references to singular forms such as "a," "an," "one", "described above", "the above", "the above-described", "the", "this", and "that" may also include plural forms unless it is explicitly noted, in context, that such singular forms exclude the plural forms. In addition, a term such as "include" may indicate "comprise" or "have". Further, terms such as "combined" or "combining", "associated" or "associating", and "connected" or "connecting" also include mechanical, electrical, magnetic, and optical methods for combining, connecting, or associating targets with each other, together with other methods, and do not exclude the existence of intermediate elements between the combined or combining targets, the associated or associating targets, and the connected or connecting targets.

Various systems, methods, and devices described herein are not construed as being limited by any method. In practice, the disclosure may be directed to novel characteristics and aspects of a combination of various embodiments and a combination of a part of the various embodiments of each of various embodiments disclosed herein. Various systems, methods, and devices described herein are not limited to specific exemplary embodiments, specific characteristics, or a combination of the specific exemplary embodiments and the specific characteristics, matters and methods described herein are required to have one or more specific effects or to solve the problems. Further, various characteristics or exemplary embodiments, or a part of such characteristics or aspects of various embodiments described herein can be used in combination.

The operation of several methods of various methods disclosed herein, for the sake of convenience, may be described in a specific order, but it may be understood that such description in the specific order includes the rearrangement of the order of the operations unless the specific order is required by the following specific text. For example, a plurality of operations described in sequence may be rearranged or executed simultaneously. Further, for simplification purposes, the accompanying drawings do not illustrate various methods in which various respects and methods described herein can be used together with other respects and methods. In addition, herein, terms such as "generate", "occur", "display", "receive", "evaluate", and "distribute" may be used. Such terms are high-level description of the various actual operations that are executed. The various actual operations corresponding to the terms can be changed depending on specific implementation, and can be easily recognized by a person skilled in the art who takes the advantage of the disclosure herein.

Operation theories, scientific principles, or other theoretical description presented herein in association with the devices or the methods of the disclosure are provided for better understanding, and are not intended to limit the technical scope. The devices and the methods in the accompanying claims are not limited to devices and methods that are operated by the methods described in the operation theories.

Any of the various methods disclosed herein can be implemented by using a plurality of computer-executable commands that are stored in one or more computer-readable media (for example, non-transitory computer-readable storage media such as one or more optical medium disks, a plurality of volatile memory components, or a plurality of non-volatile memory components), and can be executed in the computer. Here, the plurality of volatile memory components, for example, include a DRAM or a SRAM. In addition, the plurality of non-volatile memory components, for example, include a hard drive and a solid state drive (SSD). Further, the computer, for example, includes an arbitrary commercially available computer such as a smart phone and other mobile devices including hardware for performing computation.

Any of the plurality of computer-executable commands for implementing the technologies disclosed herein can be stored in one or more computer-readable media (for example, non-transitory computer-readable storage media), together with arbitrary data generated and used in the implementation of the various embodiments disclosed herein. Such a plurality of computer-executable commands, for example, can be a part of an individual software application or a part of a software application that may be accessed or downloaded through a web browser or other software applications (such as a remote computation application). Such software, for example, can be executed in a single local computer (for example, as an agent that may be executed in an arbitrary and suitable commercially available computer) or in a network environment (for example, the internet, a wide area network, a local area network, a client server network (such as a cloud computation network), or other networks) by using one or more network computers.

For clarification, only various selected specific exemplary embodiments of various implementations based on software will be described. Other detailed respects that are well-known in the art will be omitted. For example, the technologies disclosed herein are not limited to a specific computer language or program. For example, the technologies disclosed herein can be executed by software described in C, C++, Java, or other arbitrary preferred programming languages. Similarly, the technologies disclosed herein are not limited to a specific computer or specific type hardware. Specific detailed respects of a preferred computer and preferred hardware are well-known, and will not be described in detail, herein.

Further, any of various embodiments based on such software (including a plurality of computer-executable commands, for example, for allowing a computer to execute any one of the various methods disclosed herein) can be uploaded, downloaded, or accessed remotely by preferred communication means. Such preferred communication means, for example, includes the internet, a world wide web, an intranet, software application, a cable (including an optical fiber cable), magnetic communication, electromagnetic communication (including RF communication, microwave communication, and infrared communication), electronic communication, or other communication means.

Hereinafter, various embodiments of the invention will be described with reference to the accompanying drawings. Note that, in the drawings, the same reference numerals are applied to the common constituents. In addition, it may be noted that constituents illustrated in a certain drawing are not illustrated in another drawing, for the sake of convenience of description. In addition, it may be noted that the accompanying drawings are not necessarily illustrated in the accurate scale.

1. Configuration of System 1000

FIG. 1 may be a block diagram illustrating an example of the configuration of a system 1000 according to one embodiment. As illustrated in FIG. 1, the system 1000, for example, may include a plurality of terminals 10 connected to a communication line (a communication network) that may not be illustrated, and one or a plurality of servers 20 connected to the communication line. The terminal 10 may include a first terminal 11 and a second terminal 12. In addition, the server 20, for example, may include a first server system 21 and a second server system 22.

The communication line may include a mobile phone network, a wireless network (for example, RF connection through Bluetooth, WiFi (such as IEEE 802.11a/b/n), WiMax, cellular, a satellite, laser, and an infrared ray), a fixed phone network, the internet, an intranet, a local area network (LAN), a wide area network (WAN), and/or an Ethernet network without being limited thereto.

1-1. Terminal 10

The terminal 10, for example, may be connected to one or the plurality of servers 20 through the communication line. The terminal 10, for example, may be a smart phone, a tablet device, and/or a personal computer. The terminal 10, for example, may be configured such that a predetermined application may be installed to be executable. In addition, the terminal 10 may be capable of receiving a web page (for example, a HTML document, in some examples, a HTML document in which an executable code such as JavaScript or a PHP code may be encoded) from the server 20 (the second server system 22).

Note that, hereinafter, a user manipulating the terminal 10 may be simply referred to as a user, a user manipulating the first terminal 11 may be referred to as a first user, and a user manipulating the second terminal 12 may be referred to as a second user. In addition, in FIG. 1, for example, an example may be illustrated in which the first terminal 11 and the second terminal 12 are provided as the plurality of terminals 10, but the disclosure is not limited thereto. The plurality of terminals 10, for example, may include three or more terminals. In addition, in the following description, the first terminal 11 and the second terminal 12 may be collectively referred to as the terminal 10.

1-2. Server 20

The first server system 21 may include a distribution server 21A1 and a server storage device 21A2. The distribution server 21A1, for example, may receive data that may be requested for an application executed in the terminal 10 from the terminal 10. In addition, the distribution server 21A1, for example, may transmit the data that may be used in the application executed in the terminal 10 to the terminal 10, in accordance with the request. The server storage device 21A2, for example, may store the data that may be transmitted to the terminal 10 from the distribution server 21A1. In addition, the server storage device 21A2, for example, may store the data that is received by the distribution server 21A1 from the terminal 10. In addition, the first server system 21, for example, may transmit the data that may be used in the application executed in the terminal 10 to the terminal 10.

Note that, an example has been described in which the terminal 10 executes the application, but the disclosure is not limited thereto. For example, processing equivalent to executing the application may be executed by using a web browser that may be installed in the terminal 10. As described above, in a case of using the web browser that may be installed in the terminal 10, for example, the server 20 may include a web server (not illustrated). In a case where the server 20 may include the web server (not illustrated), the web server may transmit data relevant to a HTML document such as HTML5, the terminal 10 may display the data relevant to the HTML document by using the web browser, user instruction data may be transmitted to the terminal 10 (the web browser), and the server 20 performs display control. The server 20 may perform the display control, and thus, may generate display data and may transmit the display data to the terminal 10 (the web browser). Note that, the display control may be performed by using a script such as JavaScript (Registered Trademark) in the web browser.

In addition, in FIG. 1, an example has been described in which the first server system 21 may include the distribution server 21A1 and the server storage device 21A2, but the disclosure is not limited thereto. For example, the first server system 21 may have other configurations in addition to the distribution server 21A1 and the server storage device 21A2. In such a case, the other configurations may have at least any one function of the distribution server 21A1 and the server storage device 21A2. In addition, for example, the first server system 21 may have a single configuration having the function of the distribution server 21A1 and the server storage device 21A2.

The second server system 22 may be a server that may transmit data relevant to a content to the terminal 10. Here, for example, a case may be assumed in which the user manipulates the terminal 10 to execute the application. In such a case, when the second server system 22 receives the request for the data relevant to the content from the terminal 10 during the execution of the application, the second server system 22 may transmit the data relevant to the content to the terminal 10. The data relevant to the content that may be transmitted to the terminal 10 from the second server system 22, for example, may be data relevant to a moving image.

2. Hardware Configuration of Each Device

Next, an example of a hardware configuration of each of the terminal 10 and the server 20 will be described.

2-1. Hardware Configuration of Terminal 10

Figure 2:
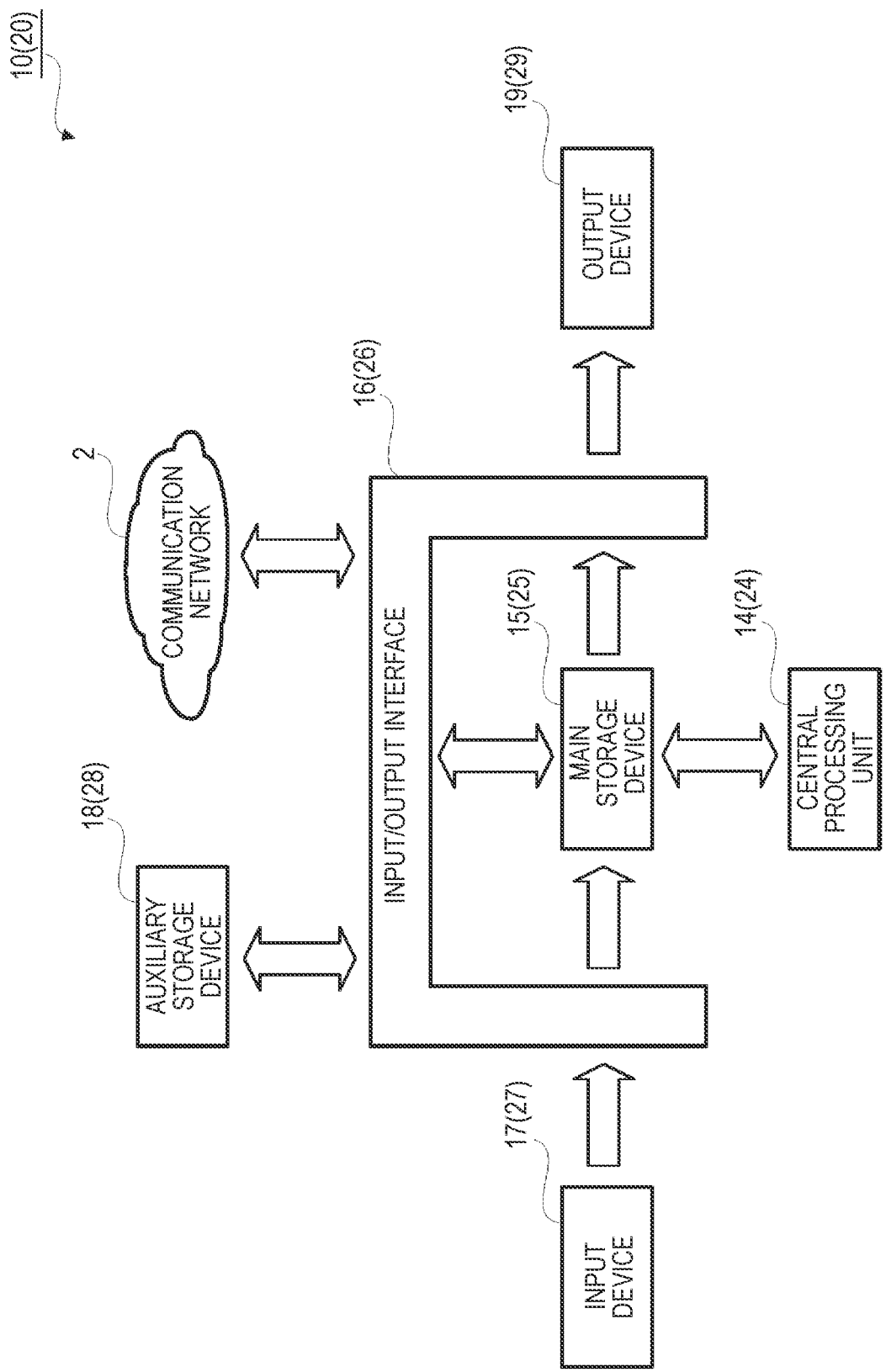
FIG. 2 is a block diagram illustrating an example of a configuration of a terminal 10 and a server 20 illustrated in FIG. 1.

A hardware configuration example of each of the terminals 10 will be described with reference to FIG. 2. FIG. 2 may be a block diagram illustrating an example of the hardware configuration of the terminal 10 (the server 20) illustrated in FIG. 1. Note that, in FIG. 2, reference numerals in parentheses are described in association with the server 20 as described below.

As illustrated in FIG. 2, each of the terminals 10, for example, may include a central processing unit 14, a main storage device 15, an input/output interface device 16, an input device 17, an auxiliary storage device 18, and an output device 19. The configurations illustrated in FIG. 2 may be connected to each other by a data bus and/or a control bus.

The central processing unit 14 may be referred to as a "CPU", may perform an arithmetic operation with respect to a command and data stored in the main storage device 15, and may store a result of the arithmetic operation in the main storage device 15. Further, the central processing unit 14 may be capable of controlling the input device 17, the auxiliary storage device 18, the output device 19, and the like through the input/output interface device 16. The terminal 10 may include one or more central processing units 14.

The main storage device 15 may be referred to as a "memory", and may store the command and the data received from the input device 17, the auxiliary storage device 18, and a communication line 30 (the server 20 or the like) through the input/output interface device 16, and the result of the arithmetic operation of the central processing unit 14. The main storage device 15 may include computer-readable media such as a volatile memory (for example, a register, a cash, and a random access memory (RAM)), a non-volatile memory (for example, a read only memory (ROM), EEPROM, and a flash memory), and a storage (for example, a hard disk drive (HDD), a solid state drive (SSD), a magnetic tape, and an optical medium) without being limited thereto. For easy understanding, a term such as a "computer-readable recording medium" may include a medium for data storage, such as a memory and a storage, but not a transmission medium for a modulated data signal, that is, a transitory signal.

The input device 17 may be a device to which data is imported from the outside, and may include a touch panel, a button, a keyboard, a mouse, and/or a sensor without being limited thereto. As described below, the sensor may include a sensor including one or more cameras and/or one or more microphones without being limited thereto.

The auxiliary storage device 18 may be a storage device having a capacity larger than that of the main storage device 15. The auxiliary storage device 18 may be capable of storing the specific application described above (such as an application for distributing a moving image and an application for viewing a moving image). The auxiliary storage device 18 may be capable of storing a command and data (a computer program) configuring a web browser application or the like. Further, the auxiliary storage device 18 may be controlled by the central processing unit 14, and thus, may be capable of transmitting the command and the data (the computer program) to the main storage device 15 through the input/output interface device 16. The auxiliary storage device 18 may include a magnetic disk device and/or an optical disk device without being limited thereto.

The output device 19 may include a display device, a touch panel, and/or a printer device without being limited thereto.

In such a hardware configuration, the central processing unit 14 may sequentially load the command and the data (the computer program) configuring the specific application stored in the auxiliary storage device 18 in the main storage device 15. The central processing unit 24 may perform an arithmetic operation with respect to the loaded command and data, and thus, may be capable of controlling the output device 19 through the input/output interface device 16 or may be capable of transmitting and receiving various data items with respect to other devices (for example, the server 20 and the other terminal 10) through the input/output interface device 16 and a communication line 2.

2-2. Hardware Configuration of Server 20

A hardware configuration example of each of the servers 20 will be also described with reference to FIG. 2. As the hardware configuration of each of the servers 20 (each of the distribution server 21A1 and the server storage device 21A2), for example, the same hardware configuration as that of each of the terminals 10 described above can be used. Therefore, reference numerals with respect to the constituents of each of the servers 20 may be described in parentheses in FIG. 2.

As illustrated in FIG. 2, each of the servers 20 may mainly include a central processing unit 24, a main storage device 25, an input/output interface device 26, an input device 27, an auxiliary storage device 28, and an output device 29. The devices may be connected to each other by a data bus and/or a control bus.

The central processing unit 24, the main storage device 25, the input/output interface device 26, the input device 27, the auxiliary storage device 28, and the output device 29 may be approximately the same as the central processing unit 14, the main storage device 15, the input/output interface device 16, the input device 17, the auxiliary storage device 18, and the output device 19, included in each of the terminals 10 described above, respectively.

In such a hardware configuration, the central processing unit 24 sequentially loads a command and data (a computer program) configuring a specific application stored in the auxiliary storage device 28 in the main storage device 25. The central processing unit 24 may perform an arithmetic operation with respect to the loaded command and data, and thus, may be capable of controlling the output device 29 through the input/output interface device 26 or may be capable of transmitting and receiving various data items with respect to other devices (for example, each of the terminals 10) through the input/output interface device 26 and the communication line 2.

Note that, the server 20 may include one or more microprocessors and/or one or more graphics processing units (GPU), instead of the central processing unit 24 or together with the central processing unit 24.

3. Function of Each of Devices

Next, an example of the function of each of the terminals 10 and the servers 20 will be described by using FIG. 3 and FIG. 4.

3-1. Function of Terminal 10

Figure 3:
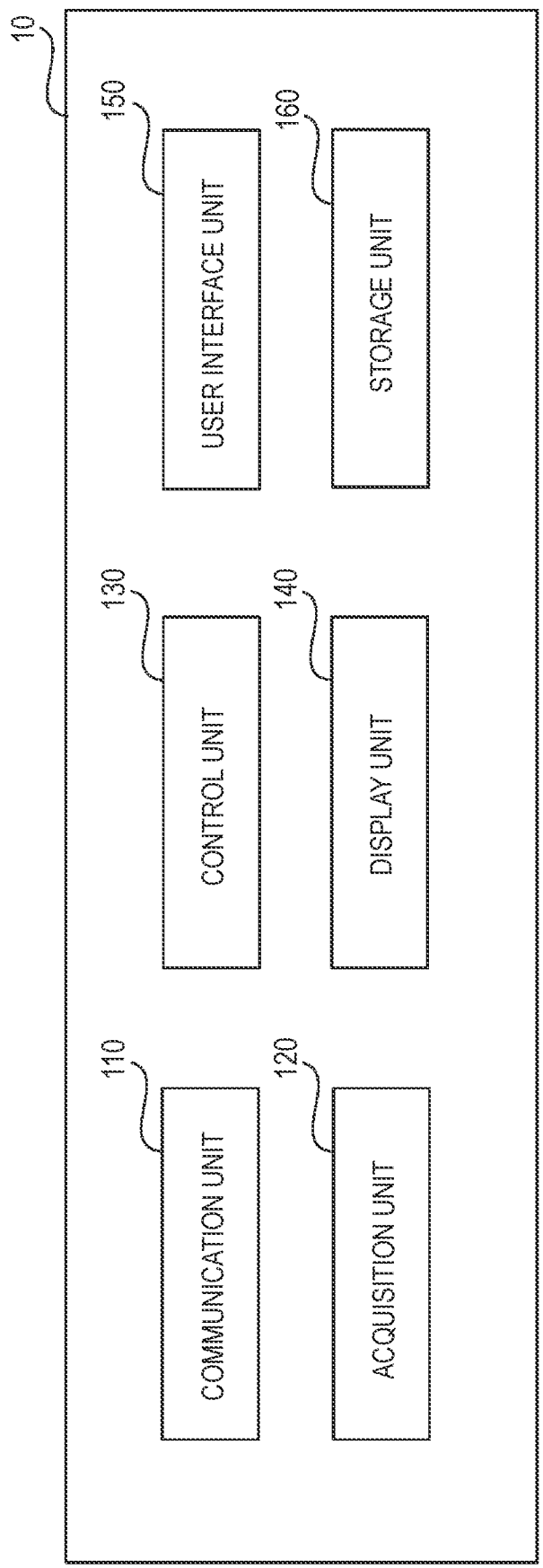
FIG. 3 is a block diagram illustrating an example of a function of the terminal 10 illustrated in FIG. 1.

FIG. 3 may be a block diagram illustrating an example of the function of the terminal 10 illustrated in FIG. 1. As illustrated in FIG. 3, the terminal 10, for example, may include a communication unit 110, an acquisition unit 120, a control unit 130, a display unit 140, a user interface unit 150, and a storage unit 160.

(1) Communication Unit 110

The communication unit 110, for example, may be used to transmit various data items to the server 20. In addition, the communication unit 110, for example, may be used to receive various data items from the server 20. The data received in the communication unit 110, for example, may be transmitted to the control unit 130.

(2) Acquisition Unit 120

The acquisition unit 120, for example, may acquire manipulation data relevant to a manipulation from the user. In addition, the acquisition unit 120, for example, may acquire data detected by various sensors. The data acquired in the acquisition unit 120, for example, may be transmitted to the control unit 130. The acquisition unit 120, for example, may perform the processing of S121 in FIG. 9, S122 in FIG. 9, S121 in FIG. 10, and S122 in FIG. 10, described below. For example, the manipulation data may include one or more of the following data items.

Data indicating how a distributor swipes a touch pad display

Data indicating which part of the touch pad display the distributor touches

Data indicating which object the distributor taps or clicks

Data indicating how the distributor drags the touch pad display

Other manipulation data items

Note that the data acquired by the acquisition unit 120 may be data relevant to non-manipulation (data indicating that there is no manipulation), and for example, may be data indicating that the terminal 10 has not been manipulated for a specific time (a specific period) and/or data indicating that there may be no entrance to a specific location in a virtual space 300.

Figure 6:
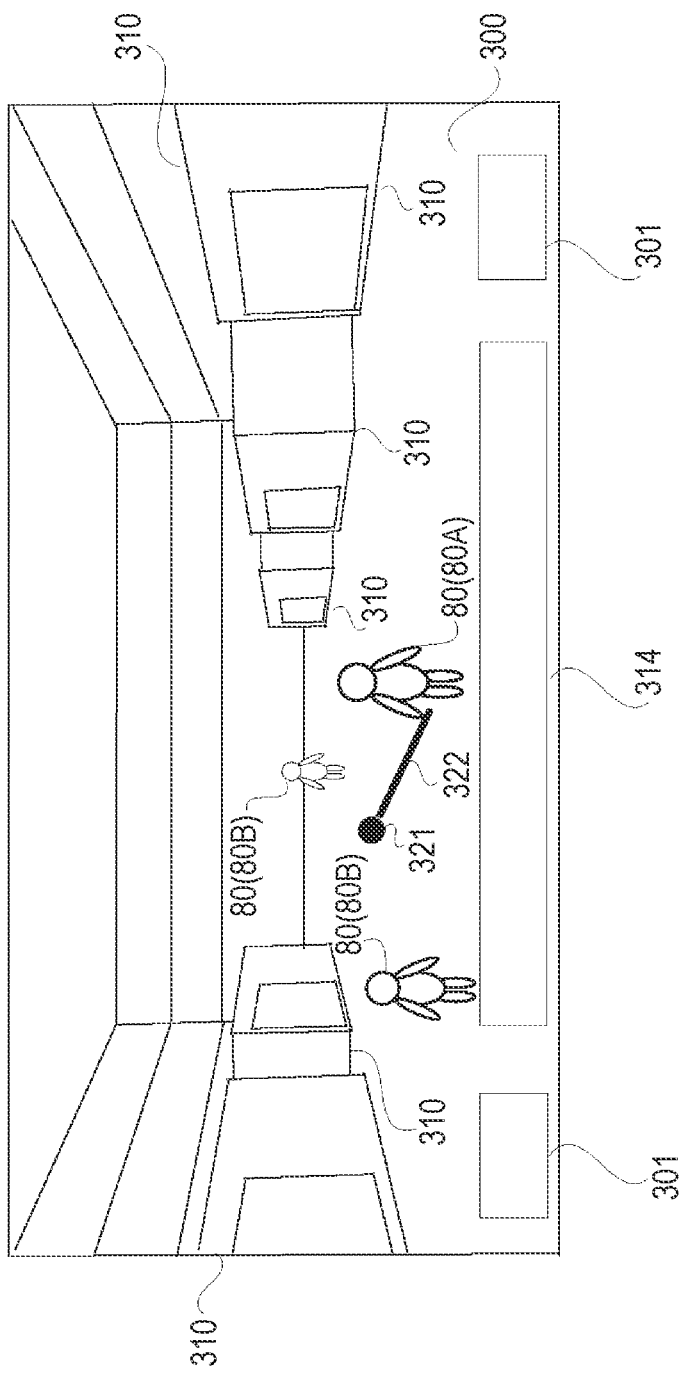
FIG. 6 is a diagram illustrating an example of the display screen displayed by the display unit 140 of a first terminal 11.
Figure 7:
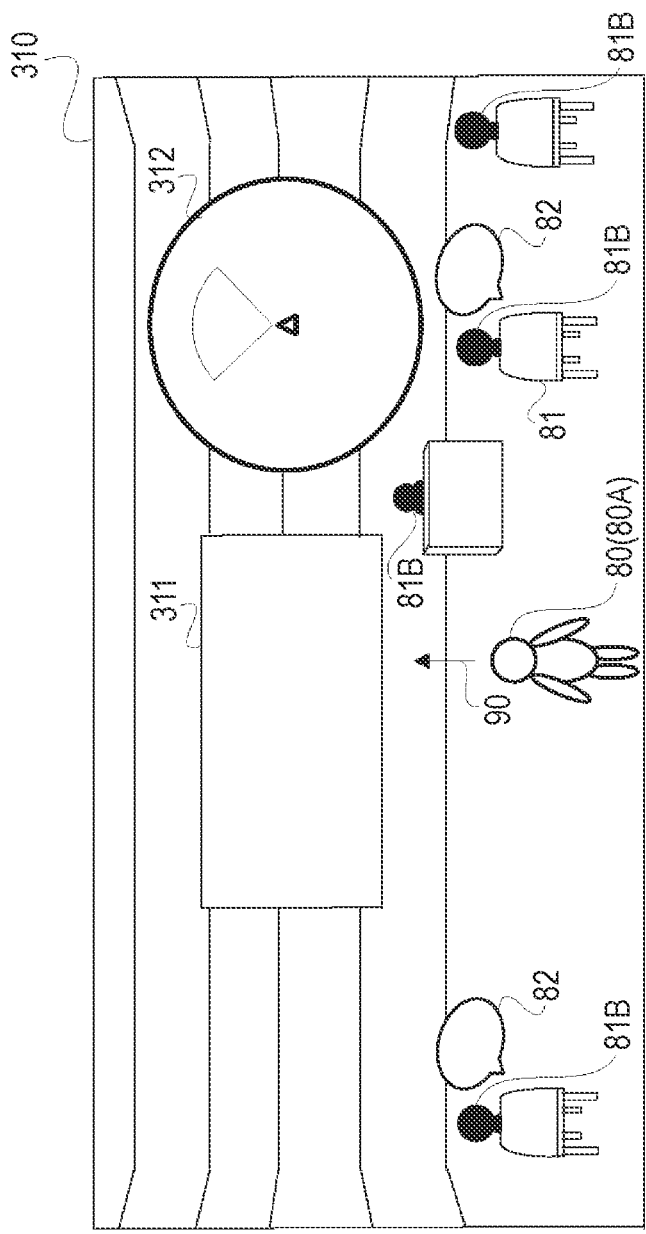
FIG. 7 is a diagram illustrating an example of the display screen displayed by the display unit 140 of the first terminal 11.
Figure 8:
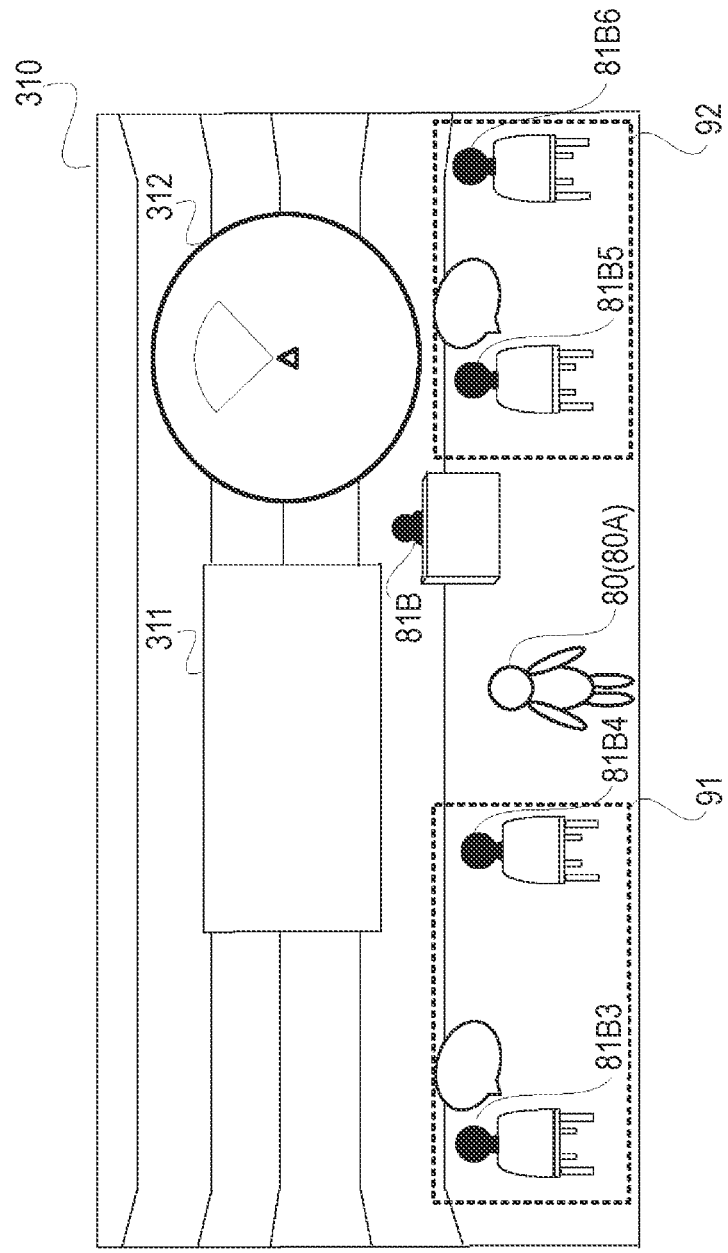
FIG. 8 is a diagram illustrating an example of the display screen displayed by the display unit 140 of the first terminal 11.

In addition, in the disclosure, display as illustrated in FIG. 6 to FIG. 8 described below may be performed by using a wearable device in addition to using the terminal 10 or instead of using the terminal 10. Here, the wearable device, for example, may include an augmented reality (AR) glass, a smart glass, a head mounted display (HMD), and the like. Note that, in a case where the wearable device described above may be an AR glass, for example, the AR glass may display a virtual display screen to overlap with the actual region, on the basis of data relevant to a position information, data to be obtained by reading a predetermined marker, and/or data for identifying a predetermined object existing in the space.

In a case of using such a wearable device, a user wearing the wearable device may perform a gesture and/or a motion relevant to a visual line, and thus, may be capable of moving and/or selecting a target on a display screen displayed by the wearable device. Here, the gesture, for example, may be a motion of moving the head of the user forward, backward, left, or right. In addition, the motion relevant to the visual line, for example, may be a motion that the user blinks or a motion for moving the eyes of the user up, down, left, or right. The target, for example, may be an avatar corresponding to the user. In a case where the target, for example, may be an avatar corresponding to the user, and the motion for moving the head of the user forward, backward, left, or right may be performed, the avatar may be moved forward, backward, left, or right, in accordance with the motion.

Note that in a case of moving and/or selecting the target on the display screen displayed by the wearable device, for example, a separate controller (not illustrated) may be provided. Here, the controller, for example, may include a touch pad (not illustrated). Accordingly, for example, the user may perform a touch manipulation on the touch pad, and thus, may be capable of moving and/or selecting the target on the display screen displayed by the wearable device. Here, the "touch manipulation", for example, may indicate at least any one manipulation of a tap, a double tap, a swipe, a flick, pinch-in, and pinch-out. In addition, the controller, for example, may include an acceleration sensor and/or a gyroscopic sensor. Accordingly, the target on the display screen displayed by the wearable device can be moved and/or selected on the basis of the tilt and/or the movement of the controller. The controller, for example, may be gripped and used by the user, or may be worn on the finger of the user.

(3) Control Unit 130

The control unit 130, for example, may perform various controls on the basis of the data received in the communication unit 110. In addition, the control unit 130 may perform various controls on the basis of the data acquired in the acquisition unit 120. The control unit 130, for example, may perform the processing of a part or all of S131 to S151 in FIG. 9 described below. In addition, the control unit 130, for example, may perform the processing of a part or all of S131 and S151 in FIG. 10 described below.

(4) Display Unit 140 The display unit 140, for example, may display display contents based on control data output from the control unit 130. The display unit 140, for example, may display a screen for selecting a predetermined application. In addition, the display unit 140, for example, may display a screen relevant to the virtual space in a case of selecting the predetermined application to execute the predetermined application.

(5) User Interface Unit 150

The user interface unit 150 may have a function for inputting various data items used in the execution of the application through the manipulation of the user.

(6) Storage Unit 160

The storage unit 160 may be capable of storing various data items used in the execution of the application. The storage unit 160, for example, may store data used to control the display unit 140. The storage unit 160, for example, may store module data used in the generation of the avatar of the user.

Note that the module data, for example, may be data relevant to parts for generating the avatar. Here, the parts for generating the avatar, for example, may include data of each of the parts of the avatar (eyes, a nose, a mouth, eyebrows, a skin color, a hair style, a hair color, clothes, a body, and the like). In addition, the module data may include data relevant to an ID that may be allocated corresponding to each of the parts for generating the avatar. Note that, in a case where the part of the avatar may be a body, the data relevant to the parts for generating the avatar may include subdivided data relevant to a body type such as a slim body, a slightly slim body, a standard body, a slightly fat body, and a fat body.

In addition, in a case where the display unit 140 may display an avatar 80 (an avatar of another person) other than a first avatar 80A, the server 20 may transmit ID data that may be used in the generation of the avatar 80 other than the first avatar 80A to the first terminal 11, and the first terminal 11 may construct the avatar 80 other than the first avatar 80A, on the basis of the ID data.

In addition, in a case where the display unit 140 may display the avatar 80 (the avatar of another person) other than the first avatar 80A, the display unit 140 may display the avatar 80 other than the first avatar 80A by coloring the avatar 80 with black, or may display the avatar 80 other than the first avatar 80A by using a part and/or a color to be decided on the basis of the gender (for example, male or female) of the user corresponding to the avatar 80 other than the first avatar 80A.

3-2. Function of Server 20

Figure 4:
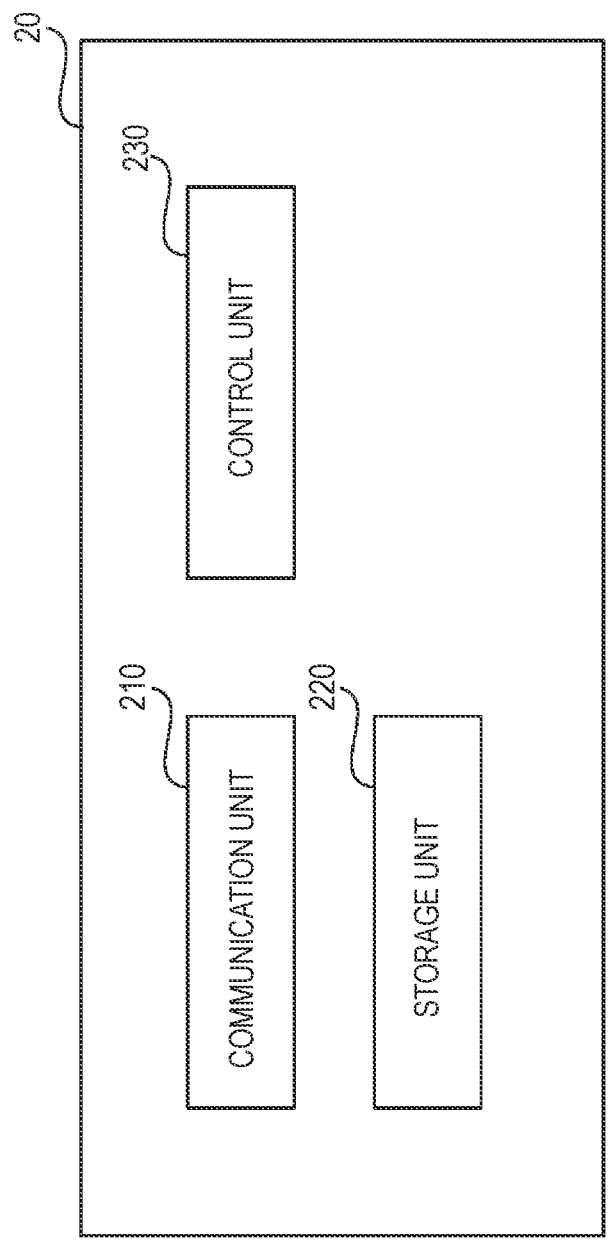
FIG. 4 is a block diagram illustrating an example of a function of the server 20 illustrated in FIG. 1.

FIG. 4 may be a block diagram illustrating an example of the function of the server 20 illustrated in FIG. 1. As illustrated in FIG. 4, the server 20, for example, may include a communication unit 210, a storage unit 220, and a control unit 230.

(1) Communication Unit 210

The communication unit 210, for example, may be used to transmit various data items to the terminal 10. In addition, the communication unit 210, for example, may be used to receive various data items from the terminal 10. The data received in the communication unit 210 may be transmitted to the control unit 230. The communication unit 210, for example, may receive second data from the second terminal 12 in FIG. 9 described below, and may transmit the second data to the first terminal 11 in FIG. 9 described below. The communication unit 210, for example, may receive the second data from the second terminal 12 in FIG. 10 described below, and may transmit the control data to the first terminal 11 in FIG. 10 described below.

(2) Storage Unit 220

The storage unit 220 may store various data items that may be used in the execution of the application. The storage unit 220, for example, may store the data transmitted from the second terminal 12.

(3) Control Unit 230

The control unit 230, for example, may perform various controls on the basis of the data received in the communication unit 210. The control unit 230, for example, may perform the processing of S141 in FIG. 10 described below.

Figure 5:
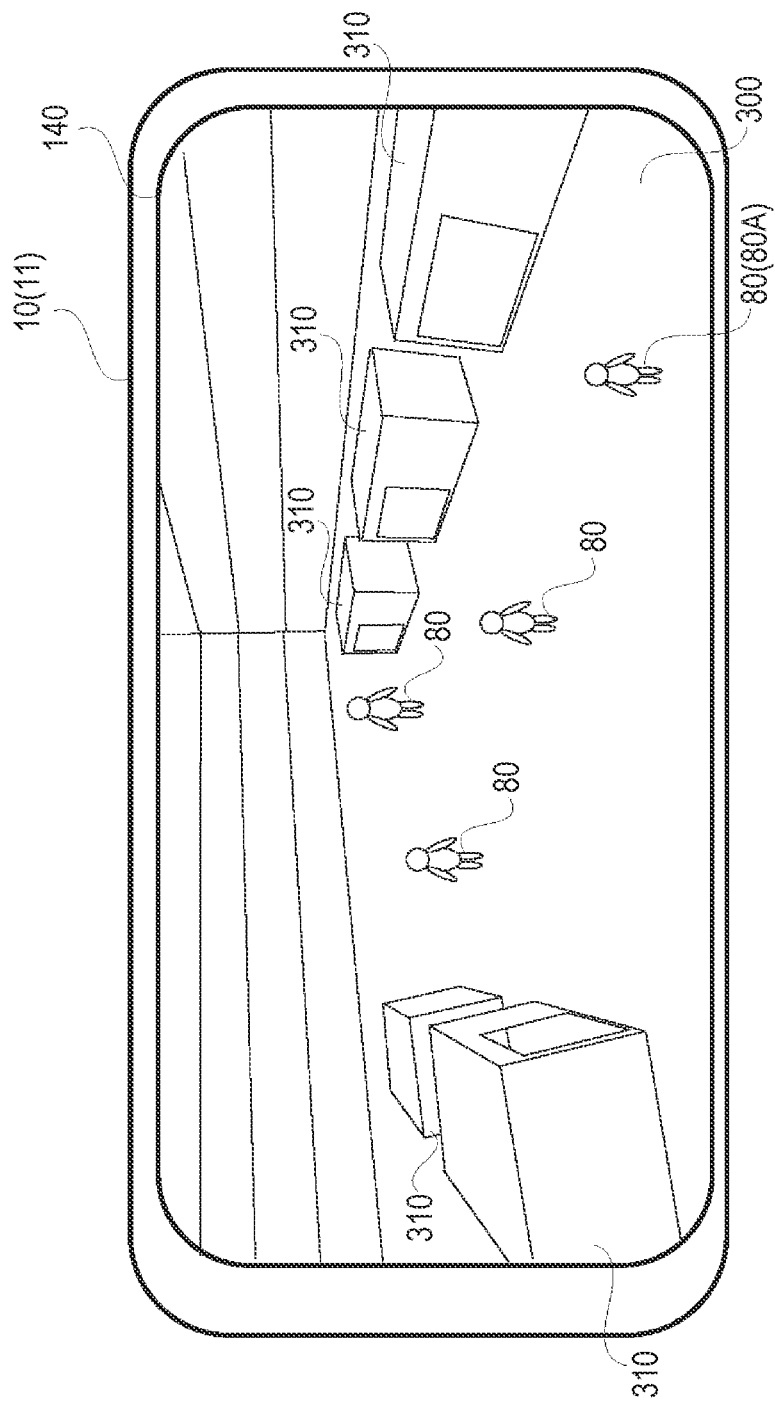
FIG. 5 is a diagram illustrating an example of a display screen displayed by a display unit 140 of the terminal 10.

FIG. 5 may be a diagram illustrating an example of a display screen displayed by the display unit 140 of the terminal 10. FIG. 5 may be a diagram illustrating a display example that may be displayed on the display unit 140 of the terminal 10 by manipulating the terminal 10 to activate the application. As illustrated in FIG. 5, the display unit 140 may display the virtual space 300. The virtual space 300, for example, may be a three-dimensional space. In the virtual space 300, the avatar 80 and a virtual venue 310 may be represented.

The avatar 80, for example, may be configured such that at least any one of walking, running, and jumping can be performed in the virtual space 300 in accordance with the manipulation of the user. In addition, the avatar 80, for example, may be configured such that either examining a virtual object or taking a seat on the virtual object can be performed in accordance with the manipulation of the user.

Here, the virtual object, for example, an object corresponding to the avatar 80, a door, a chair, and the like. Note that, in a case where the user manipulates the avatar 80 by using the terminal 10, data relevant to the manipulation may be transmitted to the server 20.

Note that, at least any one avatar 80 of a plurality of avatars 80 displayed on the display unit 140 may motion on the basis of the manipulation of the user, or may motion on the basis of a motion decided in advance. Here, a case where the avatar 80 motions on the basis of the motion decided in advance may indicate that the avatar 80 motions as a non player character (NPC).

In addition, all display modes of the avatar 80 illustrated in FIG. 5 may be the same, but may not be limited thereto. The display mode of the avatar 80 may be decided on the basis of data relevant to the user manipulating the avatar 80 or data relevant to an ID associated with the part of the avatar 80 selected by the user. Here, the "display mode of the avatar 80" may be the shape and/or the color of the avatar 80.

In addition, the motion of the avatar in the virtual space may be changed in tandem with the motion of the user. For example, in a case where the user may perform a nodding motion, the avatar in the virtual space may also perform the nodding motion. Here, motion data, for example, can be acquired by using a motion capture system. For easy understanding of a person skilled in the art who takes the advantage of the disclosure, a suitable motion capture system in several examples that can be used together with the devices and the methods disclosed in this application may include an optical motion capture system using a passive marker or an active marker or not using a marker, and an inertial and magnetic non-optical system. The motion data can be acquired by using an image capture device (such as a charge-coupled device (CCD) or a complementary metal oxide semiconductor (CMOS) image sensor) combined with a computer that converts the motion data into a moving image or other image data items.

In a case where the first avatar 80A illustrated in FIG. 5 may be manipulated, for example, the display unit 140 of the first terminal 11 may display a screen as illustrated in FIG. 6.

FIG. 6 may be a diagram illustrating an example of the display screen displayed by the display unit 140 of the first terminal 11. As illustrated in FIG. 6, the display unit 140 may display the virtual space 300. Specifically, for example, the display unit 140 may display the avatar 80 and the virtual venue 310 existing in the virtual space 300. Note that, hereinafter, a case where it may be simply described as the "control unit 130" may indicate the "control unit 130 of the first terminal 11", and a case where it may be simply described as the "display unit 140" may indicate the "display unit 140 of the first terminal 11".

The avatar 80, for example, may include the first avatar 80A and a second avatar 80B. The first avatar 80A, for example, may be the avatar manipulated by the first user of the first terminal 11 displaying the virtual space 300 illustrated in FIG. 6. The second avatar 80B, for example, may be an avatar manipulated by a user different from the first user. The display unit 140 may display the back of the first avatar 80A, and the visual line of the first user manipulating the first terminal 11 and the visual line of the first avatar 80A corresponding to the first user may be in the same direction.

The display unit 140, for example, may display a region in the virtual space including the first avatar 80A on the basis of a virtual viewpoint positioned in a direction near the paper plane of FIG. 6 from the first avatar 80A. The display unit 140, for example, may display a region including a traveling direction of the first avatar 80A in the virtual space 300. That is, a region corresponding to a visual line direction (the eyesight) of the first avatar 80A may be displayed on the display unit 140. The traveling direction (the visual line direction) of the first avatar 80A will be described below. Note that, the display unit 140 may display a predetermined region in the virtual space 300, on the basis of the motion of the first avatar 80A. For example, in a case where the traveling direction of the first avatar 80A may be changed by 180 degrees, the display unit 140 may display the virtual object or the like behind the first avatar 80A in FIG. 6, instead of the display in FIG. 6. As described above, the display unit 140 may display a region other than the region illustrated in FIG. 6, on the basis of the motion of the first avatar 80A.

In a case where the user manipulating the first terminal 11 manipulates the first avatar 80A, and the first avatar 80A illustrated in FIG. 6 may be positioned inside the virtual venue 310, the display unit 140, for example, may display a display screen in FIG. 7. Note that, a condition for the display unit 140 to display the display screen in FIG. 7 may not be limited to the fact that the first avatar 80A illustrated in FIG. 6 may be positioned inside the virtual venue 310. For example, in a case where the first user activates the application described in the disclosure by using the first terminal 11, and the first user may perform a manipulation for displaying the display screen as illustrated in FIG. 7 by using the first terminal 11, the display unit 140 may display the display screen in FIG. 7.

Note that, in FIG. 6, in a case where the first avatar 80A may be manipulated by the first user, the first terminal 11, for example, may acquire data relevant to the position of the first avatar 80A in the virtual space 300. Note that a timing when the first terminal 11 may acquire the data relevant to the position of the first avatar 80A in the virtual space 300 may be an arbitrary timing. In addition, the first terminal 11 may transmit the data to the server 20. In addition, a timing when the first terminal 11 may transmit the data to the server 20 may be an arbitrary timing.

In addition, the first terminal 11 may be configured such that the touch manipulation can be performed with respect to an arbitrary region on the display unit 140 of the first terminal 11. In addition, in a case where the first terminal 11 may include an acceleration sensor (not illustrated), and the first terminal 11 may be operated, a display region and/or a direction displayed by the display unit 140 can be changed on the basis of the acceleration sensor. Here, the "arbitrary region" described above, for example, may include a region 301 and/or a region 314 in FIG. 6. The region 301 and/or the region 314 may be a manipulation user interface for performing predetermined display control by the touch manipulation. In addition, the "touch manipulation", for example, may indicate at least any one manipulation of a tap, a double tap, a swipe, a flick, pinch-in, and pinch-out. In addition, two regions 301 may be provided as illustrated in FIG. 6, or one or three or more regions 301 may be provided. Note that, in a case where two or more regions 301 may be provided, one region 301, for example, corresponds to a region that may be used for the first avatar 80A to walk, and the other region 301, for example, corresponds to a region that may be used for the first avatar 80A to walk. In addition, the region 301 and/or the region 314 may be displayed in the same position or different positions not only in a case where the display in FIG. 6 may be performed but also in a case where display in other drawings (for example, FIG. 7 and/or FIG. 8) described below may be performed.

In addition, the first terminal 11 may be configured such that the first user may be capable of allowing the first avatar 80A to jump and/or walk by performing the touch manipulation with respect to the display unit 140. Here, the touch manipulation for the first avatar 80A to jump, for example, may be a manipulation for tapping or double-tapping any one region of the first avatar 80A or the region 301. In such a case, when performing a manipulation for tapping or double-tapping an arbitrary point, the display unit 140 may display a line segment connecting the first avatar 80A and the arbitrary point in an arbitrary color, and the first avatar 80A may walk to the arbitrary point along the line segment. In addition, the touch manipulation for the first avatar 80A to walk may be a manipulation for tapping or double-tapping an arbitrary point. In such a case, when performing the manipulation for tapping or double-tapping the arbitrary point, the display unit 140 may display a line segment connecting the first avatar 80A and the arbitrary point in an arbitrary color, and the first avatar 80A may walk to the arbitrary point along the line segment. In addition, the touch manipulation for the first avatar 80A to walk may be a manipulation for tapping or double-tapping an arbitrary point on a virtual straight line in the traveling direction after the traveling direction may be changed by performing a manipulation for flicking any one region of the first avatar 80A.

In addition, the first terminal 11 may be configured such that the first user may be capable of chatting with a user corresponding to at least one avatar 80 of all the avatars 80 through the region 314 on the display unit 140. Here, the region 314 may be a region displaying a message that may be input by the user corresponding to the avatar through the terminal 10, and for example, may be a rectangular frame. The display unit 140, for example, may display a message included in message data transmitted from the second terminal 12 on the region 314. In addition, the user chatting with the first user may be an individual user or exhibitors.

A condition for displaying the region 314 on the display unit 140, for example, may be a case where the avatar 80 may be positioned in the virtual venue 310, but may be not limited thereto. For example, in a case where the avatar 80 may be positioned in a predetermined region in the virtual space 300, a display region corresponding to the predetermined region may be displayed on the display unit 140. That is, the display region displayed on the display unit 140 may be decided in accordance with a position in which the avatar 80 exists. Accordingly, for example, the first terminal 11 may be configured such that the first user may be capable of chatting with users corresponding to all the avatars 80 existing in the predetermined region (in the same region) through the region 314 on the display unit 140. Therefore, the user may be capable of exchanging the message with a user corresponding to the other avatar 80 existing in the same region as the region in which the own avatar 80 exists. In addition, the user may be capable of chatting with a user having a specific attribute. Therefore, the user may be capable of easily communicating with the other user having the common interest, concern, and/or attribute.

In addition, in a case where the display unit 140 displays a plurality of messages in the region 314, but all the messages are not capable of being displayed in the region 314, the display unit 140 may display the messages that are not displayed in the region 314 by the user performing the touch manipulation. Here, the touch manipulation in a case where all the messages are not capable of being displayed in the region 314, for example, may be a swipe. Accordingly, it may be possible to reduce a possibility that the user misses the message displayed in the region 314.

In addition, in a case where the display unit 140 displays at least one message in the region 314, and then, may display a new message, the new message may be displayed in the region 314 in priority to the at least one message. In addition, in a case where the display unit 140 displays the message in the region 314, a time when message data relevant to a time in which the message is transmitted may be displayed, together with the message. Accordingly, it may be possible to reduce a possibility that the user misses the message displayed in the region 314.

FIG. 7 may be a diagram illustrating an example of the display screen displayed by the display unit 140 of the first terminal 11. As illustrated in FIG. 7, the virtual venue 310 may be an example of venues provided in the virtual space 300. As illustrated in FIG. 7, the display unit 140 may display the virtual venue 310. In the virtual venue 310, for example, the first avatar 80A, a chair 81, a virtual object 81B, a speech balloon 82 (a first display region), a display region 311, and a display region 312 may be provided.

Note that, a URL when a display screen in a case where the first avatar 80A exists outside (for example, FIG. 6) the virtual venue 310 being displayed by using the web browser of the first terminal 11 may be different from a URL when a display screen in a case where the first avatar 80A exists inside (for example, FIG. 7) the virtual venue 310 being displayed by using the web browser of the first terminal 11. Therefore, in a case of using the web browser of the first terminal 11, and the first avatar 80A illustrated in FIG. 6 may be positioned inside the virtual venue 310, the URL may be changed.

The first avatar 80A, for example, may be an avatar manipulated by the first user using the first terminal 11. The first user may be capable of moving the first avatar 80A in the virtual venue 310 by using the first terminal 11. The control unit 130 may control the display unit 140 on the basis of the manipulation data for moving the first avatar 80A in the virtual venue 310.

The chair 81 may be a virtual object on which the avatar 80 and/or the virtual object 81B are capable of taking a seat. For example, a plurality of chairs 81 may be provided. In a case where the first user manipulates the first avatar 80A to approach a specific chair of one or a plurality of chairs and may perform a predetermined manipulation, the display unit 140 may display a message for asking whether or not to sit on the specific chair. In a case where the display unit 140 displays the message for asking whether or not to sit on the specific chair, the first user may perform a predetermined manipulation indicating an intention to sit on the specific chair with respect to the message by using the first terminal 11, and the display unit 140 may display that the first avatar 80A takes a seat on any one chair of the plurality of chairs. Note that a configuration may be adopted in which the avatar 80 takes a seat in a case of designating a specific location in the virtual space 300 together with the virtual object on which the avatar may be capable of taking a seat or instead of the virtual object on which the avatar may be capable of taking a seat. In such a case, by performing a predetermined manipulation for the avatar to approach the specific location in the virtual space 300, a message for asking whether or not to sit in the specific location may be displayed on the display screen of the first terminal 11. In a case where the message for asking whether or not to sit in the specific location may be displayed on the display screen of the first terminal 11, the user may manipulate the terminal 10 to perform a predetermined manipulation indicating an intention to sit in the specific location with respect to the message, and the avatar 80 may sit in the specific location.

The virtual object 81B may be a virtual object corresponding to the second avatar 80B. The virtual object 81B corresponding to the second avatar 80B, for example, may be drawn on the basis of data less than data used in the drawing of the second avatar 80B. In a case where the display unit 140 displays a plurality of virtual objects 81B, each of the plurality of virtual objects 81B, for example, may have approximately the same shape and/or color. The color of the virtual object 81B, for example, may be black. As described above, by using the virtual object corresponding to the avatar 80, a load on the simultaneous drawing of a plurality of people can be reduced by a simple expression, and for example, the drawing can be viewed even on a terminal such as a smart phone. Note that, in FIG. 7, a case may be illustrated in which four virtual objects 81B may be provided, but the number of virtual objects 81B may be not limited to 4. In addition, the display unit 140 may display the plurality of virtual objects 81B in different forms, respectively. Here, the "different forms" described above, for example, indicate that the corresponding virtual object 81B may be generated on the basis of the part of the avatar stored in the storage unit 160 of the first terminal 11. Here, in a case where the plurality of virtual objects 81B may be displayed in the different forms, respectively, a load may increase, compared to a case where each of the plurality of virtual objects 81B may be displayed in the same form. On the other hand, in a case where the plurality of virtual objects 81B may be displayed in the different forms, respectively, a processing load on the drawing can be reduced, compared to a case of displaying the second avatar 80B, and each of the virtual objects 81B may be easily identified, compared to a case where the plurality of virtual objects 81B may be displayed in the same form.

The display region 311 may be a region for displaying a predetermined content. The predetermined content, for example, may be a moving image, but may not be limited thereto. The display region 312 may indicate a direction to which the first avatar 80A may be directed. A direction from a triangular object toward the sectoral object illustrated inside the display region 312 corresponds to the direction to which the first avatar 80A may be directed. The first user may change the direction of the first avatar 80A by using the first terminal 11, and the display unit 140 may perform the display by changing the direction of the sectoral object inside the display region 312. Accordingly, the first user may be easily specifying the direction to which the first avatar 80A may be directed.

The direction to which the first avatar 80A may be directed, for example, may be the traveling direction (the visual line direction) of the first avatar 80A in the virtual space 300 displayed by the display unit 140. The direction to which the first avatar 80A may be directed, for example, may be a direction from the first avatar 80A toward the display region 311 in FIG. 7, and for example, may be an arrow direction (an arrow 90) illustrated in FIG. 7. The direction to which the first avatar 80A may be directed, for example, can be changed by manipulating the first avatar 80A. For example, in a case of performing a manipulation for changing the direction of the first avatar 80A by 180 degrees in FIG. 7, the display unit 140 may change the display in accordance with the manipulation, and the direction to which the first avatar 80A may be directed may be changed to a direction on the opposite side (the root side) of the arrow direction illustrated in FIG. 7.

At a predetermined time, the predetermined content may be reproduced in the display region 311. Here, the time used in the virtual space may be a time synchronized to be identical to the actual time, or may be a time used in the virtual space 300 separately from the actual time. Note that a condition for reproducing a moving image in the display region 311 may be regardless of the time. For example, the condition for reproducing the moving image in the display region 311, for example, may be that the first avatar 80A takes a seat (sits down) in a predetermined position in the virtual venue 310.

Here, by displaying the region 314 in FIG. 7, it may be possible to communicate with the other user through the region 314 while viewing the content displayed in the region 311. In a case where the contents of a message of the other user displayed in the region 314 may be relevant to the content displayed in the region 311, the first user may exchange the message with the other user, and even in a case where the first user may be physically far from the other user, it may be possible to make the first user feel like viewing the content displayed in the region 314 together with the other user.

In FIG. 7, in a case where the first terminal 11 may receive the second data from the server 20, the display unit 140 of the first terminal 11 may perform the display based on the second data. The second data, for example, may include at least any one of position data of the second avatar 80B in the virtual venue 310 and manipulation data input to the terminal 10 corresponding to the second avatar 80B. Here, the position data may be used in the decision of a position in the virtual venue 310 displaying the virtual object 81B corresponding to the second avatar 80B. Note that, a specific example of the manipulation data will be described below.

In a case where the manipulation data included in the second data includes data relevant to a message input to the second terminal 12, the display unit 140 of the first terminal 11 may display the speech balloon 82 and a message included in the speech balloon 82. The speech balloon 82 may be displayed around the virtual object 81B corresponding to the terminal 10 that has transmitted the message data. The display unit 140 may display the message included in the message data in the speech balloon 82. Accordingly, a correspondence relationship between the speech balloon 82 and the user manipulating the terminal 10 that has transmitted the message data may be clarified. Therefore, the first user may be capable of recognizing the user who has transmitted the message included in the speech balloon 82.

Note that, in a case of displaying at least one virtual object 81B and at least one speech balloon 82, and any one virtual object 81B and any one speech balloon 82 overlap with each other, the display unit 140 may display the virtual object 81B and the speech balloon 82 not to overlap with each other by changing a display position of the virtual object 81B and/or the speech balloon 82. Accordingly, it may be possible to reduce a possibility that the visibility of the display unit 140 may be degraded.

In addition, in a case where the at least one virtual object 81B and the at least one speech balloon 82 may be displayed, and any one virtual object 81B and any one speech balloon 82 overlap with each other, the display unit 140 may display the virtual object 81B and the speech balloon not to overlap with each other by making display timings of the virtual object 81B and the speech balloon 82 different from each other. Accordingly, it may be possible to reduce a possibility that the visibility of the display unit 140 may be degraded.

In addition, in a case of displaying the plurality of virtual objects 81B, and the display positions of the plurality of virtual objects 81B overlap with each other, the display unit 140 of the first terminal 11 may display the plurality of virtual objects 81B by making the display positions of the speech balloons 82 corresponding to each of the plurality of virtual objects 81B different from each other. Accordingly, in a case where the display unit 140 of the first terminal 11 displays the plurality of virtual objects 81B in approximately the same position in the virtual venue 310, the display unit 140 of the first terminal 11 may display a plurality of speech balloons 82 by making the positions of the plurality of speech balloons 82 different from each other. Accordingly, it may be possible to reduce a possibility that the visibility of the display unit 140 may be degraded.

In addition, the display unit 140 may change a display method in accordance with whether or not a distance between an arbitrary position in the virtual space and the virtual object 81B is a predetermined value or more. For example, in a case where the distance between the arbitrary position in the virtual space 300 and the virtual object 81B is less than the predetermined value, the display unit 140 may display the message of the message data transmitted from the terminal 10 of the user corresponding to the virtual object 81B around the virtual object 81B. In addition, in a case where the distance between the arbitrary position in the virtual space 300 and the virtual object 81B is the predetermined value or more, the display unit 140 may display the effect that the data relevant to the message is transmitted from the terminal 10 of the user corresponding to the virtual object 81B, around the virtual object 81B. Here, the "arbitrary position" described above, for example, may be the position of the first avatar 80A existing in the virtual space 300. Accordingly, in a case where the message data is transmitted from the terminal of the user corresponding to the second avatar 80B corresponding to the virtual object 81B, the display unit 140 may be capable of performing display for specifying the virtual object 81B corresponding to the message even when the message corresponding to the message data may not be visible for the first user through the display unit 140. Therefore, the first user may be capable of specifying the virtual object 81B corresponding to the message.

In addition, in a case where the manipulation data included in the second data includes data for designating at least one color that may be applied to the virtual object 81B, the display unit 140 of the first terminal 11 may display the virtual object 81B of which the skin may be changed on the basis of the designation. In addition, the manipulation data included in the second data may include data for designating at least one color and/or shape that may be applied to the speech balloon 82 positioned around the virtual object 81B, the display unit 140 of the first terminal 11 may display the speech balloon 82 on the basis of the designation. Accordingly, the first user may be capable of recognizing that a predetermined virtual object 81B is different from the other virtual objects 81B.

In addition, in a case where the manipulation data included in the second data may include data for designating the motion of the virtual object 81B, the display unit 140 may perform display for changing the motion of the virtual object 81B over time (emote display) on the basis of the position data included in the second data and the manipulation data included in the second data. Accordingly, the display unit 140 may be capable of performing display in various modes.

In addition, the display unit 140 may display the region 314 as illustrated in FIG. 6. The region 314, for example, may display the message included in the message data transmitted from the terminal 10 of the user manipulating the first avatar 80A, and the region 314, for example, may display the message included in the message data transmitted from the terminal 10 of the user manipulating the second avatar 80B.

In addition, the display unit 140, for example, may display the virtual object 81B such that the region 314 does not overlap with other regions. Here, the "other regions", for example, may be the region of the second avatar 80B, the virtual object 81B, and/or the speech balloon 82. Accordingly, it may be possible to reduce a possibility that visibility in a case of checking the display in the region 314 may be degraded.

In addition, after the display unit 140 may display the message in the message data transmitted from the terminal 10 of the user corresponding to the virtual object 81B in the region 314 at a first time, the message may be continuously displayed in the region 314 regardless of the lapse of time. In addition, for example, after the message may be displayed in the region 314 at the first time, the message may not be displayed in the region 314 when a predetermined time may have elapsed. In addition, for example, in a case where at least another message may be displayed in the region 314 later than the first time after the message may be displayed in the region 314 at the first time, the message displayed in the region 314 at the first time may be hidden.

In addition, in a case where the display unit 140 may display the region 314 and the users chat with each other, a user ID and the avatar 80 in the chat may be associated with each other, or may not be associated with each other.

FIG. 8 may be a diagram illustrating an example of the display screen displayed by the display unit 140 of the first terminal 11. FIG. 8 illustrates the contents that may be displayed by the display unit 140 of the first terminal 11 in a case where the first terminal 11 receives the second data transmitted from the terminal 10 of the user manipulating each of a plurality of second avatars. Here, the second data may include attribute data relevant to the attribute of each of the plurality of second avatars. A position in which the virtual object 81B corresponding to each of the plurality of second avatars 80B may be displayed may be decided on the basis of each of the attribute data items. Here, for example, in a case where a plurality of groups are defined in the virtual space 300, the attribute data, for example, may be data for specifying which of the plurality of groups each of the avatar 80B belongs to. In a case where a presentation meeting is performed in the virtual space 300, the plurality of groups, for example, may include a group performing the presentation meeting and a group attending the presentation meeting. In addition, in a case where a match-up game is performed in the virtual space 300, the plurality of groups, for example, may include one group and the other group fighting with the one group. In addition, in a case where two support targets exist in the display region 311, the plurality of groups, for example, may include one group supporting one support target and the other group supporting the other support target. In the following description, a case where the plurality of second avatars, for example, may include a third avatar, a fourth avatar, a fifth avatar, and a sixth avatar, and a case where the third avatar and the fourth avatar belong to one group and the fifth avatar and the sixth avatar belong to the other group will be described as an example.

Here, in a case where the plurality of second avatars include the third avatar and the fourth avatar, and attribute data relevant to the third avatar and attribute data relevant to the fourth avatar may be the same attribute data (first attribute data), the display unit 140 of the first terminal 11 may display a virtual object 81B3 corresponding to the third avatar and a virtual object 81B4 corresponding to the fourth avatar in a second region 91 in the virtual venue 310. Therefore, even in a case where the position of the third avatar in the virtual venue 310 may be other than the second region 91, the display unit 140 may display the virtual object 81B3 in the second region 91 in the virtual venue 310. In addition, even in a case where the position of the fourth avatar in the virtual venue 310 may be other than the second region 91, the display unit 140 may display the virtual object 81B4 in the second region 91 in the virtual venue 310.

In addition, in a case where the plurality of second avatars include the fifth avatar and the sixth avatar, and attribute data relevant to the fifth avatar and attribute data relevant to the sixth avatar may be the same attribute data (second attribute data), the control data for controlling the display unit 140 of the first terminal 11 may include data for controlling the display unit such that a virtual object 81B5 corresponding to the fifth avatar and a virtual object 81B6 corresponding to the sixth avatar may be displayed in a third region 92 in the virtual venue 310. Therefore, even in a case where the position of the fifth avatar in the virtual venue 310 is other than the third region 92, the display unit 140 may display the virtual object 81B5 in the third region 92 in the virtual venue 310. In addition, even in a case where the position of the sixth avatar in the virtual venue 310 is other than the third region 92, the display unit 140 may display the virtual object 81B5 in the third region 92 in the virtual venue 310. Note that, the second region 91 and the third region 92, for example, may be regions not overlapping with each other.

As described above, in a case where the first terminal 11 receives the first attribute data relevant to the third avatar, the first attribute data relevant to the fourth avatar, the second attribute data relevant to the fifth avatar, and the second attribute data relevant to the sixth avatar, the display unit 140 of the first terminal 11, for example, may perform the display in FIG. 8. Therefore, in the plurality of avatars, the avatars having the same attribute may be arranged to be close to each other in the virtual venue 310. Accordingly, the avatars having the same attribute can be easily specified, and communication such as a chat may be likely to be performed. The first user manipulating the first terminal 11 may be capable of easily specifying the number of avatars having the same attribute, in the plurality of avatars existing in the virtual venue 310.

Note that, the number of second avatars may not be limited to 4 including the third avatar, the fourth avatar, the fifth avatar, and the sixth avatar. The number of second avatars, for example, may be 2 or 3, or may be 5 or more.

In addition, the type of attribute data may not be limited to an example in which there may be two types of attribute data items including the first attribute data and the second attribute data. The type of attribute data, for example, may be three types. An independent region in the virtual venue 310 may be allocated corresponding to the type of attribute data. For example, in a case where there are three types of attribute data items, one region in the virtual venue 310 may be allocated corresponding to each of the attribute data items. Therefore, in a case where there are three types of attribute data items, three independent regions may be allocated in the virtual venue 310.

In addition, the server 20 may transmit data relevant to at least any one of the number of simultaneous connections, the user, and the attribute of an event to the first terminal 11. Then, the first terminal 11 may receive the data, and may decide the total number of avatars 80 displayed by the display unit 140, in consideration of drawing performance.

Accordingly, even in a case where the first terminal 11 does not have the advanced performance, the first terminal 11 may be capable of drawing the avatar 80 such that the first user manipulating the first avatar 80A can feel the synchronization in the range of the performance of the first terminal 11. In addition, the first terminal 11 decides the total number of avatars 80 as described above, in consideration of at least any one of the number of vertices of the mesh, the material, and the number of textures of a 3D model that can be drawn.

In addition, in FIG. 7 and FIG. 8, the display unit 140 may simultaneously display the speech balloon 82 and the message displayed in the speech balloon 82, or may display the speech balloon 82 prior to the message displayed in the speech balloon 82. In addition, the display unit 140 may hide the message included in the speech balloon 82 when a predetermined time may have elapsed after the message included in the speech balloon 82 may be displayed. As described above, the display unit 140 may display the speech balloon 82 prior to the message, and thus, it may be possible to inform the user that the message will be displayed afterward. Therefore, it may be possible to prevent the user from missing the message.

In addition, in FIG. 7 and FIG. 8, the display unit 140 may hide the virtual object 81B when a predetermined time may have elapsed after the virtual object 81B may be displayed. Accordingly, the display unit 140 may hide the virtual object 81B included in the control data that may be received by the first terminal 11 from the server 20 at a timing relatively far from the current time, whereas the display unit 140 may display the virtual object 81B included in the control data that may be received by the first terminal 11 from the server 20 at a timing relatively close to the current time. Therefore, the display unit 140 may be capable of displaying a state closer to the real time in the virtual space 300 (the virtual venue 310). In addition, even in a case where there are many virtual objects 81B displayed by the display unit 140 in the virtual space 300, the virtual objects 81B that have been displayed relatively over time may be hidden, and thus, it may be possible to reduce a possibility that the display unit 140 may display the virtual object 81B to overlap with each other in the virtual space 300. Therefore, it may be possible to provide a display screen in the virtual space 300 with excellent visibility to the first user. In addition, the display unit 140 may display the message in the speech balloon 82 after the virtual object 81B may be displayed, and may hide the virtual object 81B after the message in the speech balloon 82 is hidden. As described above, the display unit 140 may display the virtual object 81B prior to the message, and thus, it may be possible to inform the user that the message corresponding to the virtual object 81B will be displayed afterward. Therefore, it may be possible to prevent the user from missing the message. In addition, the display unit 140 may hide the virtual object 81B after the message in the speech balloon 82 may be hidden, and thus, it may be possible to reduce a possibility that the display unit 140 displays the message but does not display the virtual object 81B corresponding to the message. Therefore, it may be possible to reduce a possibility that it is difficult for the first user to specify the virtual object 81B that may be a transmission source of the message. As described above, it may be possible to reduce a possibility that an uncomfortable feeling occurs when the display unit 140 does not display the virtual object 81B corresponding to the message.

In addition, in the second avatars 80B existing in the virtual venue 310, the first terminal 11 may acquire only data relevant to the second avatars 80B existing in the direction to which the first avatar 80A may be directed (Case 1). In addition, in the second avatars 80B existing in the virtual venue 310, the first terminal 11 may acquire data relevant to the second avatars 80B existing in the direction to which the first avatar 80A may be directed and in directions other than the direction to which the first avatar 80A may be directed (Case 2). In Case 2 described above, in a case where the direction of the first avatar 80A may be changed, the display unit 140 may be capable of displaying the virtual object 81B relatively without delay, compared to Case 1 described above.

4. Operation of System 1000

Figure 9:
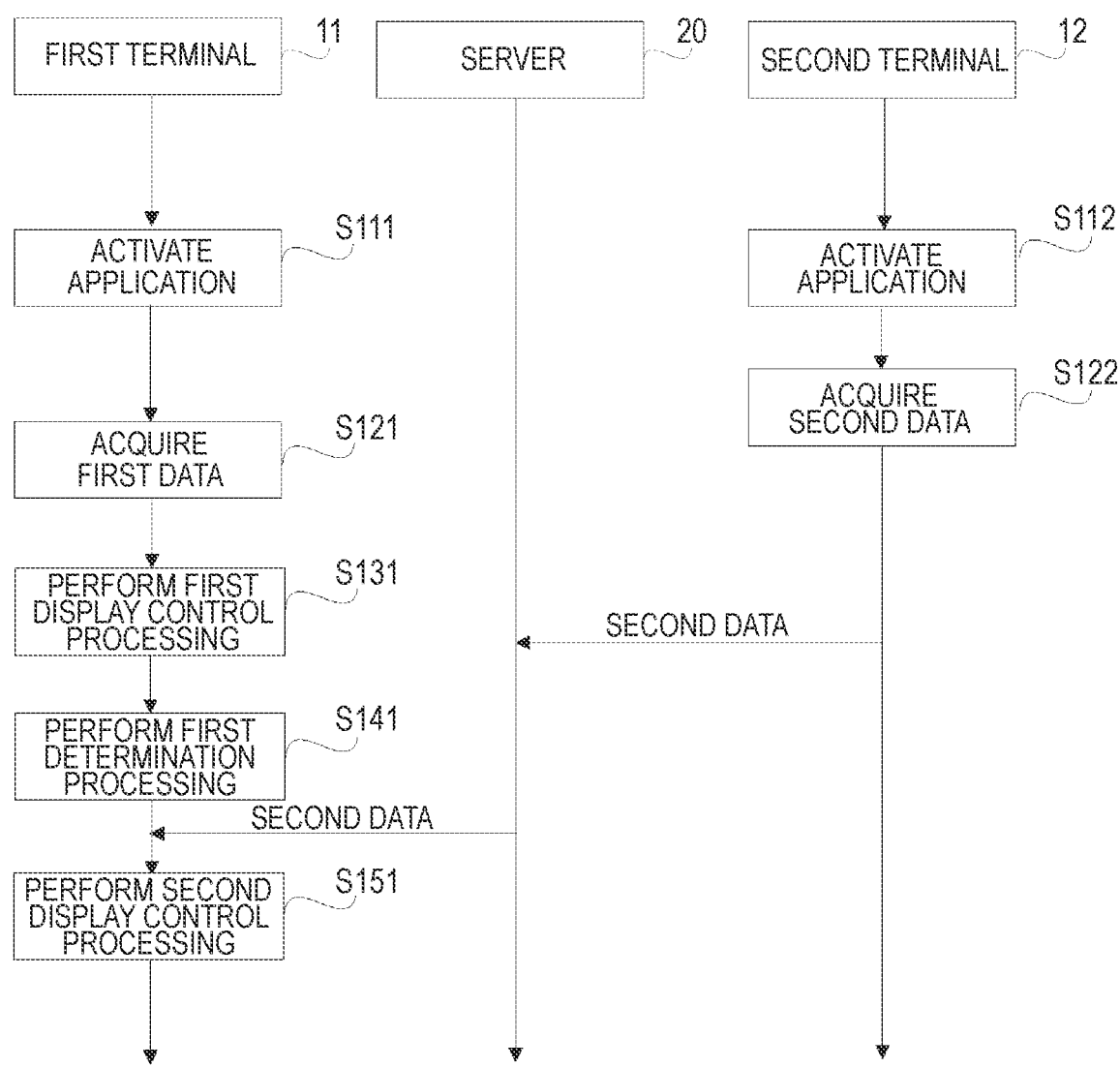
FIG. 9 is an example of a flowchart illustrating processing that may be performed according to an exemplary embodiment.
Figure 10:
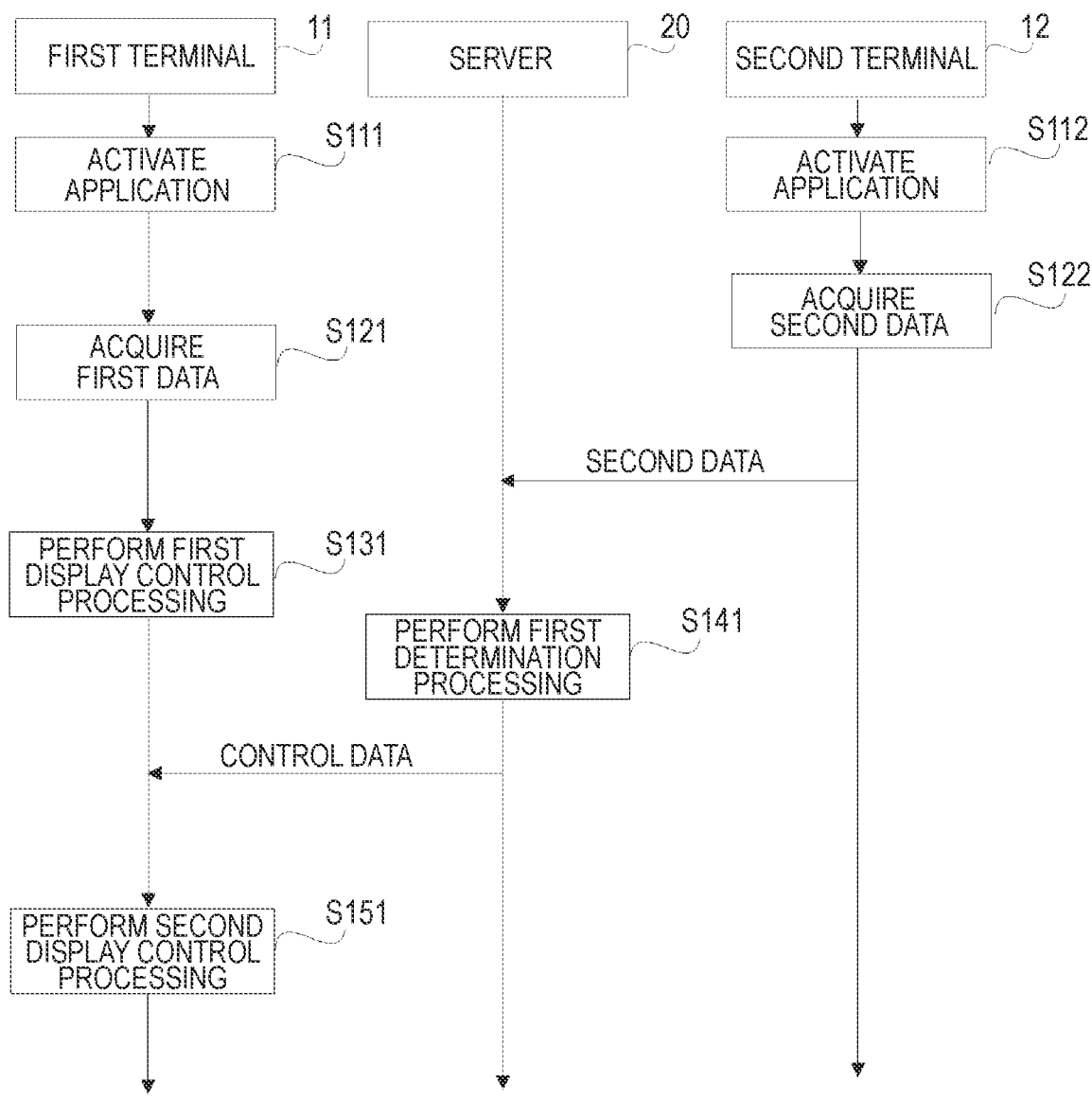
FIG. 10 is an example of a flowchart illustrating the processing that may be performed according to an exemplary embodiment.

The operation of the system 1000 will be described with reference to FIG. 9 and FIG. 10. FIG. 9 and FIG. 10 may be flowcharts illustrating an example of the operation performed by using the system 1000 illustrated in FIG. 1.

First, S111 to S151 will be sequentially described with reference to FIG. 9.

In S111, the first user manipulates the first terminal 11 to activate the application, and in S112, the second user manipulates the second terminal 12 to activate the application.

In S121, the first terminal 11 may acquire first data. The first data, for example, may include data relevant to an avatar in the virtual space that may be manipulated by using the first terminal 11. The first data may be data relevant to the position (a first position) of the first avatar 80A corresponding to the first user.

In S122, the second terminal 12 may acquire the second data. The second data, for example, may include the position data of the at least one second avatar in the virtual venue 310 and the manipulation data input to the second terminal 12. After the processing of S122, the second terminal 12 may transmit the second data to the server 20.

In S131, the first terminal 11 may perform processing of controlling the display unit 140 of the first terminal (first display control processing). The first display control processing, for example, may be processing of controlling the display unit 140 such that the display screen in the virtual venue 310 may be displayed.

In S141, the first terminal 11 may perform first determination processing. Here, the first determination processing determines whether or not a first condition relevant to the data included in the first data may be satisfied. The first determination processing, for example, may determine whether or not the first condition that the position (the first position) of the first avatar 80A may be in the virtual venue 310 may be satisfied.

In S141, in a case where the first terminal 11 determines that the first condition is satisfied, the first terminal 11 may receive the second data transmitted from the terminal 10 of the user manipulating at least one second avatar 80B of at least one avatar existing in the virtual venue 310 other than the first avatar 80A, through the communication line. On the other hand, in S141, in a case where the first terminal 11 determines that the predetermined condition is not satisfied, the processing of S141 may be repeated.

In S151, the first terminal 11 may perform processing of controlling the display unit 140 of the first terminal 11 on the basis of the second data (second display control processing). The second display control processing, for example, may indicate display control based on at least any one of the position data of the second avatar 80B in the virtual venue 310 and the manipulation data input to the terminal 10 corresponding to the second avatar 80B while displaying the display screen in the virtual venue 310. Specifically, the second display control processing, for example, may indicate display control for displaying the message included in the message data transmitted from the second terminal 12 in the speech balloon 82 while displaying the display screen in the virtual venue 310. In addition, specifically, the second display control processing, for example, may indicate display control for displaying the virtual object 81B in a predetermined position in the virtual venue 310 that may be decided on the basis of the position data of the second avatar 80B in the virtual venue 310 while displaying the display screen in the virtual venue 310.

Note that each time when the second terminal 12 transmits the second data to the server 20, the server 20 may transmit the second data to the first terminal 11. Then, each time when the first terminal 11 may receive the second data from the server 20, the first terminal 11 may perform the processing of S151. Accordingly, the first terminal 11 may be capable of reflecting display contents relevant to the second avatar 80B manipulated by the second terminal 12 on the display unit 140 in real time.

Next, S111 to S151 will be sequentially described with reference to FIG. 10. In FIG. 9, an example has been described in which the first terminal 11 may perform the first determination processing, but in FIG. 10, the server may perform the first determination processing. Therefore, in FIG. 10, unlike FIG. 9, the server 20 may perform the first determination processing, and may transmit the control data to the first terminal 11. In addition, in FIG. 10, unlike FIG. 9, the first terminal 11 may not perform the first determination processing, and thus, may not receive the second data. Therefore, in FIG. 9, the server 20 may not perform the first determination processing, and thus, it may be possible to reduce a processing load of the first terminal 11. In addition, in FIG. 10, the first terminal 11 may not perform the first determination processing, and thus, it may be possible to reduce the processing load of the first terminal 11.

In S111, the first user may manipulate the first terminal 11 to activate the application, and in S112, the second user may manipulate the second terminal 12 to activate the application.

In S121, the first terminal 11 may acquire the first data. The first data, for example, may include the data relevant to the avatar in the virtual space that may be manipulated by using the first terminal 11. The first data may be the data relevant to the position of the first avatar 80A corresponding to the first user (the first position).

In S122, the second terminal 12 may acquire the second data. The second data, for example, may include the position data of the at least one second avatar in the virtual venue 310 and the manipulation data input to the second terminal 12. After the processing of S122, the second terminal 12 may transmit the second data to the server 20.

In S131, the first terminal 11 may perform processing of controlling the display unit 140 of the first terminal (first display control processing). The first display control processing, for example, may be the processing of controlling the display unit 140 such that the display screen in the virtual venue 310 may be displayed.

In S141, the server 20 may perform the first determination processing. Here, the first determination processing of S141 in FIG. 10 may be the same as the first determination processing of S141 in FIG. 9. In S141, in a case where the server 20 determines that a predetermined condition (the first condition) is satisfied, the server 20 may decide the control data and may transmit the control data to the first terminal 11. On the other hand, in S141, in a case where it may be determined that the predetermined condition may be not satisfied, the processing of S141 may be repeated. Note that, the control data decided in S141 may be data for controlling the display screen of the first terminal 11.

In a case where the first terminal 11 may perform processing of controlling the display unit 140 of the first terminal 11 on the basis of the control data (first display control processing), and the first terminal 11 may receive the control data from the server 20, the processing of S151 may be performed.

In S151, the first terminal 11 may perform processing of controlling the display unit 140 of the first terminal 11 on the basis of the control data received from the server 20 (second display control processing). The second display control processing, for example, may indicate the display control based on at least any one of the position data of the second avatar 80B in the virtual venue 310 and the manipulation data input to the terminal 10 corresponding to the second avatar 80B while displaying the display screen in the virtual venue 310. Specifically, the second display control processing, for example, may indicate the display control for displaying the message included in the message data transmitted from the second terminal 12 in the speech balloon 82 while displaying the display screen in the virtual venue 310. In addition, specifically, the second display control processing, for example, may indicate the display control for displaying the virtual object 81B in the predetermined position in the virtual venue 310 that may be decided on the basis of the position data of the second avatar 80B in the virtual venue 310 while displaying the display screen in the virtual venue 310.

Note that, each time when the second terminal 12 may transmit the second data to the server 20, the server 20 may transmit the control data to the first terminal 11 on the basis of the second data. Then, each time when the first terminal 11 may receive the control data from the server 20, the first terminal 11 may perform the processing of S151. Accordingly, the first terminal 11 may be capable of reflecting the display contents relevant to the second avatar 80B manipulated by the second terminal 12 on the display unit 140 in real time.

In addition, at least a part of the processing of the processing in FIG. 9 and/or the processing in FIG. 10 may be suitably omitted. In addition, at least a part of the processing in FIG. 9 and/or the processing in FIG. 10 may be suitably integrated.

As described above, the first data relevant to the first position in the virtual space in which the first avatar manipulated by using the first terminal 11 exists may be acquired, whether or not the first condition that the first position may be in the virtual venue 310 may be satisfied may be determined, and in a case where it may be determined that the first condition may be satisfied, the second data transmitted from the terminal 10 of the user manipulating the at least one second avatar of the at least one avatar existing in the virtual venue 310 other than the first avatar may be received through the communication line, the second data may include the position data of the at least one second avatar 80B in the virtual venue 310 and the manipulation data input to the terminal, the position data may be used in the decision of the position in the virtual venue 310 displaying the virtual object 81B corresponding to the at least one second avatar 80B, the control data for controlling the display unit 140 of the first terminal 11 such that at least the virtual object 81B is displayed on the display unit 140 may be decided on the basis of the second data, and the display unit 140 may be controlled on the basis of the control data. As described above, the display unit 140 of the first terminal 11 may display the virtual object 81B corresponding to the second avatar 80B, instead of the second avatar 80B. Therefore, even in a case where the first terminal 11 receives the second data relevant to the plurality of second avatars 80B, the first terminal 11 may be capable of reflecting the second data on the display unit 140 by reducing a display load. As described above, it may be possible to reduce a possibility that a load on the display control increases, compared to the related art.

5. Modification Example

Figure 11:
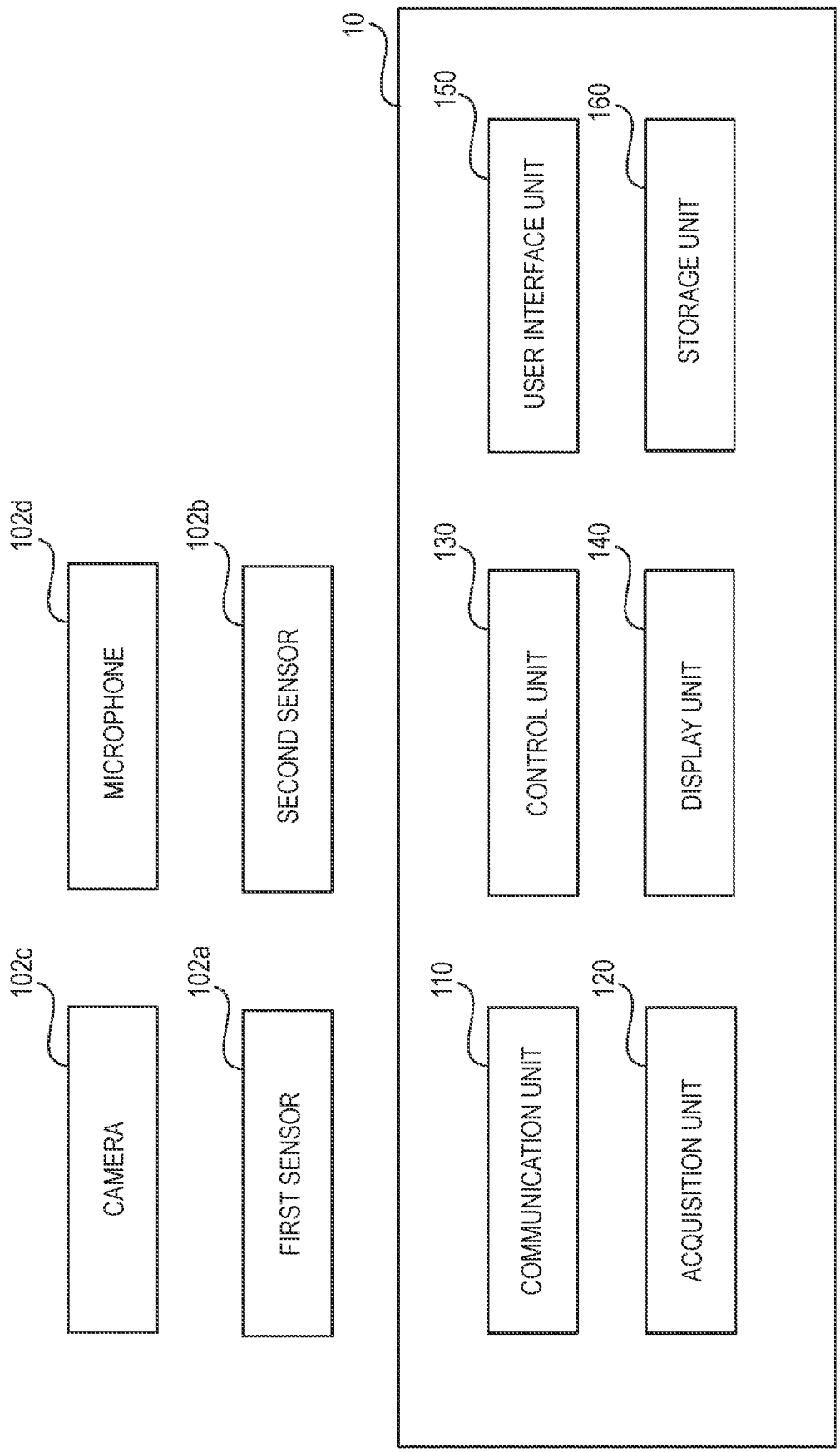
FIG. 11 is a block diagram illustrating an example of functions of the terminal 10 illustrated in FIG. 1 and a configuration that is connected to the terminal 10.

Note that, as illustrated in FIG. 11, a first sensor 102a, a second sensor 102b, a camera 102c, and a microphone 102d may be provided, in addition to the terminal 10 illustrated in FIG. 3. FIG. 11 may be a block diagram illustrating an example of the terminal 10 illustrated in FIG. 3 and a configuration that may be connected to the terminal 10. Here, the terminal 10, the first sensor 102a, the second sensor 102b, the camera 102c, and the microphone 102d, for example, may be connected to each other in a wired or wireless manner.

The first sensor 102a, for example, may be connected to the camera 102c in a wired or wireless manner. The camera 102c, for example, may include an RGB camera imaging a visible ray and a near infrared camera imaging a near infrared ray. As the camera 102c, for example, a camera included in a true depth camera of the IPHONE X (Registered Trademark) can also be used. The second sensor 102b, for example, may be connected to the microphone 102d in a wired or wireless manner. Note that, the first sensor 102a and the camera 102c may be provided as one configuration. In addition, the second sensor 102b and the microphone 102d may be provided as one configuration.

As described above, the terminal 10 may transmit an image imaged by the camera 102c to the server 20. In addition, the terminal 10 may transmit voice data input from the microphone 102d to the server 20. In addition, the terminal 10 may transmit moving image data using the camera 102c and the microphone 102d to the server 20.

Figure 12:
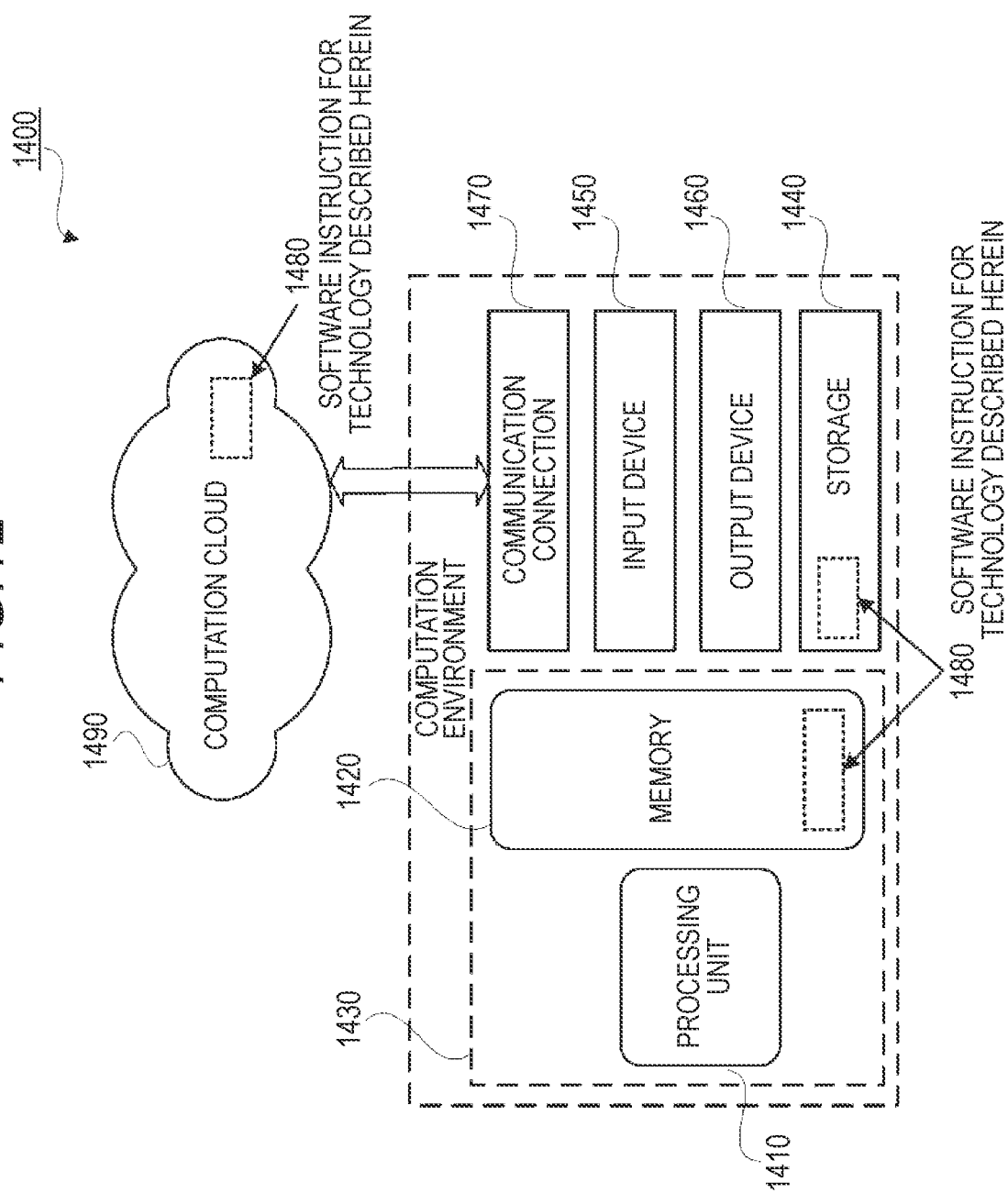
FIG. 12 is a block diagram illustrating a exemplary embodiment of a computation environment 1400.

FIG. 12 illustrates an example of generalizing a suitable computation environment 1400 in which the embodiments, the techniques, and the technologies, described herein, can be implemented, including rendering a video in a computation environment by transmitting and using a token. For example, as described herein, in the computation environment 1400, any one of a terminal device (or a distributor or a viewer), a distribution server system, and the like, can be implemented.

Since the technologies can be implemented in various general or dedicated computation environments, the computation environment 1400 may not be intended to indicate any limitation on the use of the technology or the range of the function. For example, the technologies disclosed herein may be implemented in various other computer system configurations including various portable devices, various multiprocessor systems, various microprocessor-based or programmable household electrical appliances, various network PCs, various minicomputers, various mainframe computers, and the like. The technologies disclosed herein may be performed in a distributed computation environment in which a task may be executed by a remote processing device linked through a communication network. In the distributed computation environment, a program module may be arranged in both of local and remote memory storage devices.

The computation environment 1400 may include at least one central processing unit 1410 and at least one memory 1420, with reference to FIG. 12. In FIG. 12, the most basic configuration 1430 may be included in a broken line. The central processing unit 1410 executes a computer-executable command, and the central processing unit 1410 may be an actual processor or a virtual processor. In a multiprocessing system, a plurality of processors can be simultaneously operated in order to improve processing power by a plurality of processing units executing the computer-executable command. The memory 1420 may be a volatile memory (for example, a register, a cash, and a RAM), a non-volatile memory (for example, a ROM, an EEPROM, a flash memory, and the like), or a combination thereof. The memory 1420, for example, may store software 1480 capable of implementing the technologies described herein, and various images and videos. The computation environment may have various additional functions. For example, the computation environment 1400 may include a storage 1440, one or a plurality of input devices 1450, one or a plurality of output devices 1460, and one or a plurality of communication connections 1470. An interconnection mechanism (not illustrated) such as a bus, a controller, or a network may connect various components of the computation environment 1400 to each other. In general, operating system software (not illustrated) may provide an operating environment for other software that may be executed in the computation environment 1400, and may adjust various activities of various components of the computation environment 1400.

The storage 1440 may be removable, or may not be removable, and may include a magnetic disk, a magnetic tape or a cassette, a CD-ROM, a CD-RW, a DVD, or any other medium that can be used to store data and may be accessible in the computation environment 1400. The storage 1440 may store commands for the software 1480, plug-in data, and a message that can be used to implement the technologies described herein.

One or the plurality of input devices 1450 may be a touch input device such as a keyboard, a keypad, a mouse, a touch screen display, a pen, or a trackball, a voice input device, a scanning device, or another device providing input to the computation environment 1400. In a case of audio input, one or the plurality of input devices 1450 may be a sound card receiving analog or digital audio input or similar devices, or a CD-ROM reader providing various audio samples to the computation environment 1400. One or the plurality of output devices 1460 may be a display, a printer, a speaker, a CD writer, or another device providing the output from the computation environment 1400.

One or the plurality of communication connections 1470 may be capable of performing communication with respect to another computation entity through a communication medium (for example, a connection network). The communication medium transfers data such as a computer-executable command, compressed graphics data, a video, or the other data included in a modulated data signal. One or the plurality of communication connections 1470 are not limited to wired connection (for example, megabit or gigabit Ethernet, InfiniBand, or a fiber channel through electrical or optical fiber connection), and may include wireless technology (for example, RF connection through Bluetooth, WiFi (IEEE 802.11a/b/n), WiMax, cellular, a satellite, laser, and an infrared ray), and various other suitable communication connections providing network connection to various agents, various bridges, and various data consumers of a destination agent, disclosed herein. In a virtual host environment, one or the plurality of communication connections may be virtualized network connection that may be provided by a virtual host.

Various embodiments of various methods disclosed herein can be executed by using a plurality of computer-executable commands for implementing all or a part of the technologies disclosed herein, in a computation cloud 1490. For example, various agents may be capable of executing various vulnerability scan functions in the computation environment, and an agent platform (for example, a bridge) and a consumer service of destination agent data can be executed by various servers positioned inside the computation cloud 1490.

A computer-readable medium may be an arbitrary available medium that may be assessable in the computation environment 1400. As an example, for the computation environment 1400, the computer-readable medium may include the memory 1420 and/or the storage 1440, but is not limited thereto. For easy understanding, the term of computer-readable medium may include a data storage medium such as the memory 1420 and the storage 1440, and may not include a transmission medium for various modulated data signals and the like.

Various embodiments described above can be used by being combined with each other unless there is contradiction or inconvenience. It should be understood that various embodiments exemplified are merely various preferred examples, in consideration of many available embodiments to which the principles of the disclosure provided herein can be applied, and the technical scope of the embodiments provided in the claims is not considered to be limited to various preferred examples. In practice, the technical scope of the embodiments provided in the claims may be defined by the accompanying claims. Therefore, the grant of patent is requested to all belonging to the technical scope of the exemplary embodiments described in the claims.

A computer program according to a first exemplary embodiment may be characterized by "a computer program that may be executed by at least one processor and may allow the at least one processor to: acquire first data relevant to a first position in a virtual space in which a first avatar manipulated by using first terminal of a first user exists; determine whether or not a first condition that the first position is in a first region is satisfied; receive second data transmitted from a terminal of a user manipulating at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, decide control data for controlling a display unit of the first terminal such that at least the virtual object may be displayed on the display unit of the first terminal, on the basis of the second data; and control the display unit on the basis of the control data".

A computer program according to a second exemplary embodiment may be characterized by "a computer program that may be executed by at least one processor and may allow the at least one processor to: receive first data relevant to a first position in a virtual space in which a first avatar manipulated by using a first terminal of a first user exists, through a communication line; determine whether or not a first condition that the first position is in a first region is satisfied; receive second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, decide control data for controlling a display unit of the first terminal such that at least the virtual object may be displayed on the display unit of the first terminal, on the basis of the second data; and transmit the control data to the first terminal".

In the first exemplary embodiment or the second exemplary embodiment described above, a computer program according to a third exemplary embodiment may be characterized by "the manipulation data may include at least any one of data relevant to a message input to the terminal, data for designating at least one color with respect to a color of the virtual object, and data for designating a motion of the virtual object".

In the third exemplary embodiment described above, a computer program according to a fourth exemplary embodiment may be characterized by "the manipulation data may include the data relevant to the message input to the terminal, and the control data may include data for controlling the display unit of the first terminal such that the virtual object and a first display region relevant to the message that may be positioned around the virtual object may be displayed on the display unit of the first terminal, on the basis of the position data and the manipulation data".

In the fourth exemplary embodiment described above, a computer program according to a fifth exemplary embodiment may be characterized by "the manipulation data may include data for designating at least one color applied to the virtual object and data for designating at least one color and/or shape applied to the first display region that may be positioned around the virtual object and may display the message, and the control data may include data for controlling the display unit such that the virtual object may be displayed by using the at least one color and/or the first display region may be displayed by using the at least one color and/or shape, on the basis of the position data and the manipulation data".

In any one of the third exemplary embodiment to the fifth exemplary embodiment described above, a computer program according to a sixth exemplary embodiment may be characterized by "the manipulation data may include the data for designating the motion of the virtual object, and the control data may include data for controlling the display unit such that the motion of the virtual object may be changed over time, on the basis of the position data and the manipulation data".

In the fourth exemplary embodiment described above, a computer program according to a seventh exemplary embodiment may be characterized by "the second data may include position data items of each of a plurality of avatars in the first region and manipulation data items input to a terminal of a user manipulating each of the plurality of avatars, and when each of the position data items indicates the same position, the control data may include data for controlling the display unit such that positions in which messages included in each of the manipulation data items may be displayed on the display unit may be different from each other".

In the fourth exemplary embodiment described above, a computer program according to an eighth exemplary embodiment may be characterized by "the second data may include position data items of each of a plurality of avatars in the first region and manipulation data items input to a terminal of a user manipulating each of the plurality of avatars, and when each of the position data items indicates the same position, the control data may include data for controlling the display unit such that times at which messages included in each of the manipulation data items may be displayed on the display unit may be different from each other".

In the fourth exemplary embodiment described above, a computer program according to a ninth exemplary embodiment may be characterized by "the control data may include data for controlling the display unit such that display relevant to the message according to a distance between the first avatar and the virtual object in the virtual space may be displayed around the virtual object".

In any one of the first exemplary embodiment to the ninth exemplary embodiment described above, a computer program according to a tenth exemplary embodiment may be characterized by "when the distance between the first avatar and the virtual object in the virtual space is less than a predetermined value, the control data may include data for controlling the display unit such that the message included in the data transmitted from the terminal of the user manipulating the at least one second avatar corresponding to the virtual object may be displayed around the virtual object".

In the ninth exemplary embodiment described above, a computer program according to an eleventh exemplary embodiment may be characterized by "when the distance between the first avatar and the virtual object in the virtual space may be a predetermined value or more, the control data may include data for controlling the display unit such that the effect that the data relevant to the message may be transmitted from the terminal of the user manipulating the at least one second avatar corresponding to the virtual object may be displayed around the virtual object".

In any one of the first exemplary embodiment to the eleventh exemplary embodiment described above, a computer program according to a twelfth exemplary embodiment may be characterized by "the control data may include data for controlling the display unit such that the virtual object may be hidden when a predetermined time has elapsed after the virtual object may be displayed on the display unit".

In the fourth exemplary embodiment described above, a computer program according to a thirteenth exemplary embodiment may be characterized by "the control data may include data for controlling the display unit such that a message included in message data transmitted from the terminal manipulating the at least one second avatar may be hidden when a predetermined time may have elapsed after the message may be displayed on the display unit".

In the thirteenth exemplary embodiment described above, a computer program according to a fourteenth exemplary embodiment may be characterized by "the control data may include data for controlling the display unit such that the message may be displayed on the display unit after the virtual object may be displayed on the display unit, and the virtual object displayed on the display unit may be hidden after the message displayed on the display unit may be hidden".

In the first exemplary embodiment or the second exemplary embodiment described above, a computer program according to a fifteenth exemplary embodiment may be characterized by "the at least one second avatar may be a plurality of second avatars, the second data may be data transmitted from a terminal of a user manipulating each of the plurality of second avatars, the second data may include attribute data items relevant to attribute of each of the plurality of second avatars, and positions in the first region in which the virtual objects corresponding to each of the plurality of second avatars may be displayed may be decided on the basis of each of the attribute data items".

In the fifteenth exemplary embodiment described above, a computer program according to a sixteenth exemplary embodiment may be characterized by "the plurality of second avatars include a third avatar and a fourth avatar, and when attribute data relevant to the third avatar and attribute data relevant to the fourth avatar may be first attribute data, the control data may include data for controlling the display unit such that a virtual object corresponding to the third avatar and a virtual object corresponding to the fourth avatar may be displayed in a second region in the first region".

In the sixteenth exemplary embodiment described above, a computer program according to a seventeenth exemplary embodiment may be characterized by "the plurality of second avatars include a fifth avatar and a sixth avatar, when attribute data relevant to the fifth avatar and attribute data relevant to the sixth avatar may be second attribute data, the control data may include data for controlling the display unit such that a virtual object corresponding to the fifth avatar and a virtual object corresponding to the sixth avatar may be displayed in a third region in the first region, and the second region and the third region do not include an overlapping region".

In any one of the first exemplary embodiment to the seventeenth exemplary embodiment described above, a computer program according to an eighteenth exemplary embodiment may be characterized by "a second display region displaying a moving image may be provided in the first region".

In any one of the first exemplary embodiment to the eighteenth exemplary embodiment described above, a computer program according to a nineteenth exemplary embodiment may be characterized by "the virtual space may be a three-dimensional space".

In any one of the first exemplary embodiment to the nineteenth exemplary embodiment described above, a computer program according to a twentieth exemplary embodiment may be characterized by "the communication line may include the internet".

In any one of the first exemplary embodiment to the twentieth exemplary embodiment described above, a computer program according to a twenty-first exemplary embodiment may be characterized by "the at least one processor may include a central processing unit (CPU), a microprocessor, and/or a graphics processing unit (GPU)".

In any one of the first exemplary embodiment to the twenty-first exemplary embodiment described above, a computer program according to a twenty-second exemplary embodiment may be characterized by "the at least one processor may be mounted on a server, a smart phone, a tablet, a mobile phone, or a personal computer".

A method according to a twenty-third exemplary embodiment may be characterized by "a method executed by at least one processor, including: a step of acquiring first data relevant to a first position in a virtual space in which a first avatar manipulated by using a first terminal of a first user exists; a step of determining whether or not a first condition that the first position may be in a first region may be satisfied; a step of receiving second data transmitted from a terminal of a user manipulating at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, a step of deciding control data for controlling a display unit of the first terminal such that at least the virtual object may be displayed on the display unit of the first terminal, on the basis of the second data; and a step of controlling the display unit on the basis of the control data".

A method according to a twenty-fourth exemplary embodiment may be characterized by "a method executed by at least one processor, including: a step of receiving first data relevant to a first position in a virtual space in which a first avatar manipulated by using a first terminal of a first user exists, through a communication line; a step of determining whether or not a first condition that the first position is in a first region is satisfied; a step of receiving second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, a step of deciding control data for controlling a display unit of the first terminal such that at least the virtual object may be displayed on the display unit of the first terminal, on the basis of the second data; and a step of transmitting the control data to the first terminal".

In the twenty-third exemplary embodiment or the twenty-fourth exemplary embodiment described above, a method according to a twenty-fifth exemplary embodiment may be characterized by "the virtual space may be a three-dimensional space".

In the twenty-fourth exemplary embodiment or the twenty-fifth exemplary embodiment described above, a method according to a twenty-sixth exemplary embodiment may be characterized by "the communication line may include the internet".

In any one of the twenty-third exemplary embodiment to the twenty-sixth exemplary embodiment described above, a method according to a twenty-seventh exemplary embodiment may be characterized by "the at least one processor may include a central processing unit (CPU), a microprocessor, and/or a graphics processing unit (GPU)".

In any one of the twenty-third exemplary embodiment to the twenty-seventh exemplary embodiment described above, a method according to a twenty-eighth exemplary embodiment may be characterized by "the at least one processor may be mounted on a server, a smart phone, a tablet, a mobile phone, or a personal computer".

A server according to a twenty-ninth exemplary embodiment may be characterized by "server that may include at least one processor and may perform: receiving first data relevant to a first position in a virtual space in which a first avatar manipulated by using a first terminal of a first user exists, through a communication line; determining whether or not a first condition that the first position is in a first region is satisfied; receiving second data transmitted from a terminal of a user manipulating at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, deciding control data for controlling a display unit of the first terminal such that at least the virtual object may be displayed on the display unit of the first terminal, on the basis of the second data; and transmitting the control data to the first terminal".

In the twenty-ninth exemplary embodiment described above, a server according to a thirtieth exemplary embodiment may be characterized by "the virtual space may be a three-dimensional space".

In the twenty-ninth exemplary embodiment or the thirtieth exemplary embodiment described above, a server according to a thirty-first exemplary embodiment may be characterized by "the communication line may include the internet".

In any one of the twenty-ninth exemplary embodiment to the thirty-first exemplary embodiment described above, a server according to a thirty-second exemplary embodiment may be characterized by "the at least one processor may include a central processing unit (CPU), a microprocessor, and/or a graphics processing unit (GPU)".

Embodiment 2

In the related art, it has been proposed to display a spatial layout of a plurality of zones in one virtual region in a network communication environment (refer to JP-T-2012-515398 (the term "JP-T" as used herein means a published Japanese translation of a PCT patent application)). In JP-T-2012-515398, it is only described that a user interacts with other correspondents in the virtual region. Note that, JP-T-2012-515398 described above may be incorporated herein by reference in its entirety. The present disclosure may provide a computer program, a method, and a server with higher attractiveness, compared to the related art.

1. Configuration of System 1000

FIG. 1 may be a block diagram illustrating an example of the configuration of a system 1000 according to one embodiment. As illustrated in FIG. 1, the system 1000, for example, a plurality of terminals 10 connected to a communication line (a communication network) that is not illustrated, and one or a plurality of servers 20 connected to the communication line. The terminal 10 may include a first terminal 11 and a second terminal 12. In addition, the server 20, for example, may include a first server system 21 and a second server system 22.

The communication line may include a mobile phone network, a wireless network (for example, RF connection through Bluetooth, WiFi (such as IEEE 802.11a/b/n), WiMax, cellular, a satellite, laser, and an infrared ray), a fixed phone network, the internet, an intranet, a local area network (LAN), a wide area network (WAN), and/or an Ethernet network without being limited thereto.

1-1. Terminal 10

The terminal 10, for example, may be connected to one or the plurality of servers 20 through the communication line. The terminal 10, for example, may be a smart phone, a tablet device, and/or a personal computer. The terminal 10, for example, may be configured such that a predetermined application may be installed to be executable. In addition, the terminal 10 may be capable of receiving a web page (for example, a HTML document, in some examples, a HTML document in which an executable code such as JavaScript or a PHP code may be encoded) from the server 20 (the second server system 22).

Note that, hereinafter, a user manipulating the terminal 10 may be simply referred to as a user, a user manipulating the first terminal 11 may be referred to as a first user, and a user manipulating the second terminal 12 may be referred to as a second user. In addition, in FIG. 1, for example, an example may be illustrated in which the first terminal 11 and the second terminal 12 may be provided as the plurality of terminals 10, but the disclosure is not limited thereto. The plurality of terminals 10, for example, may include three or more terminals. In addition, in the following description, the first terminal 11 and the second terminal 12 may be collectively referred to as the terminal 10.

1-2. Server 20

The first server system 21 may include a distribution server 21A1 and a server storage device 21A2. The distribution server 21A1, for example, may receive data that may be requested for an application executed in the terminal 10 from the terminal 10. In addition, the distribution server 21A1, for example, may transmit the data that may be used in the application executed in the terminal 10 to the terminal 10, in accordance with the request. The server storage device 21A2, for example, may store the data that may be transmitted to the terminal 10 from the distribution server 21A1. In addition, the server storage device 21A2, for example, may store the data that may be received by the distribution server 21A1 from the terminal 10. In addition, the first server system 21, for example, may transmit the data that may be used in the application executed in the terminal 10 to the terminal 10.

Note that an example may have been described in which the terminal 10 executes the application, but the disclosure is not limited thereto. For example, processing equivalent to executing the application may be executed by using a web browser that may be installed in the terminal 10. As described above, in a case of using the web browser that may be installed in the terminal 10, for example, the server 20 may include a web server (not illustrated). In a case where the server 20 may include the web server (not illustrated), the web server may transmit data relevant to a HTML document such as HTML5, the terminal 10 may display the data relevant to the HTML document by using the web browser, user instruction data may be transmitted to the terminal 10 (the web browser), and the server 20 may perform display control. The server 20 may perform the display control, and thus, may generate display data and may transmit the display data to the terminal 10 (the web browser). Note that, the display control may be performed by using a script such as JavaScript (Registered Trademark) in the web browser.

In addition, in FIG. 1, an example has been described in which the first server system 21 may include the distribution server 21A1 and the server storage device 21A2, but the disclosure is not limited thereto. For example, the first server system 21 may have other configurations in addition to the distribution server 21A1 and the server storage device 21A2. In such a case, the other configurations may have at least any one function of the distribution server 21A1 and the server storage device 21A2. In addition, for example, the first server system 21 may have a single configuration having the function of the distribution server 21A1 and the server storage device 21A2.

The second server system 22 may be a server that may transmit data relevant to a content to the terminal 10. Here, for example, a case may be assumed in which the user may manipulate the terminal 10 to execute the application. In such a case, when the second server system 22 may receive the request for the data relevant to the content from the terminal 10 during the execution of the application, the second server system 22 may transmit the data relevant to the content to the terminal 10. The data relevant to the content that may be transmitted to the terminal 10 from the second server system 22, for example, may be data relevant to a moving image.

2. Hardware Configuration of Each Device

Next, an example of a hardware configuration of each of the terminal 10 and the server 20 will be described.

2-1. Hardware Configuration of Terminal 10

A hardware configuration example of each of the terminals 10 will be described with reference to FIG. 2. FIG. 2 may be a block diagram illustrating an example of the hardware configuration of the terminal 10 (the server 20) illustrated in FIG. 1. Note that, in FIG. 2, reference numerals in parentheses may be described in association with the server 20 as described below.

As illustrated in FIG. 2, each of the terminals 10, for example, may include a central processing unit 14, a main storage device 15, an input/output interface device 16, an input device 17, an auxiliary storage device 18, and an output device 19. The configurations illustrated in FIG. 2 may be connected to each other by a data bus and/or a control bus.

The central processing unit 14 may be referred to as a "CPU", may perform an arithmetic operation with respect to a command and data stored in the main storage device 15, and may store a result of the arithmetic operation in the main storage device 15. Further, the central processing unit 14 may be capable of controlling the input device 17, the auxiliary storage device 18, the output device 19, and the like through the input/output interface device 16. The terminal 10 may include one or more central processing units 14.

The main storage device 15 may be referred to as a "memory", and may store the command and the data received from the input device 17, the auxiliary storage device 18, and the communication line 30 (the server 20 or the like) through the input/output interface device 16, and the result of the arithmetic operation of the central processing unit 14. The main storage device 15 may include computer-readable media such as a volatile memory (for example, a registor, a cash, and a random access memory (RAM)), a non-volatile memory (for example, a read only memory (ROM), EEPROM, and a flash memory), and a storage (for example, a hard disk drive (HDD), a solid state drive (SSD), a magnetic tape, and an optical medium) without being limited thereto. For easy understanding, a term such as a "computer-readable recording medium" may include a medium for data storage, such as a memory and a storage, but not a transmission medium for a modulated data signal, that is, a transitory signal.

The input device 17 may be a device to which data may be imported from the outside, and may include a touch panel, a button, a keyboard, a mouse, and/or a sensor without being limited thereto. As described below, the sensor may include a sensor including one or more cameras and/or one or more microphones without being limited thereto.

The auxiliary storage device 18 may be a storage device having a capacity larger than that of the main storage device 15. The auxiliary storage device 18 may be capable of storing the specific application described above (such as an application for distributing a moving image and an application for viewing a moving image). The auxiliary storage device 18 may be capable of storing a command and data (a computer program) configuring a web browser application or the like. Further, the auxiliary storage device 18 may be controlled by the central processing unit 14, and thus, may be capable of transmitting the command and the data (the computer program) to the main storage device 15 through the input/output interface device 16. The auxiliary storage device 18 may include a magnetic disk device and/or an optical disk device without being limited thereto.

The output device 19 may include a display device, a touch panel, and/or a printer device without being limited thereto.

In such a hardware configuration, the central processing unit 14 may sequentially load the command and the data (the computer program) configuring the specific application stored in the auxiliary storage device 18 in the main storage device 15, and may perform an arithmetic operation with respect to the loaded command and data, and thus, may be capable of controlling the output device 19 through the input/output interface device 16 or may be capable of transmitting and receiving various data items with respect to other device (for example, the server 20 and the other terminal 10) through the input/output interface device 16 and a communication line 2.

2-2. Hardware Configuration of Server 20

A hardware configuration example of each of the servers 20 will be also described with reference to FIG. 2. As the hardware configuration of each of the servers 20 (each of the distribution server 21A1 and the server storage device 21A2), for example, the same hardware configuration as that of each of the terminals 10 described above can be used. Therefore, reference numerals with respect to the constituents of each of the servers 20 may be described in parentheses in FIG. 2.

As illustrated in FIG. 2, each of the servers 20 may mainly include a central processing unit 24, a main storage device 25, an input/output interface device 26, an input device 27, an auxiliary storage device 28, and an output device 29. The devices may be connected to each other by a data bus and/or a control bus.

The central processing unit 24, the main storage device 25, the input/output interface device 26, the input device 27, the auxiliary storage device 28, and the output device 29 may be approximately the same as the central processing unit 14, the main storage device 15, the input/output interface device 16, the input device 17, the auxiliary storage device 18, and the output device 19, included in each of the terminals 10 described above, respectively.

In such a hardware configuration, the central processing unit 24 may sequentially load a command and data (a computer program) configuring a specific application stored in the auxiliary storage device 28 in the main storage device 25. The central processing unit 24 may perform an arithmetic operation with respect to the loaded command and data, and thus, may be capable of controlling the output device 29 through the input/output interface device 26 or may be capable of transmitting and receiving various data items with respect to other devices (for example, each of the terminals 10) through the input/output interface device 26 and the communication line 2.

Note that, the server 20 may include one or more microprocessors and/or one or more graphics processing units (GPU), instead of the central processing unit 24 or together with the central processing unit 24.

3. Function of Each of Devices

Next, an example of the function of each of the terminal 10 and the server 20 will be described by using FIG. 3 and FIG. 4.

3-1. Function of Terminal 10

FIG. 3 may be a block diagram illustrating an example of the function of the terminal 10 illustrated in FIG. 1. As illustrated in FIG. 3, the terminal 10, for example, may include a communication unit 110, an acquisition unit 120, a control unit 130, a display unit 140, a user interface unit 150, and a storage unit 160.

(1) Communication Unit 110

The communication unit 110, for example, may be used to transmit various data items to the server 20. In addition, the communication unit 110, for example, may be used to receive various data items from the server 20. The data received in the communication unit 110, for example, may be transmitted to the control unit 130.

(2) Acquisition Unit 120

The acquisition unit 120, for example, may acquire manipulation data relevant to a manipulation from the user. In addition, the acquisition unit 120, for example, may acquire data detected by various sensors. The data acquired in the acquisition unit 120, for example, may be transmitted to the control unit 130. The acquisition unit 120, for example, may perform the processing of S121 in FIG. 15, S122 in FIG. 15, S121 in FIGS. 16, and S122 in FIG. 16, described below. For example, the manipulation data may include one or more of the following data items.

Data indicating how a distributor swipes a touch pad display

Data indicating which object the distributor taps or clicks

Data indicating how the distributor drags the touch pad display

Other manipulation data items

Note that the data acquired by the acquisition unit 120 may be data relevant to non-manipulation (data indicating that there may be no manipulation), and for example, may be data indicating that the terminal 10 may be not manipulated for a specific time (a specific period) and/or data indicating that there may be no entrance to a specific location in a virtual space 300.

In addition, in the disclosure, display as illustrated in FIG. 6 to FIG. 14 described below may be performed by using a wearable device in addition to using the terminal 10 or instead of using the terminal 10. Here, the wearable device, for example, may include an augmented reality (AR) glass, a smart glass, a head mounted display (HMD), and the like. Note that, in a case where the wearable device described above may be an AR glass, for example, the AR glass may display a virtual display screen to overlap with the actual region, on the basis of data relevant to position information, data to be obtained by reading a predetermined marker, and/or data for identifying a predetermined object existing in the space.

In a case of using such a wearable device, a user wearing the wearable device may perform a gesture and/or a motion relevant to a visual line, and thus, may be capable of moving and/or selecting a target on a display screen displayed by the wearable device. Here, the gesture, for example, may be a motion of moving the head of the user forward, backward, left, or right. In addition, the motion relevant to the visual line, for example, may be a motion that the user blinks or a motion for moving the eyes of the user up, down, left, or right. The target, for example, may be an avatar corresponding to the user. In a case where the target, for example, may be an avatar corresponding to the user, and the motion for moving the head of the user forward, backward, left, or right may be performed, the avatar may be moved forward, backward, left, or right, in accordance with the motion.

Note that, in a case of moving and/or selecting the target on the display screen displayed by the wearable device, for example, a separate controller (not illustrated) may be provided. Here, the controller, for example, may include a touch pad (not illustrated). Accordingly, for example, the user may perform a touch manipulation on the touch pad, and thus, may be capable of moving and/or selecting the target on the display screen displayed by the wearable device. Here, the "touch manipulation", for example, may indicate at least any one manipulation of a tap, a double tap, a swipe, a flick, pinch-in, and pinch-out. In addition, the controller, for example, may include an acceleration sensor and/or a gyroscopic sensor. Accordingly, the target on the display screen displayed by the wearable device can be moved and/or selected on the basis of the tilt and/or the movement of the controller. The controller, for example, may be gripped and used by the user, or may be worn on the finger of the user.

(3) Control Unit 130

The control unit 130, for example, may perform various controls on the basis of the data received in the communication unit 110. In addition, the control unit 130 may perform various controls on the basis of the data acquired in the acquisition unit 120. The control unit 130, for example, may perform the processing of a part or all of S131 to S151 in FIG. 15 described below. In addition, the control unit 130, for example, may perform the processing of a part or all of S141 to S151 in FIG. 16 described below.

(4) Display Unit 140

The display unit 140, for example, may display display contents based on control data output from the control unit 130. The display unit 140, for example, may display a screen for selecting a predetermined application. In addition, the display unit 140, for example, may display a screen relevant to the virtual space in a case of selecting the predetermined application to execute the predetermined application.

(5) User Interface Unit 150

The user interface unit 150 may have a function for inputting various data items used in the execution of the application through the manipulation of the user.

(6) Storage Unit 160

The storage unit 160 may be capable of storing various data items used in the execution of the application. The storage unit 160, for example, may store data used to control the display unit 140. The storage unit 160, for example, may store module data used in the generation of the avatar of the user.

Note that, the module data, for example, may be data relevant to parts for generating the avatar. Here, the parts for generating the avatar, for example, include data of each of the parts of the avatar (eyes, a nose, a mouth, eyebrows, a skin color, a hair style, a hair color, clothes, a body, and the like). In addition, the module data may include data relevant to an ID that may be allocated corresponding to each of the parts for generating the avatar. Note that, in a case where the part of the avatar may be a body, the data relevant to the parts for generating the avatar may include subdivided data relevant to a body type such as a slim body, a slightly slim body, a standard body, a slightly fat body, and a fat body.

In addition, in a case where the display unit 140 may display an avatar 80 (an avatar of another person) other than a first avatar 80A, the server 20 may transmit ID data that may be used in the generation of the avatar 80 other than the first avatar 80A to the first terminal 11, and the first terminal 11 may construct the avatar 80 other than the first avatar 80A, on the basis of the ID data.

In addition, in a case where the display unit 140 may display the avatar 80 (the avatar of another person) other than the first avatar 80A, the display unit 140 may display the avatar 80 other than the first avatar 80A by coloring the avatar 80 with black, or may display the avatar 80 other than the first avatar 80A by using a part and/or a color to be decided on the basis of the gender (for example, male or female) of the user corresponding to the avatar 80 other than the first avatar 80A.

3-2. Function of Server 20

FIG. 4 may be a block diagram illustrating an example of the function of the server 20 illustrated in FIG. 1. As illustrated in FIG. 4, the server 20, for example, may include a communication unit 210, a storage unit 220, and a control unit 230.

(1) Communication Unit 210

The communication unit 210, for example, may be used to transmit various data items to the terminal 10. In addition, the communication unit 210, for example, may be used to receive various data items from the terminal 10. The data received in the communication unit 210 may be transmitted to the control unit 230. The communication unit 210, for example, may receive second data from the second terminal 12 in FIG. 15 described below, and may transmit the second data to the first terminal 11 in FIG. 15 described below. The communication unit 210, for example, may receive first data from the first terminal 11 in FIG. 16 described below, may transmit the control data to the first terminal 11 in FIG. 16 described below, may receive the second data from the second terminal 12 in FIG. 16 described below, and may transmit the second data to the first terminal 11 in FIG. 16 described below.

(2) Storage Unit 220

The storage unit 220 may store various data items that may be used in the execution of the application. The storage unit 220, for example, may store the first data transmitted from the first terminal 11 and the data transmitted from the second terminal 12.

(3) Control Unit 230

The control unit 230, for example, may perform various controls on the basis of the data received in the communication unit 210. The control unit 230, for example, may perform the processing of S133 in FIG. 16 described below.

FIG. 5 may be a diagram illustrating an example of a display screen displayed by the display unit 140 of the terminal 10. FIG. 5 may be a diagram illustrating a display example that may be displayed on the display unit 140 of the terminal 10 by manipulating the terminal 10 to activate the application. As illustrated in FIG. 5, the display unit 140 may display the virtual space 300. The virtual space 300, for example, may be a three-dimensional space. In the virtual space 300, the avatar 80 and a first virtual venue 310 may be represented.

The avatar 80, for example, may be configured such that at least any one of walking, running, and jumping can be performed in the virtual space 300 in accordance with the manipulation of the user. In addition, the avatar 80, for example, may be configured such that either examining a virtual object or taking a seat on the virtual object can be performed in accordance with the manipulation of the user. Here, the virtual object, for example, an object corresponding to the avatar 80, a door, a chair, and the like. Note that, in a case where the user may manipulate the avatar 80 by using the terminal 10, data relevant to the manipulation may be transmitted to the server 20.

Note that, at least any one avatar 80 of a plurality of avatars 80 displayed on the display unit 140 may motion on the basis of the manipulation of the user, or may motion on the basis of a motion decided in advance. Here, a case where the avatar 80 motions on the basis of the motion decided in advance may indicate that the avatar 80 motions as a non player character (NPC).

In addition, all display modes of the avatar 80 illustrated in FIG. 5 may be the same, but may be not limited thereto. The display mode of the avatar 80 may be decided on the basis of data relevant to the user manipulating the avatar 80. Here, the "display mode of the avatar 80" may be the shape and/or the color of the avatar 80.

In addition, the motion of the avatar in the virtual space may be changed in tandem with the motion of the user. For example, in a case where the user may perform a nodding motion, the avatar in the virtual space may also perform the nodding motion. Here, motion data, for example, can be acquired by using a motion capture system. For easy understanding of a person skilled in the art who takes the advantage of the disclosure, a suitable motion capture system in several examples that can be used together with the devices and the methods disclosed in this application may include an optical motion capture system using a passive marker or an active marker or not using a marker, and an inertial and magnetic non-optical system. The motion data can be acquired by using an image capture device (such as a charge-coupled device (CCD) or a complementary metal oxide semiconductor (CMOS) image sensor) combined with a computer that converts the motion data into a moving image or other image data items.

In a case where the first avatar 80A illustrated in FIG. 5 may be manipulated, for example, the display unit 140 of the first terminal 11 may display a screen as illustrated in FIG. 6.

FIG. 6 may be a diagram illustrating an example of the display screen displayed by the display unit 140 of the first terminal 11. As illustrated in FIG. 6, the display unit 140 may display the virtual space 300. Specifically, for example, the display unit 140 may display the avatar 80 and the first virtual venue 310 existing in the virtual space 300. Note that, hereinafter, a case where it may be simply described as the "control unit 130" may indicate the "control unit 130 of the first terminal 11", and a case where it may be simply described as the "display unit 140" may indicate the "display unit 140 of the first terminal 11".

The avatar 80, for example, may include the first avatar 80A and a second avatar 80B. The first avatar 80A, for example, may be the avatar manipulated by the first user of the first terminal 11 displaying the virtual space 300 illustrated in FIG. 6. The second avatar 80B, for example, may be an avatar manipulated by a user who may be registered as a friend by the first user. The display unit 140 may display the back of the first avatar 80A, and the visual line of the first user manipulating the first terminal 11 and the visual line of the first avatar 80A corresponding to the first user may be in the same direction.

Note that, the avatar 80 may include a user other than the first avatar 80A and the second avatar 80B. For example, the avatar 80 may include an avatar manipulated by a user who may be not registered as a friend by the first user. In a case where the avatar 80 may include the avatar manipulated by the user who may not be registered as a friend by the first user, the first user may be capable of registering the avatar manipulated by the user who may not be registered as a friend by the first user as a friend.

In addition, in FIG. 6, the display unit 140 may display a virtual object corresponding to the first avatar 80A instead of displaying the first avatar 80A. In addition, in FIG. 6, the display unit 140 may display a virtual object corresponding to the second avatar 80B instead of displaying the second avatar 80B. Note that, the first avatar 80A, for example, may be an avatar generated on the basis of the module data stored in the storage unit 160 of the first terminal 11. Similarly, another avatar 80, for example, may be an avatar generated on the basis of the module data stored in the storage unit 160 of the terminal 10 corresponding to another avatar 80. On the other hand, the virtual object corresponding to the first avatar 80A, for example, may be drawn on the basis of data less than data used in the drawing of first avatar 80A. The virtual object corresponding to the first avatar 80A and the virtual object corresponding to another avatar 80, for example, may have approximately the same shape and/or color. As described above, by using the virtual object corresponding to the avatar 80, a load on the simultaneous drawing of a plurality of people can be reduced by a simple expression, and for example, the drawing can be viewed even on a terminal such as a smart phone.

The display unit 140, for example, may display a region in the virtual space including the first avatar 80A on the basis of a virtual viewpoint positioned in a direction near the paper plane of FIG. 6 from the first avatar 80A. The display unit 140, for example, may display a region including a traveling direction of the first avatar 80A in the virtual space 300. Note that, the display unit 140 may display a predetermined region in the virtual space 300, on the basis of the motion of the first avatar 80A. For example, in a case where the traveling direction of the first avatar 80A may be changed by 180 degrees, the display unit 140 may display the virtual object or the like behind the first avatar 80A in FIG. 6, instead of the display in FIG. 6. As described above, the display unit 140 may display a region other than the region illustrated in FIG. 6, on the basis of the motion of the first avatar 80A.

Figure 13:
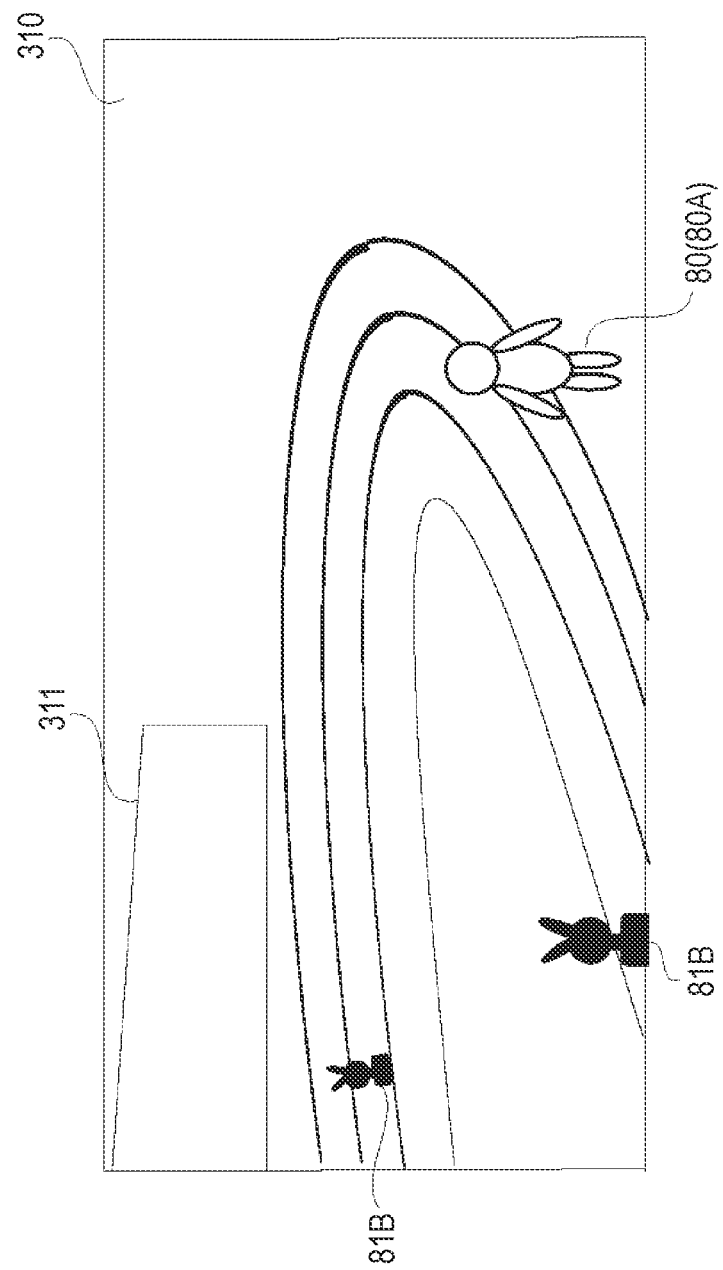
FIG. 13 is a diagram illustrating an example of the display screen displayed by the display unit 140 of the first terminal 11.

In a case where the user manipulating the first terminal 11 may manipulate the first avatar 80A, and the first avatar 80A illustrated in FIG. 6 may be positioned inside the first virtual venue 310, the display unit 140, for example, may display a display screen in FIG. 13. Hereinafter, a mode relevant to the display screen in FIG. 13 may be referred to as a first mode. Note that, a condition for the display unit 140 to display the display screen in FIG. 13 may be not limited to the fact that the first avatar 80A illustrated in FIG. 6 may be positioned inside the first virtual venue 310. For example, in a case where the first user activates the application described in the disclosure by using the first terminal 11, and the first user may perform a manipulation for selecting the first mode by using the first terminal 11, the display unit 140 may display the display screen in FIG. 13.

Note that, in FIG. 6, in a case where the first avatar 80A may be manipulated by the first user, the first terminal 11, for example, may acquire data relevant to the position of the first avatar 80A in the virtual space 300. In addition, for example, the data relevant to the position of the first avatar 80A in the virtual space 300 that may be acquired by the first terminal 11 may be transmitted to the server 20. Note that, a timing when the first terminal 11 may acquire the data relevant to the position of the first avatar 80A in the virtual space 300 may be an arbitrary timing. In addition, for example, a timing when the data relevant to the position of the first avatar 80A in the virtual space 300 that may be acquired by the first terminal 11 may be transmitted to the server 20 may be an arbitrary timing.

In addition, the first terminal 11 may be configured such that the touch manipulation can be performed with respect to an arbitrary region on the display unit 140 of the first terminal 11. In addition, in a case where the first terminal 11 may include an acceleration sensor (not illustrated), and the first terminal 11 may be operated, a display region and/or a direction displayed by the display unit 140 can be changed on the basis of the acceleration sensor. Here, the "arbitrary region" described above, for example, may include a region 301 and/or a region 314 in FIG. 6. The region 301 and/or the region 314 may be a manipulation user interface for performing predetermined display control by the touch manipulation. In addition, the "touch manipulation", for example, may indicate at least any one manipulation of a tap, a double tap, a swipe, a flick, pinch-in, and pinch-out. In addition, two regions 301 may be provided as illustrated in FIG. 6, or one or three or more regions 301 may be provided. Note that, in a case where two or more regions 301 are provided, one region 301, for example, may correspond to a region that may be used for the first avatar 80A to walk, and the other region 301, for example, may correspond to a region that may be used for the first avatar 80A to walk. In addition, the region 301 and/or the region 314 may be displayed in the same position or different positions not only in a case where the display in FIG. 6 may be performed but also in a case where display in other drawings (for example, FIG. 13 and/or FIG. 14) described below may be performed.

In addition, the first terminal 11 may be configured such that the first user may be capable of allowing the first avatar 80A to jump and/or walk by performing the touch manipulation with respect to the display unit 140. Here, the touch manipulation for the first avatar 80A to jump, for example, may be a manipulation for tapping or double-tapping any one region of the first avatar 80A or the region 301. In such a case, when performing a manipulation for tapping or double-tapping an arbitrary point, the display unit 140 may display a line segment connecting the first avatar 80A and the arbitrary point in an arbitrary color, and the first avatar 80A may walk to the arbitrary point along the line segment. In addition, the touch manipulation for the first avatar 80A to walk may be the manipulation for tapping or double-tapping the arbitrary point. In such a case, when performing the manipulation for tapping or double-tapping the arbitrary point, the display unit 140 may display a line segment connecting the first avatar 80A and the arbitrary point in an arbitrary color, and the first avatar 80A may walk to the arbitrary point along the line segment. In addition, the touch manipulation for the first avatar 80A to walk may be a manipulation for tapping or double-tapping an arbitrary point on a virtual straight line in the traveling direction after the traveling direction may be changed by performing a manipulation for flicking any one region of the first avatar 80A.

In addition, the first terminal 11 may be configured such that the first user may be capable of chatting with a user corresponding to at least one avatar 80 of all the avatars 80 through the region 314 on the display unit 140. Here, the region 314 may be a region displaying a message that may be input by the user corresponding to the avatar 80. In addition, the user chatting with the first user may be an individual user or exhibitors. In addition, in a case where a plurality of messages are displayed in the region 314, and all the messages are not capable of being displayed in the region 314, the messages that are not displayed in the region 314 can be displayed by performing the touch manipulation. Here, the touch manipulation in a case where all the messages may be not capable of being displayed in the region 314, for example, may be a swipe.

FIG. 13 may be a diagram illustrating an example of the display screen displayed by the display unit 140 of the first terminal 11. Hereinafter, the first mode illustrated in FIG. 13 will be described. The first virtual venue 310 may be illustrated in FIG. 13. The first virtual venue 310 may be an example of venues provided in the virtual space 300. As illustrated in FIG. 13, the display unit 140, for example, may display the first avatar 80A, a virtual object 81B, and a first display region 311. Note that, a URL when a display screen in a case where the first avatar 80A exists outside (for example, FIG. 6) the first virtual venue 310 may be displayed by using the web browser of the first terminal 11 may be different from a URL when a display screen in a case where the first avatar 80A exists inside (for example, FIG. 13) the first virtual venue 310 may be displayed by using the web browser of the first terminal 11. Therefore, in a case of using the web browser of the first terminal 11, and the first avatar 80A illustrated in FIG. 6 may be positioned inside the first virtual venue 310, the URL may be changed.

The first avatar 80A, for example, may be an avatar manipulated by the first user using the first terminal 11. The first user may be capable of moving the first avatar 80A in the first virtual venue 310 by using the first terminal 11. In the first mode, the control unit 130 may control the display unit 140 on the basis of the manipulation data for moving the first avatar 80A in the first virtual venue 310.

The virtual object 81B may be a virtual object corresponding to the avatar 80. The virtual object 81B, for example, may be a virtual object corresponding to the second avatar 80B of the user who may be registered as a friend with the first user. Note that, the virtual object 81B may include not only the virtual object corresponding to the second avatar 80B of the user who may be registered as a friend with the first user, but also a virtual object corresponding to the avatar 80 of the user who may not be registered as a friend with the first user. In addition, in FIG. 13, an example has been described in which two virtual objects 81B may be provided, but the number of virtual objects 81B is not limited to 2.

The first display region 311 may be a region for displaying a predetermined content. The predetermined content, for example, may be a moving image, but is not limited thereto.

In a case where the virtual object 81B may include the second virtual object corresponding to the avatar 80B of the user who may be registered as a friend with the first user and the virtual object corresponding to the avatar 80 of the user who may not be registered as a friend with the first user, the display unit 140 may display discriminatingly or undiscriminatingly the virtual object corresponding to the second avatar 80B of the user who may be registered as a friend with the first user and the virtual object corresponding to the avatar 80 of the user who may not be registered as a friend with the first user. As illustrated in FIG. 13, the color of each of the virtual objects 81B, for example, may be black.

In the first mode, in a case where the display unit 140 may display discriminatingly the virtual object corresponding to the second avatar 80B of the user who may be registered as a friend with the first user and the virtual object corresponding to the avatar 80 of the user who may not be registered as a friend with the first user, the form of the virtual object corresponding to the second avatar 80B of the user who may be registered as a friend with the first user and the form of the virtual object corresponding to the avatar 80 of the user who may not be registered as a friend with the first user may be displayed to be different from each other. Note that, the "form of the virtual object", for example, may be the shape and/or the color of the virtual object.

In the first mode, in a case where the first user may perform a predetermined manipulation by using the first terminal 11, the display unit 140 may display that the first avatar 80A takes a seat (sits down) in a predetermined position in the first virtual venue 310. Note that, in the first mode, the display unit 140 may display a location in which the first avatar 80A may be capable of taking a seat (sitting down), or may not display the location in which the first avatar 80A may be capable of taking a seat (sitting down). In a case where the display unit 140 may not display the location in which the first avatar 80A may be capable of taking a seat (sitting down), the first avatar 80A may be capable of taking a seat (sitting down) in an arbitrary location.

In addition, in a case where the avatar 80 take a seat on the virtual object, or the avatar 80 takes a seat in an arbitrary location other than the virtual object, the display unit 140 may display a display screen different from the display screen before the avatar 80 takes a seat, or may hide the user interface. In a case where the display unit 140 may display the display screen different from the display screen before the avatar 80 takes a seat, the display unit 140 may perform display such that the screen of a display target may be displayed in full screen.

In the first mode, in a case where the display unit 140 may display the location in which the first avatar 80A may be capable of taking a seat, the display unit 140 may display a plurality of chairs that can be seated. In such a case, for example, when the first user may perform a predetermined manipulation by using the first terminal 11 in a state where the first avatar 80A may be positioned in the vicinity of any one chair of the plurality of chairs by using first terminal 11, the display unit 140 may display that the first avatar 80A takes a seat on any one chair of the plurality of chairs. By the first avatar 80A taking a seat or sitting down, the first mode illustrated in FIG. 13 may be transitioned to a second mode illustrated in FIG. 14. That is, the display unit 140 may perform display relevant to a first-person viewpoint instead of display relevant to a third-person viewpoint. That is, the display unit 140 may perform display not including the first avatar 80A instead of display including the first avatar 80A.

In addition, for example, in a case where the user may manipulate the first avatar 80A to approach a specific chair of the plurality of chairs and may perform a predetermined manipulation, the display unit 140 may display a message for asking whether or not to sit on the specific chair. In a case where the display unit 140 may display the message for asking whether or not to sit on the specific chair, the first user may perform a predetermined manipulation indicating an intention to sit on the specific chair with respect to the message by using the first terminal 11, and the display unit 140 may display that the first avatar 80A takes a seat on any one chair of the plurality of chairs. By the first avatar 80A taking a seat or sitting down, the first mode illustrated in FIG. 13 may be transitioned to the second mode illustrated in FIG. 14.

In addition, in the first mode, the control unit 130 may control the display unit 140 such that a second display region displaying the virtual object 81B corresponding to at least one avatar 80 other than the first avatar 80A and a message included in the message data transmitted from the terminal 10 of the user manipulating the at least one avatar 80 other than the first avatar 80A may be displayed. In such a case, the display unit 140 may display the second display region around the virtual object 81B corresponding to the avatar 80 that may have transmitted the message data, and may display the message included in the message data in the second display region. Accordingly, a correspondence relationship between the second display region and the user manipulating the terminal 10 that may have transmitted the message data may be clarified. Therefore, the first user may be capable of recognizing the user who may have transmitted the message included in the second display region. Note that, the second display region, for example, may be a speech balloon.

Note that, in a case where at least one virtual object 81B and at least one speech balloon may be displayed, and any one virtual object 81B and any one speech balloon overlap with each other, the display unit 140 may display the virtual object 81B and the speech balloon not to overlap with each other by changing a display position of the virtual object 81B and/or the speech balloon.

In addition, in a case where the at least one virtual object 81B and the at least one speech balloon may be displayed, and any one virtual object 81B and any one speech balloon overlap with each other, the display unit 140 may display the virtual object 81B and the speech balloon not to overlap with each other by making display timings of the virtual object 81B and the speech balloon different from each other.

In addition, in a case where a distance between an arbitrary position and the virtual object 81B in the virtual space may be a predetermined value or more, the display unit 140 may display the effect that data relevant to the message may be transmitted from the terminal of the user manipulating the at least one second avatar corresponding to the virtual object 81B, around the virtual object 81B. Here, the "arbitrary position" described above, for example, may be the position of the first avatar 80A existing in the virtual space 300. Accordingly, in a case where the message may be transmitted from the user corresponding to the at least one second avatar corresponding to the virtual object 81B, the display unit 140 may be capable of performing display for specifying the virtual object 81B corresponding to the message even when the message is not visible for the first user through the display unit 140. Therefore, the first user may be capable of specifying the virtual object 81B corresponding to the message.

Figure 14:
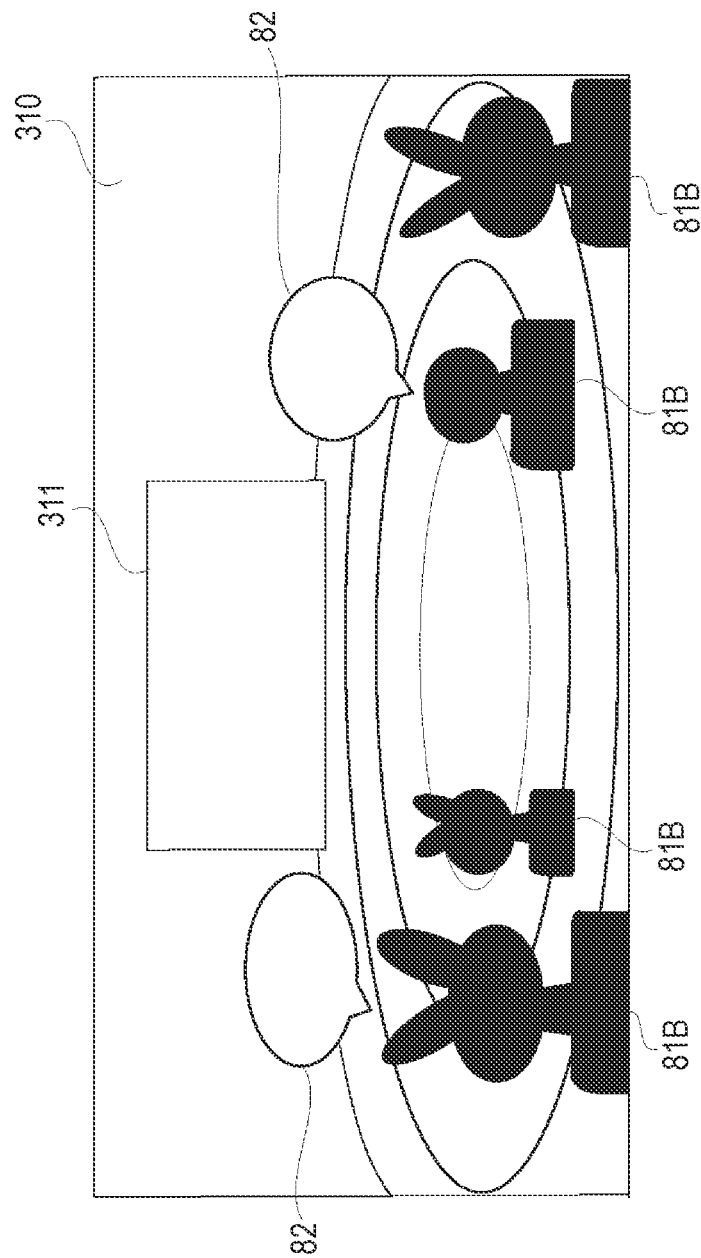
FIG. 14 is a diagram illustrating an example of the display screen displayed by the display unit 140 of the first terminal 11.

FIG. 14 may be a diagram illustrating an example of the display screen displayed by the display unit 140 of the first terminal 11. FIG. 14 may be a diagram illustrating an example of display contents displayed by the display unit 140 of the first terminal 11 in a case where the first user registers four friends. In addition, FIG. 14 may be a diagram illustrating a display example relevant to a viewing mode (the second mode) for viewing a content displayed in the first display region 311. Hereinafter, the second mode illustrated in FIG. 14 will be described. Here, friends displayed in FIG. 14 may be a user who executes and logs in the same application as the application that may be executed by the first user using the first terminal 11.

In the second mode, the display unit 140 may display the second avatar 80B of the user who may be registered as a friend and/or the virtual object 81B corresponding to the second avatar 80B of the user who may be registered as a friend. On the other hand, the display unit 140, for example, may not display the first avatar 80A. Note that, the display unit 140 may display the second avatars 80B of some users of the four users registered as a friend, and may display the virtual objects 81B corresponding to the second avatars 80B of the remaining users of the four users registered as a friend. As described above, the display unit 140 may perform the display of a first-person viewpoint instead of the display of a third-person viewpoint, and thus, a sense of immersion of the user manipulating the terminal 10 can be improved. In addition, a richer expression may be obtained by displaying some users with the avatars but not the virtual objects corresponding to the avatars.

In the second mode, the display unit 140, for example, may display a speech balloon 82 around the second avatar 80B and/or the virtual object 81B. In addition, the display unit 140 may display the message included in the message data transmitted from the terminal of the user who may be registered as a friend in the speech balloon 82. Accordingly, a correspondence relationship between the message included in the speech balloon 82 and the user who may be registered as a friend may be clarified. Therefore, the first user may be capable of recognizing the user who may have transmitted the message included in the speech balloon 82. In addition, the display unit 140, for example, may display the second avatar 80B and/or the virtual object 81B in a predetermined distance in the first virtual venue 310, on the basis of the predetermined position.

In the second mode, the display unit 140, for example, may display the virtual object 81B such that the first display region 311 does not overlap with other regions. Here, the "other regions", for example, may be the region of the second avatar 80B, the virtual object 81B, and/or the speech balloon 82. Accordingly, it may be possible to reduce a possibility that the visibility of a content displayed in the first display region 311 in a case of viewing the content may be degraded.

In the second mode, in a case where the display unit 140 may display the second avatar 80B, the first terminal 11, for example, may acquire part data including part identification information of at least one second avatar 80B. The display unit 140 may display the at least one second avatar 80B that may be decided on the basis of the part identification information.

In the second mode, at a predetermined time, a predetermined content may be reproduced in the first display region 311. Here, the time used in the virtual space may be a time synchronized to be identical to the actual time, or may be a time used in the virtual space 300 separately from the actual time. Note that a condition for reproducing a moving image in the first display region 311 may be regardless of the time. For example, the condition for reproducing the moving image in the first display region 311, for example, may be that the first avatar 80A takes a seat (sits down) in a predetermined position in the first virtual venue 310.

Note that, in the second mode, in a case where the display unit 140 may display a plurality of second avatars 80B, the second avatars 80B of a plurality of users registered as a friend with the first user in different forms, respectively. For example, in a case where the user corresponding to the second avatar 80B selects the part of the avatar before the second mode may be performed, and the display unit 140 may display the plurality of second avatars 80B, the second avatar 80B may be displayed by using the part of the avatar. In addition, in the second mode, in a case where the display unit 140 may display a plurality of virtual objects corresponding to the second avatars 80B of a plurality of users registered as a friend with the first user, the plurality of virtual objects corresponding to the second avatars 80B of the plurality of users registered as a friend with the first user may be displayed in different forms, respectively. Here, "displaying in different forms" may indicate displaying the virtual objects corresponding to the parts of the avatars that may be set, respectively. Accordingly, the display unit 140, for example, may display the virtual objects in different shapes and/or different colors, respectively.

In addition, in the second mode, in a case where the first user may perform a first manipulation by using the first terminal 11, the second mode may be switched to the first mode. Note that, the first manipulation, for example, may be a manipulation for requesting a switch from the second mode to the first mode. In addition, the first manipulation, for example, may be a manipulation that may be performed in a case of leaving a seat such as a case where the first user finishes viewing the content displayed in the first display region 311. In addition, the first manipulation, for example, may be a manipulation that is performed in a case where the first user stops viewing the content displayed in the first display region 311 in the middle of viewing the content and leaves a seat. Accordingly, the display unit 140, for example, may display the screen as illustrated in FIG. 13. Accordingly, the display unit 140 may display again the first avatar 80A, the virtual object 81B, and the first display region 311.

In addition, in the second mode, in a case where the first user performs a manipulation other than the first manipulation, the first terminal 11 may be configured not to accept the manipulation other than the first manipulation. Accordingly, in the second mode, even in a case where the first user accidentally performs a manipulation for moving the first avatar 80A, the display unit 140 may be capable of continuously displaying the display screen as illustrated in FIG. 14.

In addition, the control unit 130 may decide an upper limit value (a first upper limit value) of the number of second avatars 80B and/or virtual objects 81B displayed by the display unit 140 in the second mode. For example, in a case where the number of users who are registered as a friend is greater than the first upper limit value, and the first mode is transitioned to the second mode, the control unit 130 may decide at least one user from the plurality of users registered as a friend. In such a case, the control unit 130 may decide the at least one user from the plurality of users registered as a friend, on the basis of the manipulation data that may be transmitted from the first terminal 11 by the first user manipulating the first terminal 11. In addition, the control unit 130 may decide randomly the at least one user from the plurality of users registered as a friend. In addition, the control unit 130 may decide the at least one user from the plurality of users registered as a friend, on the basis of a priority order decided in advance. In a case where the control unit 130 decided the at least one user from the plurality of users registered as a friend, the number of at least one users may be the first upper limit value or less. As described above, in the second mode, the display unit 140 may display the second avatar 80B corresponding to the at least one user decided from the plurality of users registered as a friend and/or the virtual object 81B corresponding to the at least one user decided from the plurality of users registered as a friend. Note that, the priority order decided in advance, for example, may be decided in consideration of at least any affinity of the past group viewing history, the past chat history, user attribute data, and avatar part data.

Note that, the server 20 may transmit data relevant to at least any one of the number of simultaneous connections, the user, and the attribute of an event to the first terminal 11. Then, the first terminal 11 may receive the data, and may decide the total number of avatars 80 displayed by the display unit 140, in consideration of drawing performance. Accordingly, even in a case where the first terminal 11 does not have the advanced performance, and the first terminal 11 is capable of drawing the avatar 80 such that the first user manipulating the first avatar 80A can feel the synchronization in the range of the performance of the first terminal 11. In addition, the first terminal 11 may decide the total number of avatars 80 as described above in consideration of at least any one of the number of vertices of the mesh, the material, and the number of textures of a 3D model that can be drawn.

In addition, the display unit 140 may simultaneously display the speech balloon 82 and the message displayed in the speech balloon 82, or may display the speech balloon 82 prior to the message displayed in the speech balloon 82. In addition, the display unit 140 may hide the message included in the speech balloon 82 when a predetermined time may have elapsed after the message included in the speech balloon 82 may be displayed. As described above, the display unit 140 may display the speech balloon 82 prior to the message, and thus, it may be possible to inform the user that the message will be displayed afterward. Therefore, it may be possible to prevent the user from missing the message.

In addition, in a case where the first avatar 80A exists in the virtual space 300 illustrated in FIG. 6, the first user may be capable of performing a manipulation for registering another user as a friend by using the first terminal 11. In addition, in a case where the first avatar 80A exists in the first virtual venue 310 illustrated in FIG. 13, and the first mode illustrated in FIG. 13 is not transitioned to the second mode illustrated in FIG. 14 yet, the first user may be capable of performing the manipulation for registering another user as a friend by using the first terminal 11.

In addition, a condition for the first user to register another user as a friend may be a condition that may be satisfied in a case where the first terminal 11 transmits data for requesting the first user to register another user as a friend. In addition, the condition for the first user to register another user as a friend may be a condition that is satisfied in a case where the first terminal 11 transmits the data for requesting the first user to register another user as a friend, and the terminal 10 of another user transmits data for approving the request that the first user registers another user as a friend.

In addition, in the first mode, in a case where there may be a plurality of locations that can be seated in the first virtual venue 310, the display unit 140 may display a display screen relevant to the second mode corresponding to a location in which the first avatar 80A takes a seat, or the display unit 140 may display a display screen relevant to the second mode regardless of the location in which first avatar 80A takes a seat. For example, in a case where there are three positions that can be seated in the virtual venue illustrated in FIG. 13, the display unit 140 may display FIG. 14 as display relevant to the second mode even when the first avatar 80A takes a seat in any of the three positions. Accordingly, the display unit 140 may be capable of displaying the entire region of the first display region 311 regardless of the location in which the first avatar 80A takes a seat. The display unit 140 may display the display screen relevant to the second mode corresponding to the location in which the first avatar 80A takes a seat, and thus, it may be possible to have more sense of reality. In addition, the display unit 140 may display the display screen relevant to the second mode regardless of the location in which the first avatar 80A takes a seat, and thus, it may be possible to reduce a load on drawing processing.

In addition, an example has been described in which in the first mode, in a case where the first avatar 80A takes a seat, the display unit 140 may be switched to the second mode from the first mode, but the disclosure is not limited thereto. For example, in a case where the first avatar 80A may be manipulated, and the first avatar 80A may be positioned in a predetermined region in the first virtual venue 310, the display unit 140 may display the display screen relevant to the second mode. In addition, for example, in a case of performing a manipulation for instructing the first avatar to enter the first virtual venue 310 from a region different from the first virtual venue 310 in the virtual space 300, the display unit 140 may display the display screen relevant to the second mode. Here, the "manipulation for instructing the first avatar to enter the first virtual venue 310 from the region different from the first virtual venue 310 in the virtual space 300", for example, may be a case of performing a predetermined manipulation when the first avatar 80A exists in the virtual space 300 illustrated in FIG. 6. The "predetermined manipulation when existing in the virtual space 300 illustrated in FIG. 6", for example, may be a manipulation including an instruction that the first user intends to allow the first avatar 80A to enter the first virtual venue 310 by using the first terminal 11. In addition, in a case where the first user activates the application described in the disclosure by using the first terminal 11, and the first user may perform a manipulation for selecting the second mode by using the first terminal 11, the display unit 140 may display the display screen relevant to the second mode.

In addition, the display unit 140 may display a third display region (not illustrated) displaying chats in chronological order, in at least any one mode of the first mode and the second mode. The third display region, for example, may be a rectangular frame. The display unit 140 may display the message included in the message data transmitted from the terminal 10, in the rectangular frame. In a case where the display unit 140 may display at least one message, and then, may display a new message, in the rectangular frame, the new message may be displayed in priority to the at least one message. In addition, in a case where the display unit 140 may display the message in the rectangular frame, a time when the message data relevant to the message may be transmitted may be displayed together with the message. Note that, the terminal 10, for example, may include only the first terminal 11 and the second terminal 12, or may include terminal other than the first terminal 11 and the second terminal 12. The third display region, for example, may be a region displaying the message transmitted from the terminal 10. The third display region, for example, may be a rectangular frame, and the display unit 140 may display the message included in the message data transmitted from the terminal 10, in the rectangular frame. The display unit 140, for example, may display the message included in the message data transmitted from the first terminal 11, in the third display region. The display unit 140, for example, may display a message included in message data transmitted from the second terminal 12, in the third display region.

Here, in a case where the display unit 140 displays the third display region, and the message data is transmitted from the second terminal 12, the display unit 140 may display the message in the speech balloon 82 around the second avatar 80B corresponding to the second terminal 12, and may display the message in the third display region.

In addition, in a case where the display unit 140 displays the third display region, the display unit 140 may display the third display region such that the third display region does not overlap with other regions. Here, the "other regions", for example, may be the region of the second avatar 80B, the virtual object 81B, the speech balloon 82, and/or the first display region 311. Accordingly, it may be possible to reduce a possibility that the visibility of a message displayed in the third display region in a case of checking the message may be degraded.

Here, after the message is displayed in the third display region at a first time, the message may be continuously displayed in the third display region regardless of the lapse of time. In addition, for example, after the message may be displayed in the third display region at the first time, the message may not be displayed in the third display region when a predetermined time may have elapsed. In addition, for example, in a case where at least another message may be displayed in the third display region later than the first time after the message may be displayed in the third display region at the first time, the message displayed in the third display region at the first time may be hidden.

Note that, in a case where the display unit 140 displays the third display region and the users chat with each other, a user ID and the avatar 80 in the chat may be associated with each other, or may not be associated with each other.

4. Operation of System 1000

Figure 15:
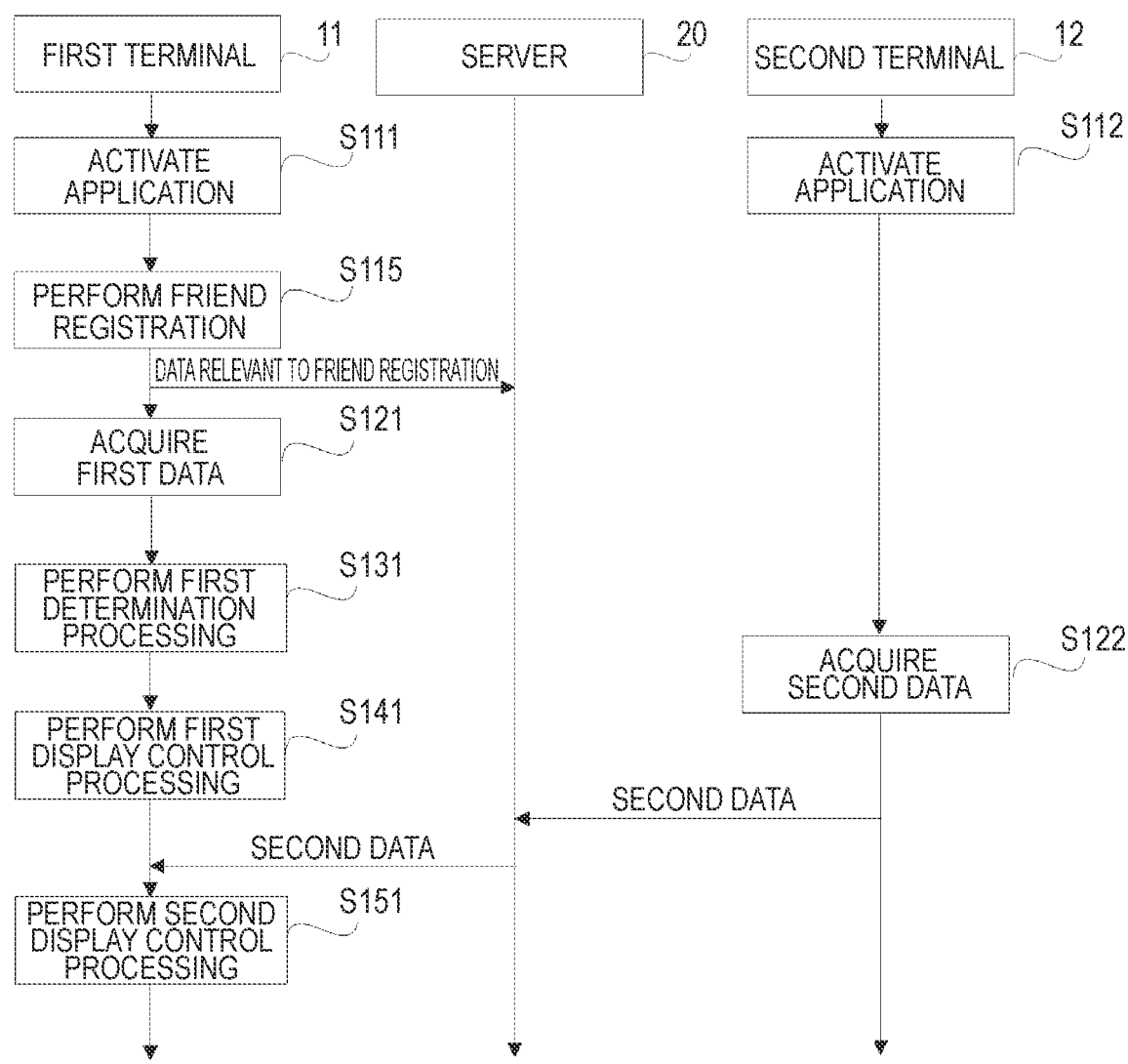
FIG. 15 is an example of a flowchart illustrating the processing that may be performed according to an exemplary embodiment.
Figure 16:
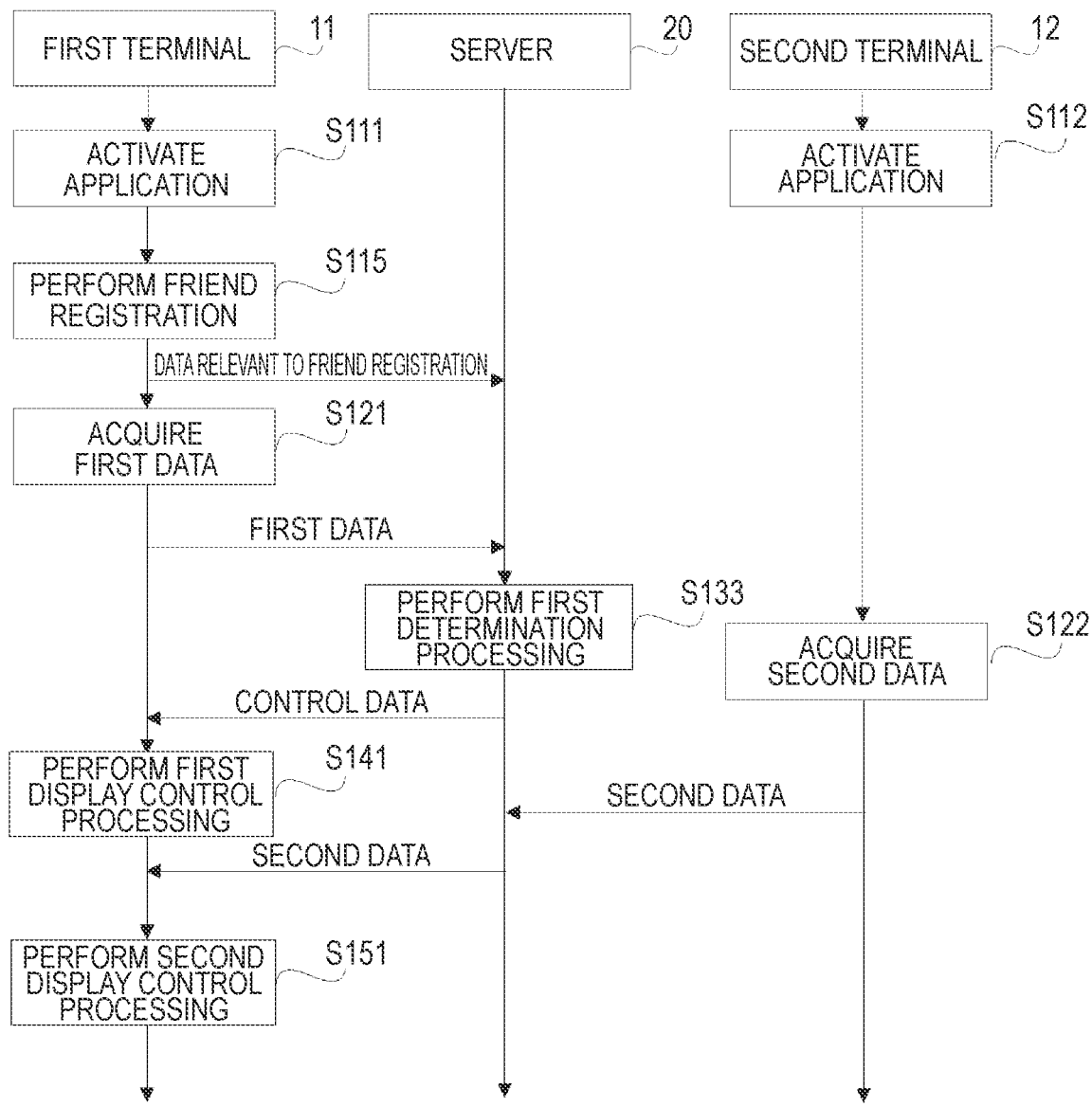
FIG. 16 is an example of a flowchart illustrating the processing that may be performed according to an exemplary embodiment.

The operation of the system 1000 will be described with reference to FIG. 15 and FIG. 16. FIG. 15 and FIG. 16 may be flowcharts illustrating an example of the operation performed by using the system 1000 illustrated in FIG. 1.

First, S111 to S151 will be sequentially described with reference to FIG. 15.

In S111, the first user may manipulate the first terminal 11 to activate the application, and in S112, the second user may manipulate the second terminal 12 to activate the application. Here, the second user may be a user who is registered as a friend by the first user.

In S115, the first terminal 11 may acquire the manipulation data for the first user to select at least one second avatar from the plurality of second avatars. Accordingly, a user who views a predetermined content displayed in the first display region 311 together with the first user may be decided. In a case where the user who is registered as a friend with the first user may be decided, data relevant to the user who may be registered as a friend with the first user (in FIG. 15, data relevant to friend registration) may be transmitted to the server 20.

Note that, in FIG. 15, an example may be illustrated in which two terminals including the first terminal 11 and the second terminal 12 may be provided as the terminal 10, but the terminal 10 may include at least another terminal in addition to the first terminal 11 and the second terminal 12.

In S121, the first terminal 11 may acquire the first data. The first data, for example, may include data relevant to an avatar in the virtual space that may be manipulated by using the first terminal 11. The first data, for example, may include manipulation data for manipulating the first avatar 80A in a case where the first avatar 80A exists in the first virtual venue 310.

In S131, the first terminal 11 may perform first determination processing. Here, the first determination processing may determine whether or not a first condition relevant data included in the first data is satisfied. The first determination processing, for example, may determine whether or not the first data includes predetermined manipulation data. Here, the predetermined manipulation data, for example, may be data for instructing the first avatar 80A to take a seat in a case where the first avatar 80A exists in the first virtual venue 310 illustrated in FIG. 13.

In S131, the first terminal 11 may perform the first determination processing. In S131, in a case where it is determined that the first condition is satisfied, the first terminal 11 may decide the control data for controlling the display unit 140 of the first terminal 11, and the processing of S141 may be executed. On the other hand, in S131, in a case where the first terminal 11 determines that the predetermined condition is not satisfied, the processing of S131 may be repeated. The control data decided in S131 may be data for controlling the display screen of the first terminal 11. In addition, the control data decided in S131 may include data for controlling the display unit 140 of the first terminal 11 such that the first mode illustrated in FIG. 13 may be switched to the second mode illustrated in FIG. 14.

In S141, the first terminal 11 may perform processing of controlling the display unit 140 of the first terminal 11 on the basis of the control data (first display control processing).

The first display control processing, for example, may indicate display control processing of performing the display relevant to the second mode (for example, FIG. 14). Specifically, for example, the display unit 140 of the first terminal 11 may display the avatar 80 and/or the virtual object 81B corresponding to the user who may be registered as a friend in S115.

After the processing of S112, in S122, the second terminal 12 may acquire the second data, and the second terminal 12 may transmit the second data to the server 20. Here, the second data, for example, may be the message data transmitted from the second terminal 12 manipulating the second avatar. The server 20 may receive the second data from the second terminal 12, and may transmit the second data to the first terminal 11. After the first terminal 11 may perform the processing of S141 and after the first terminal 11 may receive the second data from the server 20, the processing of S151 may be performed.

In S151, the first terminal 11 may perform processing of controlling the display unit 140 of the first terminal 11 on the basis of the second data (second display control processing). The second display control processing, for example, may indicate display control of displaying the message included in the message data transmitted from the second terminal 12 in the speech balloon 82 while performing the display relevant to the second mode (for example, FIG. 14).

Next, S111 to S151 will be sequentially described with reference to FIG. 16.

In S111, the first user may manipulate the first terminal 11 to activate the application, and in S112, the second user may manipulate the second terminal 12 to activate the application. Here, the second user may be a user who is registered as a friend by the first user.

In S115, the first terminal 11 may acquire manipulation data for the first user to select at least one second avatar from the plurality of second avatars. Accordingly, a user who views a predetermined content displayed in the first display region 311 together with the first user may be decided. In a case where the user who is registered as a friend with the first user may be decided, data relevant to the user who is registered as a friend with the first user (in FIG. 16, data relevant to friend registration) may be transmitted to the server 20.

Note that, in FIG. 16, an example may be illustrated in which two terminals including the first terminal 11 and the second terminal 12 may be provided as the terminal 10, but the terminal 10 may include at least another terminal in addition to the first terminal 11 and the second terminal 12.

In S121, the first terminal 11 may acquire the first data. The first data, for example, may include data relevant to an avatar in the virtual space that may be manipulated by using the first terminal 11. The first data, for example, may include manipulation data for manipulating the first avatar 80A in a case where the first avatar 80A exists in the first virtual venue 310. After S121, the server 20 may receive the first data from the first terminal 11.

In S133, the server 20 may perform the first determination processing. Here, the first determination processing of S133 in FIG. 16 may be the same as the first determination processing of S131 in FIG. 15. In S133, in a case where the server 20 determines that a predetermined condition (the first condition) is satisfied, the server 20 may decide the control data and may transmit the control data to the first terminal 11, and the processing of S141 may be executed. On the other hand, in S133, in a case where it is determined that the predetermined condition is not satisfied, the processing of S133 may be repeated. Note that, the control data decided in S133 may be data for controlling the display screen of the first terminal 11.

In S141, the first terminal 11 may perform processing of controlling the display unit 140 of the first terminal 11 on the basis of the control data (first display control processing). The first display control processing, for example, may indicate display control processing of performing the display relevant to the second mode (for example, FIG. 14).

After the processing of S112, in S122, the second terminal 12 may acquire the second data, and the second terminal 12 may transmit the second data to the server 20. Here, the second data, for example, may be the message data transmitted from the second terminal 12 manipulating the second avatar. The server 20 may receive the second data from the second terminal 12, and may transmit the second data to the first terminal 11. After the first terminal 11 may perform the processing of S141 and after the first terminal 11 may receive the second data from the server 20, the processing of S151 may be performed.

In S151, the first terminal 11 may perform processing of controlling the display unit 140 of the first terminal 11 on the basis of the second data (second display control processing). The second display control processing, for example, may indicate display control of displaying the message included in the message data transmitted from the second terminal 12 in the speech balloon 82 while performing the display relevant to the second mode (for example, FIG. 14).

Note that, in a case where the first terminal 11 receives the control data and the second data from the server 20 after the processing of S121, the first display control processing of S141 may be performed, and the second display control processing of S151 may be performed. In such a case, the control unit 130 may perform the display control of switching the first mode to the second mode (the first display control processing), and may perform the display control of displaying the message included in the message data transmitted from the second terminal 12 in the speech balloon 82 in the second mode (the second display control processing).

In addition, in FIG. 15 and/or FIG. 16, the server 20 may perform various instances of processing by using the data relevant to the friend registration that may be received from the first terminal 11. For example, in FIG. 15 and/or FIG. 16, in a case where the server 20 receives the second data from the second terminal 12, the server 20 may determine whether or not the user manipulating the second terminal 12 that may have transmitted the second data may be the user who is registered as a friend with the first user. Then, in a case where the server 20 determines that the user manipulating the second terminal 12 that may have transmitted the second data may be the user who is registered as a friend with the first user, the server 20 may transmit the second data to the first terminal 11.

In addition, at least a part of the processing of the processing of FIG. 15 and/or the processing of FIG. 16 may be suitably omitted.

As described above, the control data for controlling the display unit 140 such that the first display region 311, the second avatar 80B, and the message included in the message data transmitted from the second terminal 12 manipulating the second avatar 80B may be displayed may be decided, and the display unit 140 may be controlled on the basis of the control data. Accordingly, the user manipulating the first avatar 80A may be capable of checking the message displayed around the second avatar 80B of the user who may be registered as a friend while viewing a moving image displayed in the first display region 311. Therefore, attractiveness increases, compared to the related art.

5. Modification Example

Note that, as illustrated in FIG. 11, a first sensor 102a, a second sensor 102b, a camera 102c, and a microphone 102d may be provided, in addition to the terminal 10 illustrated in FIG. 3. FIG. 11 may be a block diagram illustrating an example of the terminal 10 illustrated in FIG. 3, and a configuration that may be connected to the terminal 10. Here, the terminal 10, the first sensor 102a, the second sensor 102b, the camera 102c, and the microphone 102d, for example, may be connected to each other in a wired or wireless manner.

The first sensor 102a, for example, may be connected to the camera 102c in a wired or wireless manner. The camera 102c, for example, may include a RGB camera imaging a visible ray and a near infrared camera imaging a near infrared ray. As the camera 102c, for example, a camera included in a true depth camera of an IPHONE X (Registered Trademark) can also be used. The second sensor 102b, for example, may be connected to the microphone 102d in a wired or wireless manner. Note that, the first sensor 102a and the camera 102c may be provided as one configuration. In addition, the second sensor 102b and the microphone 102d may be provided as one configuration.

As described above, the terminal 10 may transmit an image imaged by the camera 102c to the server 20. In addition, the terminal 10 may transmit voice data input to the microphone 102d to the server 20. In addition, the terminal 10 may transmit moving image data using the camera 102c and the microphone 102d to the server 20.

FIG. 12 illustrates an example of generalizing a suitable computation environment 1400 in which the embodiments, the techniques, and the technologies, described herein, can be implemented, including rendering a video in a computation environment by transmitting and using a token. For example, as described herein, in the computation environment 1400, any one of a terminal device (or a distributor or a viewer), a distribution server system, and the like, can be implemented.

Since the technologies can be implemented in various general or dedicated computation environments, the computation environment 1400 is not intended to indicate any limitation on the use of the technology or the range of the function. For example, the technologies disclosed herein may be implemented in various other computer system configurations including various portable devices, various multiprocessor systems, various microprocessor-based or programmable household electrical appliances, various network PCs, various minicomputers, various mainframe computers, and the like. The technologies disclosed herein may be performed in a distributed computation environment in which a task may be executed by a remote processing device linked through a communication network. In the distributed computation environment, a program module may be arranged in both of local and remote memory storage devices.

The computation environment 1400 may include at least one central processing unit 1410 and at least one memory 1420, with reference to FIG. 12. In FIG. 12, the most basic configuration 1430 may be included in a broken line. The central processing unit 1410 executes a computer-executable command, and the central processing unit 1410 may be an actual processor or a virtual processor. In a multiprocessing system, a plurality of processors can be simultaneously operated in order to improve processing power by a plurality of processing units executing the computer-executable command. The memory 1420 may be a volatile memory (for example, a register, a cash, and a RAM), a non-volatile memory (for example, a ROM, an EEPROM, a flash memory, and the like), or a combination thereof. The memory 1420, for example, may store software 1480 capable of implementing the technologies described herein, and various images and videos. The computation environment may have various additional functions. For example, the computation environment 1400 may include a storage 1440, one or a plurality of input devices 1450, one or a plurality of output devices 1460, and one or a plurality of communication connections 1470. An interconnection mechanism (not illustrated) such as a bus, a controller, or a network may connect various components of the computation environment 1400 to each other. In general, operating system software (not illustrated) may provide an operating environment for other software that may be executed in the computation environment 1400, and may adjust various activities of various components of the computation environment 1400.

The storage 1440 may be removable, or may not be removable, and may include a magnetic disk, a magnetic tape or a cassette, a CD-ROM, a CD-RW, a DVD, or any other medium that can be used to store data and may be accessible in the computation environment 1400. The storage 1440 may store commands for the software 1480, plug-in data, and a message that can be used to implement the technologies described herein.

One or the plurality of input devices 1450 may be a touch input device such as a keyboard, a keypad, a mouse, a touch screen display, a pen, or a trackball, a voice input device, a scanning device, or another device providing input to the computation environment 1400. In a case of audio input, one or the plurality of input devices 1450 may be a sound card receiving analog or digital audio input or similar devices, or a CD-ROM reader providing various audio samples to the computation environment 1400. One or the plurality of output devices 1460 may be a display, a printer, a speaker, a CD writer, or another device providing the output from the computation environment 1400.

One or the plurality of communication connections 1470 may be capable of performing communication with respect to another computation entity through a communication medium (for example, a connection network). The communication medium transfers data such as a computer-executable command, compressed graphics data, a video, or the other data included in a modulated data signal. One or the plurality of communication connections 1470 are not limited to wired connection (for example, megabit or gigabit Ethernet, InfiniBand, or a fiber channel through electrical or optical fiber connection), and include wireless technology (for example, RF connection through Bluetooth, WiFi (IEEE 802.11a/b/n), WiMax, cellular, a satellite, laser, and an infrared ray), and various other suitable communication connections providing network connection to various agents, various bridges, and various data consumers of a destination agent, disclosed herein. In a virtual host environment, one or the plurality of communication connections may be virtualized network connection that may be provided by a virtual host.

Various embodiments of various methods disclosed herein can be executed by using a plurality of computer-executable commands for implementing all or a part of the technologies disclosed herein, in a computation cloud 1490. For example, various agents may be capable of executing various vulnerability scan functions in the computation environment, and an agent platform (for example, a bridge) and a consumer service of destination agent data can be executed by various servers positioned inside the computation cloud 1490.

A computer-readable medium may be an arbitrary available medium that may be assessable in the computation environment 1400. As an example, for the computation environment 1400, the computer-readable medium may include the memory 1420 and/or the storage 1440, but may be not limited thereto. For easy understanding, the term of computer-readable medium may include a data storage medium such as the memory 1420 and the storage 1440, and may not include a transmission medium for various modulated data signals and the like.

Various embodiments described above can be used by being combined with each other unless there may be contradiction or inconvenience. It should be understood that various embodiments exemplified may be merely various preferred examples, in consideration of many available embodiments to which the principles of the disclosure provided herein can be applied, and the technical scope of the embodiments provided in the claims is not considered to be limited to various preferred examples. In practice, the technical scope of the embodiments provided in the claims may be defined by the accompanying claims. Therefore, the grant of patent may be requested to correspond to the technical scope of the embodiments described in the claims.

A computer program according to a thirty-third exemplary embodiment, which may be embodied on a non-transitory computer-readable medium, may be characterized by "a computer program that may be executed by at least one processor and may allow the at least one processor to: acquire first data including motion data of a first avatar in a virtual space that may be configured to be manipulated by using a first terminal of a first user; determine whether or not a first condition relevant to data included in the first data may be satisfied; decide control data for controlling a display unit of the first terminal such that a first display region displaying a moving image in a first virtual venue in the virtual space, at least one second avatar of at least one avatar other than the first avatar, and a message included in message data transmitted from a terminal associated with and configured to manipulate the at least one second avatar may be displayed when the first condition may be satisfied; and control the display unit on the basis of the control data".

A computer program according to a thirty-fourth exemplary embodiment, which may be embodied on a non-transitory computer-readable medium, may be characterized by "a computer program that may be executed by at least one processor and may allow the at least one processor to: receive first data including motion data of a first avatar in a virtual space that may be configured to be manipulated by using a first terminal of a first user, through a communication line; determine whether or not a first condition relevant to data included in the first data may be satisfied; decide control data for controlling a display unit of the first terminal such that a first display region displaying a moving image in a first virtual venue in the virtual space, at least one second avatar of at least one avatar other than the first avatar, and a message included in message data transmitted from a terminal associated with and configured to manipulate the at least one second avatar may be displayed when the first condition may be satisfied; and transmit the control data to the first terminal".

In the thirty-third exemplary embodiment or the thirty-fourth exemplary embodiment described above, a computer program according to a thirty-fifth exemplary embodiment may be characterized by "the at least one second avatar may be decided before the determination may be performed".

In any one of the thirty-third exemplary embodiment to the thirty-fifth exemplary embodiment described above, a computer program according to a thirty-sixth exemplary embodiment may be characterized by "the display unit may display the message around the avatar manipulated by the terminal that may have transmitted the message data not to overlap with the first display region".

In the thirty-sixth exemplary embodiment described above, a computer program according to a thirty-seventh exemplary embodiment may be characterized by "the display unit may hide the message included in the message data transmitted from the terminal manipulating the at least one second avatar when a predetermined time may have elapsed after the message may be displayed".

In any one of the thirty-third exemplary embodiment to the thirty-seventh exemplary embodiment described above, a computer program according to a thirty-eighth exemplary embodiment may be characterized by "the display unit may display the at least one second avatar and the first display region not to overlap with each other".

In any one of the thirty-third exemplary embodiment to the thirty-eighth exemplary embodiment described above, a computer program according to a thirty-ninth exemplary embodiment may be characterized by "the display unit may display the at least one second avatar in a predetermined distance on the basis of a predetermined position".

In any one of the thirty-third exemplary embodiment to the thirty-ninth exemplary embodiment described above, a computer program according to a fortieth exemplary embodiment may be characterized by "the at least one second avatar may be a plurality of second avatars, and the display unit may display at least two avatars of the plurality of avatars in different forms, respectively".

In the fortieth exemplary embodiment described above, a computer program according to a forty-first exemplary embodiment may be characterized by "part data including part identification information of the at least one second avatar may be acquired, and the display unit may display the at least one second avatar that may be decided on the basis of the part identification information".

In any one of the thirty-third exemplary embodiment to the forty-first exemplary embodiment described above, a computer program according to a forty-second exemplary embodiment may be characterized by "the display unit may display a third avatar that may be displayed in a form different from that of the first avatar and the at least one second avatar".

In any one of the thirty-third exemplary embodiment to the forty-second exemplary embodiment described above, a computer program according to a forty-third exemplary embodiment may be characterized by "the first condition may be that the first data may be data relevant to an instruction for the first avatar to sit down or take a seat in accordance with selection of a seat provided in the first virtual venue".

In any one of the thirty-third exemplary embodiment to the forty-second exemplary embodiment described above, a computer program according to a forty-fourth exemplary embodiment may be characterized by "the first condition may be that the first data may be data relevant to an instruction for the first avatar to enter the first virtual venue from a region different from the first virtual venue in the virtual space".

In any one of the thirty-third exemplary embodiment to the forty-third exemplary embodiment described above, a computer program according to a forty-fifth exemplary embodiment may be characterized by "the determination may be performed in a first mode in which the display unit may display the first avatar, the control data that may be decided when the first condition may be satisfied may include data for controlling the display unit of the first terminal such that the first mode may be switched to a second mode, and in the second mode, the at least one second avatar of the at least one avatar other than the first avatar and the message included in the message data transmitted from the terminal manipulating the at least one second avatar may be displayed on the display unit, and the first avatar may not be displayed on the display unit".

In the forty-fifth exemplary embodiment described above, a computer program according to a forty-sixth exemplary embodiment may be characterized by "the second mode may be switched to the first mode by performing a first manipulation with respect to the terminal in the second mode".

In the forty-sixth exemplary embodiment described above, a computer program according to a forty-seventh exemplary embodiment may be characterized by "the first manipulation may be a manipulation for requesting a switch from the second mode to the first mode".

In the forty-fifth exemplary embodiment described above, a computer program according to a forty-eighth exemplary embodiment may be characterized by "in the first mode, the display unit may be controlled on the basis of manipulation data for moving the first avatar in the first virtual venue".

In the forty-fifth exemplary embodiment described above, a computer program according to a forty-ninth exemplary embodiment may be characterized by "in the first mode, the display unit may be controlled such that a virtual object corresponding to the at least one avatar and a second display region displaying a message included in message data transmitted from a terminal of a user manipulating the at least one avatar may be displayed".

In any one of the thirty-third exemplary embodiment to the forty-ninth exemplary embodiment described above, a computer program according to a fiftieth exemplary embodiment may be characterized by "the virtual space may be a three-dimensional space".

In any one of the thirty-fourth exemplary embodiment to the fiftieth exemplary embodiment described above, a computer program according to a fifty-first exemplary embodiment may be characterized by "the communication line may include the internet".

In any one of the thirty-third exemplary embodiment to the fifty-first exemplary embodiment described above, a computer program according to a fifty-second exemplary embodiment may be characterized by "the at least one processor may include a central processing unit (CPU), a microprocessor, and/or a graphics processing unit (GPU)".

In any one of the thirty-third exemplary embodiment to the fifty-second exemplary embodiment described above, a computer program according to a fifty-third exemplary embodiment may be characterized by "the at least one processor may be mounted on a server, a smart phone, a tablet, a mobile phone, or a personal computer".

A method according to a fifty-fourth exemplary embodiment may be characterized by "method executed by at least one processor, including: a step of acquiring first data including motion data of a first avatar in a virtual space that may be configured to be manipulated by using a first terminal of a first user; a step of determining whether or not a first condition relevant to data included in the first data may be satisfied; a step of deciding control data for controlling a display unit of the first terminal such that a first display region displaying a moving image in a first virtual venue in the virtual space, at least one second avatar of at least one avatar other than the first avatar, and a message included in message data transmitted from a terminal manipulating the at least one second avatar may be displayed when the first condition may be satisfied; and a step of controlling the display unit on the basis of the control data".

A method according to a fifty-fifth exemplary embodiment may be characterized by "a method executed by at least one processor, including: a step of receiving first data including motion data of a first avatar in a virtual space that may be configured to be manipulated by using a first terminal of a first user, through a communication line; a step of determining whether or not a first condition relevant to data included in the first data may be satisfied; a step of deciding control data for controlling a display unit of the first terminal such that a first display region displaying a moving image in a first virtual venue in the virtual space, at least one second avatar of at least one avatar other than the first avatar, and a message included in message data transmitted from a terminal configured to manipulate the at least one second avatar may be displayed when the first condition may be satisfied; and a step of transmitting the control data to the first terminal".

In the fifty-fourth exemplary embodiment or the fifty-fifth exemplary embodiment described above, a method according to a fifty-sixth exemplary embodiment may be characterized by "the virtual space may be a three-dimensional space".

In the fifty-fourth exemplary embodiment or the fifty-fifth exemplary embodiment described above, a method according to a fifty-seventh exemplary embodiment may be characterized by "the communication line may include the internet".

In any one of the fifty-fourth exemplary embodiment to the fifty-seventh exemplary embodiment described above, a method according to a fifty-eighth exemplary embodiment may be characterized by "the at least one processor may include a central processing unit (CPU), a microprocessor, and/or a graphics processing unit (GPU)".

In any one of the fifty-fourth exemplary embodiment to the fifty-eighth exemplary embodiment described above, a method according to a fifty-ninth exemplary embodiment may be characterized by "the at least one processor may be mounted on a server, a smart phone, a tablet, a mobile phone, or a personal computer".

A server according to a sixtieth exemplary embodiment may be characterized by "a server that may include at least one processor and may perform: receiving first data including motion data of a first avatar in a virtual space that may be manipulated by using a first terminal of a first user, through a communication line; determining whether or not a first condition relevant to data included in the first data may be satisfied; deciding control data for controlling a display unit of the first terminal such that a first display region displaying a moving image in a first virtual venue in the virtual space, at least one second avatar of at least one avatar other than the first avatar, and a message included in message data transmitted from a terminal configured to manipulate the at least one second avatar may be displayed when the first condition may be satisfied; and transmitting the control data to the first terminal".

In the sixtieth exemplary embodiment described above, a server according to a sixty-first exemplary embodiment may be characterized by "the virtual space may be a three-dimensional space".

In the sixtieth exemplary embodiment or the sixty-first exemplary embodiment described above, a server according to a sixty-second exemplary embodiment may be characterized by "the communication line may include the internet".

In any one of the sixtieth exemplary embodiment to the sixty-second exemplary embodiment described above, a server according to a sixty-third exemplary embodiment may be characterized by "the at least one processor may include a central processing unit (CPU), a microprocessor, and/or a graphics processing unit (GPU)".

As described above, the technology of the disclosure may be capable of providing a computer program, a method, and a server with higher attractiveness, compared to the related art.

This application may be based on the following two Japanese patent applications and takes the advantage of the priority of these Japanese patent applications. The entire contents of these Japanese patent applications may be incorporated herein by reference.

(1) Japanese Patent Application No. 2020-218264 filed on Dec. 28, 2020, entitled "COMPUTER PROGRAM, METHOD, AND SERVER"

(2) Japanese Patent Application No. 2020-20723, filed on Dec. 7, 2020, entitled "COMPUTER PROGRAM, METHOD, AND SERVER"

The invention claimed is:

1. A non-transitory computer-readable medium containing computer program code that is configured to, when executed by at least one processor, configure the at least one processor to:

acquire first data relevant to a first position in a virtual space in which a first avatar configured to be manipulated by using a first terminal of a first user exists;

determine whether or not a first condition is satisfied by determining which region in a plurality of regions the first position is provided within;

determine that the first condition is satisfied based on the first position being defined within a first region in the plurality of regions, wherein each region of the plurality of regions is a non-overlapping region in a three-dimensional virtual space;

receive second data transmitted from a terminal of a user based on a manipulation applied to at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, decide control data for controlling a display unit of the first terminal such that at least the virtual object is displayed on the display unit of the first terminal, on the basis of the second data, wherein the control data include data for controlling the display unit such that the message is displayed on the display unit after the virtual object is displayed on the display unit; and control the display unit on the basis of the control data.

2. The non-transitory computer-readable medium according to claim 1, wherein the manipulation data includes data for designating at least one color applied to the virtual object and data for designating at least one color and/or shape applied to the first display region that is positioned around the virtual object and displays the message, and the control data includes data for controlling the display unit such that the virtual object is displayed by using the at least one color and/or the first display region is displayed by using the at least one color and/or shape, on the basis of the position data and the manipulation data.

3. The non-transitory computer-readable medium according to claim 2, wherein the manipulation data includes data for designating the motion of the virtual object, and the control data includes data for controlling the display unit such that the motion of the virtual object is changed over time, on the basis of the position data and the manipulation data.

4. The non-transitory computer-readable medium according to claim 2, wherein the second data includes position data items of each of a plurality of avatars in the first region and manipulation data items input to a terminal of each user in a plurality of users, wherein each of the plurality of avatars is associated with and configured to be manipulated by one of the plurality of users, and when each of the position data items indicates the same position, the control data includes data for controlling the display unit such that positions in which messages included in each of the manipulation data items are displayed on the display unit are different from each other.

5. The non-transitory computer-readable medium according to claim 2, wherein the second data includes position data items of each of a plurality of avatars in the first region and manipulation data items input to a terminal of each user in a plurality of users, wherein each of the plurality of avatars is associated with and configured to be manipulated by one of the plurality of users, and when each of the position data items indicates the same position, the control data includes data for controlling the display unit such that times at which messages included in each of the manipulation data items are displayed on the display unit are different from each other.

6. The non-transitory computer-readable medium according to claim 2, wherein the control data includes data for controlling the display unit such that display relevant to the message according to a distance between the first avatar and the virtual object in the virtual space is displayed around the virtual object.

7. The non-transitory computer-readable medium according to claim 2, wherein the virtual object displayed on the display unit is hidden after the message displayed on the display unit is hidden.

8. The non-transitory computer-readable medium according to claim 1, wherein the at least one second avatar is a plurality of second avatars, the second data is data transmitted from a terminal of each user in a plurality of users, wherein each of the plurality of second avatars is associated with and configured to be manipulated by one of the plurality of users, the second data includes attribute data items relevant to an attribute of each of the plurality of second avatars, and positions in the first region in which the virtual objects corresponding to each of the plurality of second avatars are displayed are decided on the basis of each of the attribute data items.

9. The non-transitory computer-readable medium according to claim 8, wherein the plurality of virtual objects includes at least a virtual object corresponding to each of the plurality of second avatars, wherein a magnitude of the drawing data of the virtual object corresponding to the second avatar is less than a magnitude of the drawing data of the second avatar, and wherein the virtual objects corresponding to each of the plurality of second avatars are displayed have a substantially identical shape and color.

10. The non-transitory computer-readable medium according to claim 1, wherein a second display region displaying a moving image is provided in the first region.

11. The non-transitory computer-readable medium according to claim 1, wherein the virtual space is a three-dimensional space.

12. The non-transitory computer-readable medium according to claim 1, wherein the communication line includes the internet.

13. The non-transitory computer-readable medium according to claim 1, wherein the at least one processor includes a central processing unit (CPU), a microprocessor, and/or a graphics processing unit (GPU).

14. The non-transitory computer-readable medium according to claim 1, wherein the at least one processor is mounted on a server, a smart phone, a tablet, a mobile phone, or a personal computer.

15. A method executed by at least one processor, comprising:
    acquiring first data relevant to a first position in a virtual space in which a first avatar configured to be manipulated by using a first terminal of a first user exists;
    determining whether or not a first condition is satisfied by determining which region in a plurality of regions the first position is provided within;
    determining that the first condition is satisfied based on the first position being defined within a first region in the plurality of regions, wherein each region of the plurality of regions is a non-overlapping region in a three-dimensional virtual space;
    receiving second data transmitted from a terminal of a user based on a manipulation applied to at least one second avatar of at least one avatar existing in the first region other than the first avatar, through a communication line, when it is determined that the first condition is satisfied; the second data including position data of the at least one second avatar in the first region and manipulation data input to the terminal, and the position data being used in decision of a position in the first region displaying a virtual object corresponding to the at least one second avatar,
    deciding control data for controlling a display unit of the first terminal such that at least the virtual object is displayed on the display unit of the first terminal, on the basis of the second data, wherein the control data include data for controlling the display unit such that the message is displayed on the display unit after the virtual object is displayed on the display unit; and
    controlling the display unit on the basis of the control data.

16. The method according to claim 15, wherein the at least one processor includes a central processing unit (CPU), a microprocessor, and/or a graphics processing unit (GPU).

17. The method according to claim 15, wherein the at least one processor is mounted on a server, a smart phone, a tablet, a mobile phone, or a personal computer.

18. A server that includes at least one processor and performs:
    receiving first data relevant to a first position in a virtual space in which a first avatar configured to be manipulated by using a first terminal of a first user exists, through a communication line;
    determining whether or not a first condition is satisfied by determining which region in a plurality of regions the first position is provided within, and
    determining that the first condition is satisfied based on the first position being defined within a first region in the plurality of regions, wherein each region of the plurality of regions is a non-overlapping region in a three-dimensional virtual space;

receiving second data transmitted from a terminal of a user based on a manipulation applied to at least one second avatar of at least one avatar existing in the first region other than the first avatar, through the communication line, when it is determined that the first condition is satisfied; the second data including position data of the at least one second avatar in the first region and manipulation data input to the terminal, and the position data being used in decision of a position in the first region displaying a virtual object corresponding to the at least one second avatar, deciding control data for controlling a display unit of the first terminal such that at least the virtual object is displayed on the display unit of the first terminal, on the basis of the second data; and transmitting the control data to the first terminal, wherein the control data include data for controlling the display unit such that the message is displayed on the display unit after the virtual object is displayed on the display unit.

19. The server according to claim 18, wherein the at least one processor includes a central processing unit (CPU), a microprocessor, and/or a graphics processing unit (GPU).

* * * * *